United States Patent
Trevor et al.

(10) Patent No.: US 11,876,948 B2
(45) Date of Patent: *Jan. 16, 2024

(54) SNAPSHOTS AT PREDEFINED INTERVALS OR ANGLES

(71) Applicant: Fyusion, Inc., San Francisco, CA (US)

(72) Inventors: Alexander Jay Bruen Trevor, San Francisco, CA (US); Chris Beall, San Francisco, CA (US); Vladimir Glavtchev, Mountain View, CA (US); Stefan Johannes Josef Holzer, San Mateo, CA (US); Radu Bogdan Rusu, San Francisco, CA (US)

(73) Assignee: Fyusion, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/814,820

(22) Filed: Jul. 25, 2022

(65) Prior Publication Data
US 2023/0083213 A1    Mar. 16, 2023

Related U.S. Application Data

(63) Continuation of application No. 16/389,544, filed on Apr. 19, 2019, now Pat. No. 11,438,565, which is a
(Continued)

(51) Int. Cl.
*H04N 13/117* (2018.01)
*G01B 21/22* (2006.01)
(Continued)

(52) U.S. Cl.
CPC .......... *H04N 13/117* (2018.05); *G01B 11/24* (2013.01); *G01B 21/22* (2013.01); *G06T 7/00* (2013.01);
(Continued)

(58) Field of Classification Search
CPC .... H04N 13/117; H04N 13/398; H04N 23/62; H04N 23/698; H04N 23/90;
(Continued)

(56) References Cited

U.S. PATENT DOCUMENTS 2,534,821 A   12/1950 Ifield
5,495,576 A   2/1996 Ritchey
(Continued)

FOREIGN PATENT DOCUMENTS

CN   104462365 A   3/2015
CN   105849781 A   8/2016
(Continued)

OTHER PUBLICATIONS

"U.S. Appl. No. 15/409,500, Examiner Interview Summary dated Mar. 5, 2019", 3 pages.
(Continued)

*Primary Examiner* — Abdelaaziz Tissire
(74) *Attorney, Agent, or Firm* — Kwan & Olynick LLP

(57) ABSTRACT

Various embodiments of the present invention relate generally to systems and methods for analyzing and manipulating images and video. In particular, a multi-view interactive digital media representation can be generated from live images captured from a camera. The live images can include an object. An angular view of the object captured in the live images can be estimated using sensor data from an inertial measurement unit. The determined angular views can be used to select from among the live images. The multi-view interactive digital media representation can include a plurality of images where each of the plurality of images includes the object from a different camera view. When the plurality of images is output to a display, the object can appear to undergo a 3-D rotation through the determined
(Continued)

angular view where the 3-D rotation of the object is generated without a 3-D polygon model of the object.

25 Claims, 17 Drawing Sheets

Related U.S. Application Data continuation of application No. 15/601,863, filed on May 22, 2017, now Pat. No. 10,313,651.

(51) Int. Cl.
| | |
|---|---|
| *H04N 13/398* | (2018.01) |
| *G01B 11/24* | (2006.01) |
| *H04N 23/62* | (2023.01) |
| *H04N 23/90* | (2023.01) |
| *H04N 23/698* | (2023.01) |
| *H04N 25/40* | (2023.01) |
| *G06T 7/00* | (2017.01) |

(52) U.S. Cl.
CPC ............ *H04N 13/398* (2018.05); *H04N 23/62* (2023.01); *H04N 23/698* (2023.01); *H04N 23/90* (2023.01); *H04N 25/41* (2023.01)

(58) Field of Classification Search
CPC .. H04N 5/3415; H04N 5/23238; H04N 5/232; H04N 5/2624; H04N 5/2628; G01B 11/24; G01B 21/22; G06T 7/00; G06T 3/4038; G06T 2200/32; G03B 37/00–06
See application file for complete search history.

(56) References Cited

U.S. PATENT DOCUMENTS

| | | | |
|---|---|---|---|
| 5,557,684 | A | 9/1996 | Wang |
| 5,613,048 | A | 3/1997 | Chen |
| 5,613,056 | A | 3/1997 | Gasper |
| 5,694,533 | A | 12/1997 | Richards |
| 5,706,417 | A | 1/1998 | Adelson |
| 5,847,714 | A | 12/1998 | Naqvi |
| 5,850,352 | A | 12/1998 | Moezzi |
| 5,926,190 | A | 7/1999 | Turkowski |
| 6,031,564 | A | 2/2000 | Ma |
| 6,080,063 | A | 6/2000 | Khosla |
| 6,185,343 | B1 | 2/2001 | Ikeda |
| 6,252,974 | B1 | 6/2001 | Martens |
| 6,266,068 | B1 | 7/2001 | Kang |
| 6,281,903 | B1 | 8/2001 | Martin |
| 6,327,381 | B1 | 12/2001 | Rogina |
| 6,385,245 | B1 | 5/2002 | De Haan |
| 6,504,569 | B1 | 1/2003 | Jasinschi |
| 6,522,787 | B1 | 2/2003 | Kumar |
| 6,778,207 | B1 | 8/2004 | Mi-Suen |
| 6,814,889 | B1 | 11/2004 | O'Grady |
| 6,975,756 | B1 | 12/2005 | Slabaugh |
| 7,167,180 | B1 | 1/2007 | Shibolet |
| 7,593,000 | B1 | 9/2009 | Chin |
| 7,631,261 | B2 | 12/2009 | Williams |
| 7,631,277 | B1 | 12/2009 | Nie |
| 8,078,004 | B2 | 12/2011 | Kang |
| 8,094,928 | B2 | 1/2012 | Graepel |
| 8,160,391 | B1 | 4/2012 | Zhu |
| 8,244,069 | B1 | 8/2012 | Bourdev |
| 8,401,276 | B1 | 3/2013 | Choe |
| 8,503,826 | B2 | 8/2013 | Klimenko |
| 8,504,842 | B1 | 8/2013 | Meacham |
| 8,515,982 | B1 | 8/2013 | Hickman |
| 8,589,069 | B1 | 11/2013 | Lehman |
| 8,682,097 | B2 | 3/2014 | Steinberg |
| 8,803,912 | B1 | 8/2014 | Fouts |
| 8,817,071 | B2 | 8/2014 | Wang |
| 8,819,525 | B1 | 8/2014 | Holmer |
| 8,866,841 | B1 | 10/2014 | Distler |
| 8,942,917 | B2 | 1/2015 | Chrysanthakopoulos |
| 8,947,452 | B1 | 2/2015 | Ballagh |
| 8,947,455 | B2 | 2/2015 | Friesen |
| 8,963,855 | B2 | 2/2015 | Chen |
| 8,966,356 | B1 | 2/2015 | Hickman |
| 9,024,970 | B2 | 5/2015 | Lynch |
| 9,027,117 | B2 | 5/2015 | Wilairat |
| 9,043,222 | B1 | 5/2015 | Kerr |
| 9,070,402 | B2 | 6/2015 | Burtnyk |
| 9,094,670 | B1 * | 7/2015 | Furio .................. G06T 19/20 |
| 9,129,179 | B1 | 9/2015 | Wong |
| 9,317,881 | B1 | 4/2016 | Sara |
| 9,325,899 | B1 | 4/2016 | Chou |
| 9,367,951 | B1 | 6/2016 | Gray |
| 9,390,250 | B2 | 7/2016 | Kim |
| 9,400,595 | B2 | 7/2016 | Li |
| 9,407,816 | B1 | 8/2016 | Sehn |
| 9,412,203 | B1 | 8/2016 | Garcia, III |
| 9,472,161 | B1 | 10/2016 | Ho |
| 9,621,768 | B1 | 4/2017 | Gibson |
| 9,704,257 | B1 | 7/2017 | Tuzel |
| 9,734,586 | B2 | 8/2017 | Luo |
| 9,865,033 | B1 | 1/2018 | Jafarzadeh |
| 9,865,058 | B1 | 1/2018 | Mullins |
| 9,865,069 | B1 | 1/2018 | Saporta |
| 9,886,771 | B1 | 2/2018 | Chen |
| 9,898,742 | B2 | 2/2018 | Higgins |
| 9,904,056 | B2 | 2/2018 | Raghoebardajal |
| 9,910,505 | B2 | 3/2018 | Park |
| 9,928,544 | B1 | 3/2018 | Hasan |
| 9,940,541 | B2 | 4/2018 | Holzer |
| 9,968,257 | B1 | 5/2018 | Burt |
| 9,998,663 | B1 * | 6/2018 | François ............. H04N 23/683 |
| 10,008,027 | B1 | 6/2018 | Baker |
| 10,055,882 | B2 | 8/2018 | Marin |
| 10,147,211 | B2 | 12/2018 | Holzer |
| 10,157,333 | B1 | 12/2018 | Wang |
| 10,176,592 | B2 | 1/2019 | Holzer |
| 10,176,636 | B1 | 1/2019 | Neustein |
| 10,204,448 | B2 | 2/2019 | Hazeghi |
| 10,222,932 | B2 | 3/2019 | Holzer |
| 10,242,474 | B2 | 3/2019 | Holzer |
| 10,262,426 | B2 | 4/2019 | Holzer |
| 10,275,935 | B2 | 4/2019 | Holzer |
| 10,284,794 | B1 | 5/2019 | Francois |
| 10,306,203 | B1 | 5/2019 | Goyal |
| 10,360,601 | B1 | 7/2019 | Adegan |
| 10,373,260 | B1 * | 8/2019 | Haller, Jr. ............... G06T 17/20 |
| 10,382,739 | B1 | 8/2019 | Rusu |
| 10,430,995 | B2 | 10/2019 | Holzer |
| 10,574,974 | B2 | 2/2020 | Arora |
| 10,657,647 | B1 | 5/2020 | Chen |
| 10,668,965 | B2 | 6/2020 | Czinger |
| 10,719,939 | B2 | 7/2020 | Holzer |
| 10,725,609 | B2 | 7/2020 | Holzer |
| 10,726,560 | B2 | 7/2020 | Holzer |
| 10,748,313 | B2 | 8/2020 | Holzer |
| 10,750,161 | B2 | 8/2020 | Holzer |
| 10,818,029 | B2 | 10/2020 | Holzer |
| 10,846,913 | B2 | 11/2020 | Holzer |
| 10,852,902 | B2 | 12/2020 | Holzer |
| 11,006,095 | B2 | 5/2021 | Holzer |
| 11,055,534 | B2 | 7/2021 | Beall |
| 11,138,432 | B2 | 10/2021 | Holzer |
| 11,438,565 | B2 * | 9/2022 | Trevor ................. H04N 23/698 |
| 2001/0014172 | A1 | 8/2001 | Baba |
| 2001/0046262 | A1 | 11/2001 | Freda |
| 2002/0024517 | A1 | 2/2002 | Yamaguchi |
| 2002/0094125 | A1 | 7/2002 | Guo |
| 2002/0190991 | A1 | 12/2002 | Efran |
| 2003/0086002 | A1 | 5/2003 | Cahill |
| 2003/0137506 | A1 | 7/2003 | Efran |
| 2003/0137517 | A1 | 7/2003 | Kondo |
| 2003/0185456 | A1 | 10/2003 | Sato |
| 2003/0231179 | A1 | 12/2003 | Suzuki |
| 2004/0085335 | A1 | 5/2004 | Burlnyk |
| 2004/0104935 | A1 | 6/2004 | Williamson |
| 2004/0141014 | A1 | 7/2004 | Kamiwada |

(56) References Cited

U.S. PATENT DOCUMENTS

| | | |
|---|---|---|
| 2004/0184013 A1 | 9/2004 | Raskar |
| 2004/0222987 A1 | 11/2004 | Chang |
| 2004/0239699 A1 | 12/2004 | Uyttendaele |
| 2005/0018045 A1 | 1/2005 | Thomas |
| 2005/0041842 A1 | 2/2005 | Frakes |
| 2005/0046645 A1 | 3/2005 | Breton |
| 2005/0119550 A1 | 6/2005 | Serra |
| 2005/0151759 A1 | 7/2005 | Gonzalez-Banos |
| 2005/0186548 A1 | 8/2005 | Tomlinson |
| 2005/0195216 A1* | 9/2005 | Kramer .................... G06F 3/14 345/619 |
| 2005/0219264 A1 | 10/2005 | Shum |
| 2005/0226502 A1 | 10/2005 | Cohen |
| 2005/0232467 A1 | 10/2005 | Mohri |
| 2005/0232510 A1 | 10/2005 | Blake |
| 2005/0253877 A1 | 11/2005 | Thompson |
| 2005/0283075 A1 | 12/2005 | Ma |
| 2005/0285874 A1 | 12/2005 | Zitnick |
| 2006/0028552 A1 | 2/2006 | Aggarwal |
| 2006/0087498 A1 | 4/2006 | Evemy |
| 2006/0188147 A1 | 8/2006 | Rai |
| 2006/0193535 A1 | 8/2006 | Mishima |
| 2006/0250505 A1 | 11/2006 | Gennetten |
| 2006/0256109 A1 | 11/2006 | Acker |
| 2007/0008312 A1 | 1/2007 | Zhou |
| 2007/0058880 A1 | 3/2007 | Jean |
| 2007/0064802 A1 | 3/2007 | Paniconi |
| 2007/0070069 A1 | 3/2007 | Samarasekera |
| 2007/0110338 A1 | 5/2007 | Snavely |
| 2007/0118801 A1 | 5/2007 | Harshbarger |
| 2007/0126928 A1 | 6/2007 | Klompnhouwer |
| 2007/0159487 A1 | 7/2007 | Felt |
| 2007/0237420 A1 | 10/2007 | Steedly |
| 2007/0237422 A1 | 10/2007 | Zhou |
| 2007/0252804 A1 | 11/2007 | Engel |
| 2007/0269054 A1 | 11/2007 | Takagi |
| 2008/0009734 A1 | 1/2008 | Houle |
| 2008/0025588 A1 | 1/2008 | Zhang |
| 2008/0033641 A1 | 2/2008 | Medalia |
| 2008/0106593 A1 | 5/2008 | Arfvidsson |
| 2008/0151106 A1 | 6/2008 | Verburgh |
| 2008/0152258 A1 | 6/2008 | Tulkki |
| 2008/0198159 A1 | 8/2008 | Liu |
| 2008/0201734 A1 | 8/2008 | Thomas |
| 2008/0225132 A1 | 9/2008 | Inaguma |
| 2008/0232716 A1 | 9/2008 | Plagne |
| 2008/0246759 A1 | 10/2008 | Summers |
| 2008/0266142 A1 | 10/2008 | Sula |
| 2008/0278569 A1 | 11/2008 | Rotem |
| 2008/0313014 A1 | 12/2008 | Fell |
| 2009/0003725 A1 | 1/2009 | Merkel |
| 2009/0046160 A1 | 2/2009 | Hayashi |
| 2009/0077161 A1 | 3/2009 | Hamilton, II |
| 2009/0087029 A1 | 4/2009 | Coleman |
| 2009/0116732 A1 | 5/2009 | Zhou |
| 2009/0141130 A1 | 6/2009 | Ortiz |
| 2009/0144173 A1 | 6/2009 | Mo |
| 2009/0153549 A1 | 6/2009 | Lynch |
| 2009/0160934 A1 | 6/2009 | Hendrickson |
| 2009/0163185 A1 | 6/2009 | Whan |
| 2009/0174709 A1 | 7/2009 | Kozlak |
| 2009/0208062 A1 | 8/2009 | Sorek |
| 2009/0262074 A1 | 10/2009 | Nasiri |
| 2009/0263045 A1 | 10/2009 | Szeliski |
| 2009/0274391 A1 | 11/2009 | Arcas |
| 2009/0276805 A1 | 11/2009 | Andrews, II |
| 2009/0303343 A1 | 12/2009 | Drimbarean |
| 2010/0007715 A1 | 1/2010 | Peng-Cheng |
| 2010/0017181 A1 | 1/2010 | Mouton |
| 2010/0026788 A1 | 2/2010 | Ishikawa |
| 2010/0033553 A1 | 2/2010 | Noam |
| 2010/0060793 A1 | 3/2010 | Oz |
| 2010/0079667 A1 | 4/2010 | Engin |
| 2010/0098258 A1 | 4/2010 | Thorn |
| 2010/0100492 A1 | 4/2010 | Philip |
| 2010/0110069 A1 | 5/2010 | Yuan |
| 2010/0111444 A1 | 5/2010 | Coffman |
| 2010/0164990 A1 | 7/2010 | Van Doorn |
| 2010/0171691 A1* | 7/2010 | Cook ...................... G06F 3/017 715/863 |
| 2010/0188584 A1 | 7/2010 | Liu |
| 2010/0215251 A1 | 8/2010 | Klein Gunnewiek et al. |
| 2010/0225743 A1 | 9/2010 | Florencio et al. |
| 2010/0231593 A1 | 9/2010 | Zhou |
| 2010/0259595 A1 | 10/2010 | Trimeche et al. |
| 2010/0266172 A1 | 10/2010 | Shlomi |
| 2010/0305857 A1 | 12/2010 | Byrne |
| 2010/0315412 A1 | 12/2010 | Sinha |
| 2010/0329542 A1 | 12/2010 | Ramalingam |
| 2011/0007072 A1 | 1/2011 | Khan |
| 2011/0033170 A1 | 2/2011 | Ikeda |
| 2011/0034103 A1 | 2/2011 | Fong |
| 2011/0040539 A1 | 2/2011 | Szymczyk |
| 2011/0043604 A1 | 2/2011 | Peleg |
| 2011/0064388 A1 | 3/2011 | Brown |
| 2011/0074926 A1 | 3/2011 | Khan |
| 2011/0090344 A1 | 4/2011 | Gefen |
| 2011/0105192 A1* | 5/2011 | Jung .................. G06F 3/04845 345/173 |
| 2011/0109618 A1 | 5/2011 | Nowak |
| 2011/0109726 A1* | 5/2011 | Hwang ................ H04N 13/204 348/47 |
| 2011/0115886 A1 | 5/2011 | Nguyen |
| 2011/0141141 A1 | 6/2011 | Kankainen |
| 2011/0141227 A1 | 6/2011 | Bigioi |
| 2011/0142289 A1 | 6/2011 | Barenbrug |
| 2011/0142343 A1 | 6/2011 | Kim |
| 2011/0170789 A1 | 7/2011 | Amon |
| 2011/0173565 A1 | 7/2011 | Ofek |
| 2011/0179373 A1 | 7/2011 | Moore |
| 2011/0193941 A1 | 8/2011 | Seijiro |
| 2011/0214072 A1 | 9/2011 | Pierre-Alain |
| 2011/0234750 A1* | 9/2011 | Lai ........................ G03B 37/04 348/E7.001 |
| 2011/0248987 A1 | 10/2011 | Mitchell |
| 2011/0254835 A1 | 10/2011 | Segal |
| 2011/0261050 A1 | 10/2011 | Smolic |
| 2011/0288858 A1 | 11/2011 | Gay |
| 2011/0313653 A1 | 12/2011 | Erhard |
| 2011/0316963 A1 | 12/2011 | Li |
| 2012/0007713 A1 | 1/2012 | Nasiri |
| 2012/0013711 A1 | 1/2012 | Tamir |
| 2012/0017147 A1 | 1/2012 | Mark |
| 2012/0019557 A1 | 1/2012 | Aronsson |
| 2012/0028706 A1 | 2/2012 | Raitt |
| 2012/0041722 A1 | 2/2012 | Quan |
| 2012/0057006 A1 | 3/2012 | Joseph |
| 2012/0062756 A1 | 3/2012 | Tian |
| 2012/0075411 A1 | 3/2012 | Matsumoto |
| 2012/0092348 A1 | 4/2012 | McCutchen |
| 2012/0095323 A1 | 4/2012 | Eskandari |
| 2012/0099804 A1 | 4/2012 | Aguilera |
| 2012/0127172 A1 | 5/2012 | Wu |
| 2012/0127270 A1 | 5/2012 | Zhang |
| 2012/0139918 A1 | 6/2012 | Michail |
| 2012/0147224 A1 | 6/2012 | Takayama |
| 2012/0148162 A1 | 6/2012 | Zhang |
| 2012/0162223 A1 | 6/2012 | Hirai |
| 2012/0162253 A1 | 6/2012 | Collins |
| 2012/0167146 A1 | 6/2012 | Incorvia |
| 2012/0198317 A1 | 8/2012 | Eppolito |
| 2012/0207308 A1 | 8/2012 | Sung |
| 2012/0212579 A1 | 8/2012 | Per |
| 2012/0236201 A1 | 9/2012 | Ward |
| 2012/0240035 A1 | 9/2012 | Gaucas |
| 2012/0242798 A1 | 9/2012 | McArdle |
| 2012/0257025 A1 | 10/2012 | Kim |
| 2012/0257065 A1 | 10/2012 | Velarde |
| 2012/0258436 A1 | 10/2012 | Kiju |
| 2012/0262580 A1 | 10/2012 | Huebner |
| 2012/0287123 A1 | 11/2012 | Starner |
| 2012/0293632 A1 | 11/2012 | Yukich |
| 2012/0294549 A1* | 11/2012 | Doepke ................ H04N 5/2628 382/294 |

(56) References Cited

U.S. PATENT DOCUMENTS

| | | |
|---|---|---|
| 2012/0300019 A1 | 11/2012 | Yang |
| 2012/0301044 A1 | 11/2012 | Nakada |
| 2012/0314027 A1 | 12/2012 | Tian |
| 2012/0314040 A1* | 12/2012 | Kopf ............... H04N 13/264 348/E13.074 |
| 2012/0314899 A1 | 12/2012 | Cohen |
| 2012/0329527 A1 | 12/2012 | Kang |
| 2013/0002649 A1 | 1/2013 | Wu |
| 2013/0016102 A1 | 1/2013 | Look |
| 2013/0016897 A1 | 1/2013 | Cho |
| 2013/0018881 A1 | 1/2013 | Bhatt |
| 2013/0044191 A1 | 2/2013 | Matsumoto |
| 2013/0050573 A1 | 2/2013 | Syed |
| 2013/0057644 A1 | 3/2013 | Stefanoski |
| 2013/0063549 A1 | 3/2013 | Schnyder |
| 2013/0071012 A1 | 3/2013 | Germano |
| 2013/0076619 A1 | 3/2013 | Carr |
| 2013/0113830 A1 | 5/2013 | Suzuki |
| 2013/0120581 A1 | 5/2013 | Daniels |
| 2013/0127844 A1 | 5/2013 | Koeppel |
| 2013/0127847 A1 | 5/2013 | Jin |
| 2013/0129304 A1 | 5/2013 | Feinson |
| 2013/0141530 A1 | 6/2013 | Zavesky |
| 2013/0147795 A1 | 6/2013 | Kim |
| 2013/0147905 A1 | 6/2013 | Janahan |
| 2013/0154926 A1 | 6/2013 | Kim |
| 2013/0155180 A1 | 6/2013 | Wantland |
| 2013/0162634 A1 | 6/2013 | Baik |
| 2013/0162787 A1 | 6/2013 | Cho |
| 2013/0176392 A1 | 7/2013 | Carr |
| 2013/0195350 A1 | 8/2013 | Tanaka |
| 2013/0204411 A1 | 8/2013 | Clark |
| 2013/0208900 A1 | 8/2013 | Jon |
| 2013/0212538 A1 | 8/2013 | Ghislain |
| 2013/0219357 A1 | 8/2013 | Reitan |
| 2013/0240628 A1 | 9/2013 | Van Der Merwe |
| 2013/0250045 A1 | 9/2013 | Ki |
| 2013/0271566 A1 | 10/2013 | Chen |
| 2013/0278596 A1 | 10/2013 | Wu |
| 2013/0314442 A1 | 11/2013 | Martin |
| 2014/0002440 A1 | 1/2014 | Lynch |
| 2014/0002472 A1 | 1/2014 | Sobeski |
| 2014/0009462 A1 | 1/2014 | McNamer |
| 2014/0013414 A1 | 1/2014 | Bruck |
| 2014/0023341 A1 | 1/2014 | Wang |
| 2014/0037198 A1 | 2/2014 | Diane |
| 2014/0040742 A1 | 2/2014 | Hyekyung |
| 2014/0049607 A1 | 2/2014 | Amon |
| 2014/0059674 A1 | 2/2014 | Sun |
| 2014/0063005 A1 | 3/2014 | Ahn |
| 2014/0078136 A1 | 3/2014 | Sohn |
| 2014/0087877 A1 | 3/2014 | Krishnan |
| 2014/0092259 A1 | 4/2014 | Tsang |
| 2014/0100995 A1 | 4/2014 | Koshy |
| 2014/0107888 A1 | 4/2014 | Quast |
| 2014/0118479 A1 | 5/2014 | Rapoport |
| 2014/0118483 A1 | 5/2014 | Rapoport |
| 2014/0118494 A1 | 5/2014 | Wu |
| 2014/0125659 A1 | 5/2014 | Yoshida |
| 2014/0132594 A1* | 5/2014 | Gharpure ............ H04N 13/279 345/419 |
| 2014/0152834 A1 | 6/2014 | Kosseifi |
| 2014/0153832 A1 | 6/2014 | Kwatra |
| 2014/0177927 A1 | 6/2014 | Shieh |
| 2014/0192155 A1 | 7/2014 | Choi |
| 2014/0198184 A1 | 7/2014 | Stein |
| 2014/0199050 A1 | 7/2014 | Khalsa |
| 2014/0211989 A1 | 7/2014 | Ding |
| 2014/0225930 A1 | 8/2014 | Durmek |
| 2014/0232634 A1 | 8/2014 | Piemonte |
| 2014/0253436 A1 | 9/2014 | Petersen |
| 2014/0253746 A1 | 9/2014 | Voss |
| 2014/0267616 A1 | 9/2014 | Krig |
| 2014/0275704 A1 | 9/2014 | Zhang |
| 2014/0286566 A1 | 9/2014 | Rhoads |
| 2014/0293004 A1 | 10/2014 | Tsubaki |
| 2014/0293028 A1 | 10/2014 | Nguyen |
| 2014/0297798 A1 | 10/2014 | Bakalash |
| 2014/0307045 A1 | 10/2014 | Richardt |
| 2014/0340404 A1 | 11/2014 | Wang |
| 2014/0362198 A1 | 12/2014 | Nakayama |
| 2014/0365888 A1 | 12/2014 | Curzon |
| 2014/0375684 A1 | 12/2014 | Algreatly |
| 2015/0009130 A1 | 1/2015 | Motta |
| 2015/0010218 A1 | 1/2015 | Bayer |
| 2015/0016714 A1 | 1/2015 | Chui |
| 2015/0022518 A1 | 1/2015 | Takeshita |
| 2015/0022677 A1 | 1/2015 | Guo |
| 2015/0042812 A1 | 2/2015 | Tang |
| 2015/0046875 A1 | 2/2015 | Xu |
| 2015/0073570 A1 | 3/2015 | Gonzalez-Mendoza |
| 2015/0078449 A1 | 3/2015 | Diggins |
| 2015/0097961 A1 | 4/2015 | Ure |
| 2015/0103170 A1 | 4/2015 | Nelson |
| 2015/0103197 A1 | 4/2015 | Djordjevic |
| 2015/0130799 A1 | 5/2015 | Holzer |
| 2015/0130800 A1 | 5/2015 | Holzer |
| 2015/0130894 A1* | 5/2015 | Holzer ............... G06F 16/5838 348/36 |
| 2015/0134651 A1* | 5/2015 | Holzer ............... H04N 23/698 707/723 |
| 2015/0138190 A1* | 5/2015 | Holzer ............... H04N 5/265 345/419 |
| 2015/0143239 A1 | 5/2015 | Birkbeck |
| 2015/0154442 A1 | 6/2015 | Takahashi |
| 2015/0156415 A1 | 6/2015 | Gallup |
| 2015/0188967 A1 | 7/2015 | Paulauskas |
| 2015/0193863 A1 | 7/2015 | Cao |
| 2015/0193963 A1 | 7/2015 | Chen |
| 2015/0198443 A1 | 7/2015 | Yi |
| 2015/0201176 A1 | 7/2015 | Graziosi |
| 2015/0206341 A1 | 7/2015 | Loper |
| 2015/0213784 A1* | 7/2015 | Jafarzadeh ............ G06F 3/0488 345/173 |
| 2015/0222880 A1* | 8/2015 | Choi ............... H04N 13/351 348/43 |
| 2015/0227285 A1 | 8/2015 | Sae |
| 2015/0227816 A1 | 8/2015 | Du |
| 2015/0235408 A1 | 8/2015 | Gross |
| 2015/0242686 A1 | 8/2015 | Kumar |
| 2015/0254224 A1 | 9/2015 | Kim |
| 2015/0269772 A1 | 9/2015 | Ha |
| 2015/0271356 A1 | 9/2015 | Terada |
| 2015/0281323 A1 | 10/2015 | Gold |
| 2015/0294492 A1 | 10/2015 | Koch |
| 2015/0309695 A1 | 10/2015 | Sannandeji |
| 2015/0318020 A1 | 11/2015 | Pribula |
| 2015/0319424 A1 | 11/2015 | Haimovitch-Yogev |
| 2015/0324649 A1 | 11/2015 | Grewe |
| 2015/0325044 A1 | 11/2015 | Adam |
| 2015/0339846 A1 | 11/2015 | Holzer |
| 2015/0371440 A1 | 12/2015 | Pirchheim |
| 2015/0379763 A1 | 12/2015 | Gabor |
| 2016/0001137 A1 | 1/2016 | Phillips |
| 2016/0012646 A1 | 1/2016 | Huang |
| 2016/0026253 A1 | 1/2016 | Bradski |
| 2016/0027209 A1* | 1/2016 | Demirli ............... G06T 19/003 345/419 |
| 2016/0034459 A1 | 2/2016 | Larsen |
| 2016/0042251 A1 | 2/2016 | Cordova-Diba |
| 2016/0044240 A1 | 2/2016 | Beers |
| 2016/0050368 A1 | 2/2016 | Seo |
| 2016/0055330 A1 | 2/2016 | Morishita |
| 2016/0061582 A1 | 3/2016 | Lucey |
| 2016/0063740 A1 | 3/2016 | Sakimoto |
| 2016/0077422 A1 | 3/2016 | Wang |
| 2016/0078287 A1 | 3/2016 | Auge |
| 2016/0080684 A1 | 3/2016 | Farrell |
| 2016/0080830 A1 | 3/2016 | Kim |
| 2016/0086381 A1 | 3/2016 | Jung |
| 2016/0088287 A1 | 3/2016 | Sadi |
| 2016/0110913 A1 | 4/2016 | Kosoy |
| 2016/0139794 A1 | 5/2016 | Maarten |
| 2016/0140125 A1 | 5/2016 | Goyal |

(56) References Cited

U.S. PATENT DOCUMENTS

| | | |
|---|---|---|
| 2016/0148349 A1 | 5/2016 | Cho |
| 2016/0171330 A1 | 6/2016 | Mentese |
| 2016/0189334 A1 | 6/2016 | Mason |
| 2016/0191895 A1 | 6/2016 | Yun |
| 2016/0203586 A1 | 7/2016 | Chang |
| 2016/0205341 A1 | 7/2016 | Hollander |
| 2016/0210602 A1 | 7/2016 | Siddique |
| 2016/0261855 A1 | 9/2016 | Park |
| 2016/0267676 A1 | 9/2016 | Setomoto |
| 2016/0275283 A1 | 9/2016 | De Leon |
| 2016/0295127 A1 | 10/2016 | Yu |
| 2016/0350930 A1 | 12/2016 | Lin |
| 2016/0350975 A1 | 12/2016 | Nakagawa |
| 2016/0353089 A1 | 12/2016 | Gallup |
| 2016/0358337 A1 | 12/2016 | Dai |
| 2016/0379415 A1 | 12/2016 | Espeset |
| 2017/0018054 A1 | 1/2017 | Holzer |
| 2017/0018055 A1 | 1/2017 | Holzer |
| 2017/0018056 A1 | 1/2017 | Holzer |
| 2017/0024094 A1 | 1/2017 | Gresham |
| 2017/0026574 A1* | 1/2017 | Kwon ................ G06F 3/04845 |
| 2017/0053169 A1 | 2/2017 | Cuban |
| 2017/0067739 A1 | 3/2017 | Siercks |
| 2017/0084001 A1 | 3/2017 | Holzer |
| 2017/0084293 A1 | 3/2017 | Holzer |
| 2017/0087415 A1 | 3/2017 | Nandimandalam |
| 2017/0103510 A1 | 4/2017 | Wang |
| 2017/0103584 A1 | 4/2017 | Vats |
| 2017/0109930 A1 | 4/2017 | Holzer |
| 2017/0124769 A1 | 5/2017 | Saito |
| 2017/0124770 A1 | 5/2017 | Vats |
| 2017/0126988 A1 | 5/2017 | Holzer |
| 2017/0140236 A1 | 5/2017 | Price |
| 2017/0148179 A1 | 5/2017 | Holzer |
| 2017/0148186 A1 | 5/2017 | Holzer |
| 2017/0148199 A1 | 5/2017 | Holzer |
| 2017/0148222 A1 | 5/2017 | Holzer |
| 2017/0148223 A1 | 5/2017 | Holzer |
| 2017/0158131 A1 | 6/2017 | Friebe |
| 2017/0206648 A1 | 7/2017 | Marra |
| 2017/0213385 A1 | 7/2017 | Yu |
| 2017/0231550 A1 | 8/2017 | Do |
| 2017/0236287 A1 | 8/2017 | Shen |
| 2017/0249339 A1 | 8/2017 | Scott |
| 2017/0255648 A1 | 9/2017 | Dube |
| 2017/0256066 A1 | 9/2017 | Richard |
| 2017/0277363 A1 | 9/2017 | Holzer |
| 2017/0277952 A1 | 9/2017 | Thommes |
| 2017/0278544 A1 | 9/2017 | Choi |
| 2017/0287137 A1 | 10/2017 | Zhe |
| 2017/0293894 A1 | 10/2017 | Taliwal |
| 2017/0308771 A1 | 10/2017 | Shimauchi |
| 2017/0316092 A1 | 11/2017 | Fichter |
| 2017/0330319 A1 | 11/2017 | Daguang |
| 2017/0337693 A1 | 11/2017 | Baruch |
| 2017/0344223 A1 | 11/2017 | Holzer |
| 2017/0344808 A1 | 11/2017 | El-Khamy |
| 2017/0357910 A1 | 12/2017 | Sommer |
| 2017/0359570 A1 | 12/2017 | Holzer |
| 2017/0364766 A1 | 12/2017 | Das |
| 2018/0012330 A1 | 1/2018 | Holzer |
| 2018/0012529 A1 | 1/2018 | Chiba |
| 2018/0035105 A1 | 2/2018 | Choi |
| 2018/0035500 A1 | 2/2018 | Song |
| 2018/0045592 A1 | 2/2018 | Okita |
| 2018/0046356 A1 | 2/2018 | Holzer |
| 2018/0046357 A1 | 2/2018 | Holzer |
| 2018/0046649 A1 | 2/2018 | Dal Mutto |
| 2018/0052665 A1 | 2/2018 | Kaur |
| 2018/0063504 A1 | 3/2018 | Haines |
| 2018/0082715 A1 | 3/2018 | Rymkowski |
| 2018/0143023 A1 | 5/2018 | Bjorke |
| 2018/0143756 A1 | 5/2018 | Mildrew |
| 2018/0144547 A1 | 5/2018 | Shakib |
| 2018/0155057 A1 | 6/2018 | Irish |
| 2018/0158197 A1 | 6/2018 | Dasgupta |
| 2018/0165875 A1 | 6/2018 | Yu |
| 2018/0199025 A1 | 7/2018 | Holzer |
| 2018/0203877 A1 | 7/2018 | Holzer |
| 2018/0205941 A1 | 7/2018 | Kopf |
| 2018/0211131 A1 | 7/2018 | Holzer |
| 2018/0211404 A1 | 7/2018 | Zhu |
| 2018/0218235 A1 | 8/2018 | Holzer |
| 2018/0218236 A1 | 8/2018 | Holzer |
| 2018/0234671 A1 | 8/2018 | Yang |
| 2018/0240243 A1 | 8/2018 | Kim |
| 2018/0255290 A1 | 9/2018 | Holzer |
| 2018/0268220 A1 | 9/2018 | Chen-Yu |
| 2018/0286098 A1 | 10/2018 | Lorenzo |
| 2018/0293774 A1 | 10/2018 | Yu |
| 2018/0315200 A1 | 11/2018 | Davydov |
| 2018/0336724 A1 | 11/2018 | Spring |
| 2018/0336737 A1 | 11/2018 | Varady |
| 2018/0338126 A1 | 11/2018 | Trevor |
| 2018/0338128 A1 | 11/2018 | Trevor |
| 2018/0357518 A1 | 12/2018 | Sekii |
| 2018/0374273 A1 | 12/2018 | Holzer |
| 2019/0019056 A1 | 1/2019 | Pierce |
| 2019/0025544 A1 | 1/2019 | Watanabe |
| 2019/0026956 A1 | 1/2019 | Gausebeck |
| 2019/0026958 A1 | 1/2019 | Gausebeck |
| 2019/0035149 A1 | 1/2019 | Chen |
| 2019/0050664 A1 | 2/2019 | Yang |
| 2019/0080499 A1 | 3/2019 | Holzer |
| 2019/0094981 A1 | 3/2019 | Bradski |
| 2019/0132569 A1 | 5/2019 | Karpenko |
| 2019/0147221 A1 | 5/2019 | Grabner |
| 2019/0209886 A1 | 7/2019 | Harlow |
| 2019/0213392 A1 | 7/2019 | Pan |
| 2019/0213406 A1 | 7/2019 | Porikli |
| 2019/0220991 A1 | 7/2019 | Holzer |
| 2019/0221021 A1 | 7/2019 | Holzer |
| 2019/0222776 A1 | 7/2019 | Carter |
| 2019/0235729 A1 | 8/2019 | Day |
| 2019/0244372 A1 | 8/2019 | Holzer |
| 2019/0251738 A1 | 8/2019 | Holzer |
| 2019/0278434 A1 | 9/2019 | Holzer |
| 2019/0304064 A1 | 10/2019 | Zhang |
| 2019/0364265 A1 | 11/2019 | Matsunobu |
| 2020/0027263 A1 | 1/2020 | Holzer |
| 2020/0045249 A1 | 2/2020 | Francois |
| 2020/0125877 A1 | 4/2020 | Phan |
| 2020/0128060 A1 | 4/2020 | Han |
| 2020/0137380 A1 | 4/2020 | Supikov |
| 2020/0167570 A1 | 5/2020 | Beall |
| 2020/0234397 A1 | 7/2020 | Holzer |
| 2020/0234451 A1 | 7/2020 | Holzer |

FOREIGN PATENT DOCUMENTS

| | | |
|---|---|---|
| CN | 105849781 B | 8/2016 |
| CN | 107466474 A | 12/2017 |
| DE | 112014005165 | 7/2016 |
| DE | 112017004150 | 6/2019 |
| GB | 2534821 A | 8/2016 |
| KR | 20120110861 | 10/2012 |
| KR | 101590256 B1 | 2/2016 |
| WO | 2015073570 A2 | 5/2015 |
| WO | 2017053197 A1 | 3/2017 |
| WO | 2018035500 A1 | 2/2018 |
| WO | 2018052665 A1 | 3/2018 |
| WO | 2018154331 A1 | 8/2018 |
| WO | 2019209886 | 10/2019 |
| WO | 2020092177 A2 | 5/2020 |

OTHER PUBLICATIONS

"U.S. Appl. No. 15/409,500, Non Final Office Action dated Dec. 11, 2018", 11 pgs.

"U.S. Appl. No. 15/409,500, Notice of Allowance dated Jun. 3, 2019", 8 pages.

"U.S. Appl. No. 15/601,863, Examiner Interview Summary dated Nov. 21, 2018", 4 pgs.

(56) References Cited

OTHER PUBLICATIONS

"U.S. Appl. No. 15/601,863, Non Final Office Action dated Sep. 20, 2018", 23 pages.
"U.S. Appl. No. 15/601,863, Notice of Allowance dated Jan. 24, 2019", 8 pages.
"International Application Serial No. PCT/US16/52192, Intl Search Report and Written Opinion dated Dec. 12, 2016", 8 pages.
"Intl Application Serial No. PCT/US16/52192, Intl Preliminary Report on Patentability dated Apr. 5, 2018", 7 pgs.
U.S. Appl. No. 14/860,983, Final Rejection, dated Feb. 12, 2020, 18 pgs.
U.S. Appl. No. 15/620,506, Notice of Allowance and Fees Due (Ptol-85), Mar. 2, 2020, 10 pgs.
U.S. Appl. No. 15/632,709, Non-Final Rejection,dated May 22, 2020, 10 pgs.
U.S. Appl. No. 15/673,125, Final Rejection, dated Feb. 19, 2020, 17 pgs.
U.S. Appl. No. 15/713,406, Final Rejection, dated Feb. 19, 2020, 22 pgs.
U.S. Appl. No. 15/717,889, Non-Final Rejection, dated Oct. 27, 2020, 40 pgs.
U.S. Appl. No. 15/911,993, Non-Final Rejection, Aug. 5, 2020, 6 pgs.
U.S. Appl. No. 15/969,749, Final Rejection, dated Feb. 26, 2020, 15 pgs.
U.S. Appl. No. 15/969,749, Non-Final Rejection, dated Sep. 17, 2020, 15 pgs.
U.S. Appl. No. 16/179,746, Advisory Action (Ptol-303), dated Sep. 15, 2020, 2 pgs.
U.S. Appl. No. 16/179,746, Examiner Interview Summary Record (Ptol-413), dated Nov. 5, 2020, 2 pgs.
U.S. Appl. No. 16/362,547, Advisory Action (Ptol-303), dated Nov. 18, 2020, 2 pgs.
U.S. Appl. No. 16/362,547, Examiner Interview Summary Record (Ptol-413), dated Nov. 18, 2020, 1 pg.
U.S. Appl. No. 16/362,547, Final Rejection, dated Sep. 24, 2020,14 pgs.
U.S. Appl. No. 16/362,547,Examiner Interview Summary Record (Ptol-413), dated Nov. 5, 2020, 2 pgs.
U.S. Appl. No. 16/426,323, Notice of Allowance and Fees Due (Ptol-85), dated Aug. 5, 2020, 11 pgs.
U.S. Appl. No. 16/451,371, NOA—Notice of Allowance and Fees Due (Ptol-85), dated Sep. 17, 2020, 5 pgs.
U.S. Appl. No. 16/451,371, Non-Final Rejection, dated Jun. 11, 2020, 9 pgs.
U.S. Appl. No. 16/586,868, Notice of Allowance and Fees Due (Ptol-85), dated Jul. 31, 2020, 13 pgs.
U.S. Appl. No. 16/586,868, Notice of Allowance and Fees Due (Ptol-85), dated Oct. 7, 2020, 2 pgs.
U.S. Appl. No. 16/586,868, USPTO e-Office Action: CTNF—Non-Final Rejection, dated Dec. 20, 2019, 19 pgs.
U.S. Appl. No. 16/726,090, Non-Final Rejection, dated Nov. 19, 2020, 12 pgs.
U.S. Appl. No. 16/778,981, Non-Final Rejection, dated Oct. 13, 2020, 7 pgs.
U.S. Appl. No. 14/800,638, Non Final Office Action dated Jul. 29, 2016, 11 pgs.
U.S. Appl. No. 12/101,883, Examiner Interview Summary dated Sep. 6, 2016, 3 pgs.
U.S. Appl. No. 12/101,883, Examiner Interview Summary dated Oct. 18, 2017, 2 pgs.
U.S. Appl. No. 13/464,588, Non Final Office Action Aug. 2, 2019, 14 pgs.
U.S. Appl. No. 14/530,669, Advisory Action dated Aug. 8, 2017, 5 pgs.
U.S. Appl. No. 14/530,669, Examiner Interview Summary dated Apr. 14, 2017, 3 pgs.
U.S. Appl. No. 14/530,669, Examiner Interview Summary dated Aug. 8, 2017, 2 pgs.
U.S. Appl. No. 14/530,669, Final Office Action dated Apr. 20, 2017, 25 pgs.
U.S. Appl. No. 14/530,669, Non Final Office Action dated Jan. 3, 2017, 26 pgs.
U.S. Appl. No. 14/530,671, Non Final Office Action dated Jan. 3, 2017, 32 pgs.
U.S. Appl. No. 14/539,814, Non Final Office Action dated Dec. 30, 2016, 37 pgs.
U.S. Appl. No. 14/539,889, Non-Final Office Action dated Oct. 6, 2016, 14 pages.
U.S. Appl. No. 14/800,638, Advisory Action dated May 9, 2017, 5 pgs.
U.S. Appl. No. 14/800,638, Examiner Interview Summary dated May 9, 2017, 2 pgs.
U.S. Appl. No. 14/800,638, Examiner Interview Summary dated Nov. 7, 2016, 3 pgs.
U.S. Appl. No. 14/800,638, Examiner Interview Summary dated Dec. 13, 2017, 1 pg.
U.S. Appl. No. 14/800,638, Final Office Action dated Jan. 20, 2017, 12 pgs.
U.S. Appl. No. 14/800,638, Non Final Office Action dated Jun. 15, 2017, 12 pgs.
U.S. Appl. No. 14/800,638, Notice of Allowance dated Dec. 13, 2017, 9 pgs.
U.S. Appl. No. 14/800,640, Advisory Action dated Jan. 5, 2018, 3 pgs.
U.S. Appl. No. 14/800,640, Advisory Action dated Feb. 8, 2018, 2 pgs.
U.S. Appl. No. 14/800,640, Examiner Interview Summary dated Feb. 8, 2018, 1 pg.
U.S. Appl. No. 14/800,640, Examiner Interview Summary dated Oct. 23, 2018, 3 pgs.
U.S. Appl. No. 14/800,640, Final Office Action dated Oct. 16, 2017, 15 pgs.
U.S. Appl. No. 14/800,640, Non Final Office Action dated Jun. 8, 2017, 14 pgs.
U.S. Appl. No. 14/800,640, Non Final Office Action dated Jul. 17, 2018, 16 pgs.
U.S. Appl. No. 14/800,640, Notice of Allowance dated Nov. 21, 2018, 7 pgs.
U.S. Appl. No. 14/800,640, Restriction Requirement dated Mar. 3, 2017, 5 pgs.
U.S. Appl. No. 14/800,642, Advisory Action dated Jan. 5, 2018, 3 pgs.
U.S. Appl. No. 14/800,642, Advisory Action dated Feb. 8, 2018, 3 pgs.
U.S. Appl. No. 14/800,642, Examiner Interview Summary dated Aug. 6, 2018, 1 pg.
U.S. Appl. No. 14/800,642, Final Office Action dated Oct. 17, 2017, 18 pgs.
U.S. Appl. No. 14/800,642, Non Final Office Action dated May 18, 2017, 17 pgs.
U.S. Appl. No. 14/800,642, Non-Final Office Action dated May 18, 2017, 17 pages.
U.S. Appl. No. 14/800,642, Notice of Allowance dated Aug. 6, 2018, 12 pgs.
U.S. Appl. No. 14/819,473, Examiner Interview Summary dated Jul. 11, 2016, 3 pgs.
U.S. Appl. No. 14/819,473, Examiner Interview Summary dated Aug. 17, 2016, 3 pgs.
U.S. Appl. No. 14/819,473, Examiner Interview Summary dated Oct. 14, 2016, 3 pages.
U.S. Appl. No. 14/819,473, Final Office Action dated Apr. 28, 2016, 45 pgs.
U.S. Appl. No. 14/819,473, Non Final Office Action dated Sep. 1, 2016, 36 pgs.
U.S. Appl. No. 14/819,473, Non Final Office Action dated Oct. 8, 2015, 44 pgs.
U.S. Appl. No. 14/860,983, Advisory Action dated Jan. 23, 2018, 3 pgs.
U.S. Appl. No. 14/860,983, Advisory Action dated Mar. 26, 2019, 2 pgs.

(56) References Cited

OTHER PUBLICATIONS

U.S. Appl. No. 14/860,983, Examiner Interview Summary dated Mar. 26, 2019, 2 pgs.
U.S. Appl. No. 14/860,983, Examiner Interview Summary dated Apr. 8, 2019, 3 pgs.
U.S. Appl. No. 14/860,983, Examiner Interview Summary dated Nov. 15, 2018, 3 pgs.
U.S. Appl. No. 14/860,983, Final Office Action dated Jan. 18, 2019, 19 pgs.
U.S. Appl. No. 14/860,983, Final Office Action dated Oct. 18, 2017, 21 pgs.
U.S. Appl. No. 14/860,983, Non Final Office Action dated Jun. 8, 2017, 26 pgs.
U.S. Appl. No. 14/860,983, Non Final Office Action dated Aug. 7, 2018, 22 pgs.
U.S. Appl. No. 15/408,211, Advisory Action dated Mar. 18, 2019, 4 pgs.
U.S. Appl. No. 15/408,211, Examiner Interview Summary dated Mar. 4, 2019, 3 pgs.
U.S. Appl. No. 15/408,211, Examiner Interview Summary dated Mar. 18, 2019, 2 pgs.
U.S. Appl. No. 15/408,211, Examiner Interview Summary dated Apr. 3, 2019, 3 pgs.
U.S. Appl. No. 15/408,211, Examiner Interview Summary dated Aug. 5, 2019, 3 pgs.
U.S. Appl. No. 15/408,211, Examiner Interview Summary dated Oct. 16, 2019, 2 pgs.
U.S. Appl. No. 15/408,211, Examiner Interview Summary dated Dec. 5, 2018, 3 pgs.
U.S. Appl. No. 15/408,211, Final Office Action dated Jan. 11, 2019, 23 pgs.
U.S. Appl. No. 15/408,211, Non Final Office Action dated Aug. 6, 2018, 22 pgs.
U.S. Appl. No. 15/408,211, Non Final Office Action dated May 2, 2019, 20 pgs.
U.S. Appl. No. 15/425,983, Advisory Action dated Oct. 12, 2018, 5 pgs.
U.S. Appl. No. 15/425,983, Examiner Interview Summary dated May 3, 2018, 3 pgs.
U.S. Appl. No. 15/425,983, Examiner Interview Summary dated May 17, 2018, 3 pgs.
U.S. Appl. No. 15/425,983, Examiner Interview Summary dated Sep. 28, 2018, 3 pgs.
U.S. Appl. No. 15/425,983, Examiner Interview Summary dated Oct. 12, 2018, 2 pgs.
U.S. Appl. No. 15/425,983, Examiner Interview Summary dated Dec. 12, 2018, 2 pgs.
U.S. Appl. No. 15/425,983, Final Office Action dated Jun. 26, 2018, 29 pgs.
U.S. Appl. No. 15/425,983, Non Final Office Action dated Jan. 11, 2018, 29 pgs.
U.S. Appl. No. 15/425,983, Notice of Allowance dated Dec. 12, 2018, 14 pgs.
Notice of Allowance dated Apr. 20, 2021 for U.S. Appl. No. 15/969,749 (pp. 1-5).
Notice of Allowance dated Jun. 17, 2021 for U.S. Appl. No. 15/604,938 (pp. 1-12).
Notice of Allowance dated May 3, 2021 for U.S. Appl. No. 15/632,709 (pp. 1-9).
Nützi, Gabriel, et al. "Fusion of IMU and vision for absolute scale estimation in monocular SLAM." Journal of intelligent & robotic Systems 61.1-4 (2011): 287-299. (Year: 2011).
Office Action (Final Rejection) dated Jan. 19, 2022 for U.S. Appl. No. 16/726,090 (pp. 1-16).
Office Action (Final Rejection) dated Apr. 25, 2022 for U.S. Appl. No. 16/813,506 (pp. 1-17).
Office Action (Final Rejection) dated Jul. 6, 2022 for U.S. Appl. No. 14/861,019 (pp. 1-36).
Office Action (Final Rejection) dated Jul. 22, 2022 for U.S. Appl. No. 15/427,030 (pp. 1-18).
Office Action (Final Rejection) dated Aug. 20, 2021 for U.S. Appl. No. 16/362,547 (pp. 1-15).
Office Action (Final Rejection) dated Sep. 2, 2022 for U.S. Appl. No. 16/362,547 (pp. 1-15).
Office Action (Non-Final Rejection) dated Mar. 21, 2022 for U.S. Appl. No. 14/861,019 (pp. 1-32).
Office Action (Non-Final Rejection) dated Mar. 24, 2022 for U.S. Appl. No. 16/362,547 (pp. 1-14).
Office Action (Non-Final Rejection) dated Apr. 14, 2022 for U.S. Appl. No. 17/338,217 (pp. 1-10).
Office Action (Non-Final Rejection) dated Sep. 12, 2022 for U.S. Appl. No. 16/813,506 (pp. 1-15).
Office Action (Non-Final Rejection) dated Sep. 16, 2022 for U.S. Appl. No. 17/373,737 (pp. 1-8).
Office Action (Non-Final Rejection) dated Sep. 22, 2021 for U.S. Appl. No. 16/726,090 (pp. 1-15).
Office Action (Non-Final Rejection) dated Oct. 4, 2022 for U.S. Appl. No. 17/352,654 (pp. 1-19).
Office Action (Non-Final Rejection) dated Oct. 5, 2022 for U.S. Appl. No. 17/483,573 (pp. 1-20).
Office Action (Non-Final Rejection) dated Oct. 5, 2022 for U.S. Appl. No. 17/519,452 (pp. 1-17).
Office Action (Non-Final Rejection) dated Oct. 14, 2021 for U.S. Appl. No. 15/427,030 (pp. 1-17).
Office Action (Non-Final Rejection) dated Oct. 28, 2021 for U.S. Appl. No. 16/813,506 (pp. 1-19).
Office Action (Non-Final Rejection) dated Nov. 10, 2021 for U.S. Appl. No. 16/389,544 (pp. 1-28).
Office Action (Notice of Allowance and Fees Due (PTOL-85)) dated May 18, 2022 for U.S. Appl. No. 16/389,544 (pp. 1-8).
Office Action (Notice of Allowance and Fees Due (PTOL-85)) dated Jun. 2, 2022 for U.S. Appl. No. 16/726,090 (pp. 1-7).
Office Action (Notice of Allowance and Fees Due (PTOL-85)) dated Jun. 29, 2022 for U.S. Appl. No. 17/338,217 (pp. 1-9).
Office Action (Notice of Allowance and Fees Due (PTOL-85)) dated Sep. 16, 2021 for U.S. Appl. No. 16/179,746 (pp. 1-5).
Office Action (Notice of Allowance and Fees Due (PTOL-85)) dated Sep. 29, 2021 for U.S. Appl. No. 15/717,889 (pp. 1-12).
Office Action (Notice of Allowance and Fees Due (PTOL-85)) dated Sep. 30, 2021 for U.S. Appl. No. 16/179,746 (pp. 1-2).
Office Action (Notice of Allowance and Fees Due (PTOL-85)) dated Oct. 15, 2021 for U.S. Appl. No. 16/179,746 (pp. 1-2).
Office Action dated Apr. 1, 2021 for U.S. Appl. No. 15/427,030 (pp. 1-18).
Office Action dated Apr. 1, 2021 for U.S. Appl. No. 16/389,544 (pp. 1-29).
Office Action dated Apr. 9, 2021 for U.S. Appl. No. 16/554,996 (pp. 1-29).
Office Action dated Jun. 3, 2021 for U.S. Appl. No. 16/179,746 (pp. 1-26).
Office Action dated Mar. 12, 2021 for U.S. Appl. No. 16/726,090 (pp. 1-14).
Office Action dated Mar. 23, 2021 for U.S. Appl. No. 16/362,547 (pp. 1-15).
Pollard, Stephen et al., "Automatically Synthesising Virtual Viewpoints by Trinocular Image Interpolation—Detailed Report", HP, Technical Report, HP Laboratories Bristol HPL-97-166, Dec. 1997, 40 pgs.
Prisacariu, Victor A. et al., "Simultaneous 3D Tracking and Reconstruction on a Mobile Phone", IEEE International Symposium on Mixed and Augmented Reality, 2013, pp. 89-98.
Qi Pan et al., "Rapid Scene Reconstruction on Mobile Phones from Panoramic Images", Oct. 2011, pp. 55-64 (Year: 2011).
Russell, Bryan C, et al. "LabelMe: a database and web-based tool forimage annotation." International Journal of Computer vision 77.1-3 (2008): 157-173. (Year: 2008).
Saito, Hideo et al., "View Interpolation of Multiple Cameras Based on Projective Geometry", Department of Information and Computer Science, Keio University and Presto, Japan Science and Technology Corporation (JST), retrieved from the Internet <http://citeseerx.ist.psu.edu/viewdoc/download?doi=10.1.1.6.5162&rep=r ep1&type=pdf>, 6 pages. (2002).

(56) References Cited

OTHER PUBLICATIONS

Schiller, Ingo, et al., Datastructure for Capturing Dynamic Scenes with a Time-of-Flight Camera, Springer-Verlad, Dyna3D 2009, LNCS 5742, 42-57 pgs.

Seitz, Steven M., "Image-Based Transformation of Viewpoint and Scene Appearance", A Dissertation submitted in partial fulfillment of the requirements for the Degree of Doctor of Philosophy at the University of Wisconsin; retrieved from the Internet <http://homes.cs.washington.edu/~seitz/papers/thesis.pdf>, 1997, 111 pages.

Shade, Jonathan et al., "Layered Depth Images", Proceedings of the 25th Annual Conference on Computer Graphics and Interactive Techniques, ACM, SIGGRAPH, Jul. 24, 1998, pp. 231-242.

Shin, Hong-Chang et al., "Fast View Synthesis using GPU for 3D Display", IEEE Transactions on Consumer Electronics, vol. 54, No. 4, Dec. 2008, pp. 2068-2076.

Snavely, Noah et al., "Photo Tourism: Exploring Phot Collections in 3D", ACM, ACM Transactions on Graphics (TOG)—Proceeding of ACM SIGGRAPH 2006, vol. 25, Issue 3, Jul. 2006, 835-846.

Steder, Bastian et al., "Robust On-line Model-based Object Detection from Range Images", International Conference on Intelligent Robots and Systems, pp. 4739-4744, Oct. 15, 2009, 6 pages.

Supplemental Notice of Allowability dated May 5, 2021 for U.S. Appl. No. 15/969,749 (pp. 1-2).

Thyssen, Anthony , "ImageMagick v6 Examples—Color Basics and Channels", Website http://www.imagemagick.org/Usage/color basics/, Retrieved Dec. 23, 2016, Mar. 9, 2011, 31 pgs.

Torr, P.H.S et al., "Robust Parameterization and Computation of the Trifocal Tensor", Elsevier, Image and Vision Computing, vol. 15, Issue 8, Aug. 1997, pp. 591-605.

United Kingdom Application Serial No. 1609577.0, Office Action dated Jun. 15, 2016, 1 pg.

U.S. Appl. No. 15/425,988, Examiner Interview Summary dated Nov. 30, 2018, 3 pages.

U.S. Appl. No. 15/425,988, Non Final Office Action dated Aug. 10, 2018, 18 pgs.

U.S. Appl. No. 15/425,988, Notice of Allowance dated Dec. 28, 2018, 8 pgs.

U.S. Appl. No. 15/426,994, Advisory Action dated Dec. 13, 2018, 3 pgs.

U.S. Appl. No. 15/426,994, Examiner Interview Summary dated Jan. 15, 2019, 3 pgs.

U.S. Appl. No. 15/426,994, Final Office Action dated Oct. 10, 2018, 21 pgs.

U.S. Appl. No. 15/426,994, Non Final Office Action dated Apr. 19, 2018, 22 pgs.

U.S. Appl. No. 15/426,994, Non Final Office Action dated Aug. 6, 2019, 22 pgs.

U.S. Appl. No. 15/427,009, Notice of Allowance dated Sep. 6, 2018, 9 pgs.

U.S. Appl. No. 15/428,104, Advisory Action dated Dec. 13, 2018, 3 pgs.

U.S. Appl. No. 15/428,104, Examiner Interview Summary dated Jan. 15, 2019, 3 pgs.

U.S. Appl. No. 15/428,104, Examiner Interview Summary dated Dec. 7, 2018, 3 pgs.

U.S. Appl. No. 15/428,104, Final Office Action dated Oct. 10, 2018, 23 pgs.

U.S. Appl. No. 15/428,104, Non Final Office Action dated Apr. 19, 2018, 21 pgs.

U.S. Appl. No. 15/428,104, Non Final Office Action dated Aug. 6, 2019, 24 pgs.

U.S. Appl. No. 15/620,506, Advisory Action dated Aug. 26, 2019, 2 pgs.

U.S. Appl. No. 15/620,506, Examiner Inteview Summary dated Aug. 26, 2019, 1 pg.

U.S. Appl. No. 15/620,506, Final Office Action dated Jun. 10, 2019, 17 pgs.

U.S. Appl. No. 15/620,506, Non-Final Office Action dated Jan. 23, 2019, 13 pages.

U.S. Appl. No. 15/632,709, Examiner Interview Summary dated Apr. 30, 2018, 1 pg.

U.S. Appl. No. 15/632,709, Final Office Action dated Jul. 17, 2018, 12 pgs.

U.S. Appl. No. 15/632,709, Non Final Office Action dated Apr. 3, 2019, 13 pgs.

U.S. Appl. No. 15/632,709, Non Final Office Action dated Apr. 30, 2018, 14 pgs.

U.S. Appl. No. 15/632,709, Notice of Allowance dated May 3, 2021, 9 pgs.

U.S. Appl. No. 15/673, 125, Examiner Interview Summary dated Aug. 1, 2019, 3 pgs.

U.S. Appl. No. No. 15/673,125, Final Office Action dated Jun. 3, 2019, 17 pgs.

U.S. Appl. No. 15/673,125, Non Final Office Action dated Feb. 6, 2019, 17 pgs.

U.S. Appl. No. 15/682,362, Notice of Allowance dated Oct. 22, 2018, 9 pgs.

U.S. Appl. No. 15/713,406, Examiner Interview Summary dated Aug. 2, 2019, 3 pgs.

U.S. Appl. No. 15/713,406, Final Office Action dated Jun. 3, 2019, 21 pgs.

U.S. Appl. No. 15/713,406, Non Final Office Action dated Jan. 30, 2019, 21 pgs.

U.S. Appl. No. 15/717,889, Advisory Action dated Jul. 6, 2021, 3 pgs.

U.S. Appl. No. 15/717,889, Examiner Interview Summary dated Jun. 4, 2021, 2 pgs.

U.S. Appl. No. 15/717,889, Examiner Interview Summary dated Jul. 6, 2021, 2 pgs.

U.S. Appl. No. 15/717,889, Final Office Action dated Mar. 4, 2021, 37 pgs.

U.S. Appl. No. 15/724,081, Examiner Interview Summary dated Mar. 4, 2019, 3 pgs.

U.S. Appl. No. 15/724,081, Examiner Interview Summary dated Jul. 30, 2019, 3 pgs.

U.S. Appl. No. 15/724,081, Examiner Interview Summary dated Aug. 20, 2019, 2 pgs.

U.S. Appl. No. 15/724,081, Final Office Action dated May 14, 2019, 14 pgs.

U.S. Appl. No. 15/724,081, Non Final Office Action dated Dec. 11, 2018, 12 pgs.

U.S. Appl. No. 15/724,081, Notice of Allowance dated Aug. 20, 2019, 12 pgs.

U.S. Appl. No. 15/724,087, Final Office Action dated Jul. 1, 2019, 16 pgs.

U.S. Appl. No. 15/724,087, Non Final Office Action dated Jan. 31, 2019, 15 pgs.

U.S. Appl. No. 15/911,993, Notice of Allowance dated Jan. 12, 2021, 8 pgs.

U.S. Appl. No. 15/963,896, Non Final Office Action dated Apr. 18, 2019, 7 pgs.

U.S. Appl. No. 15/963,896, Notice of Allowance dated May 22, 2019, 8 pgs.

U.S. Appl. No. 15/969,749, Examiner Interview Summary dated Apr. 20, 2021, 1 pg.

U.S. Appl. No. 16/179,746, Examiner Interview Summary dated Jun. 3, 2021, 1 pg.

U.S. Appl. No. 16/179,746, Final Office Action dated Jun. 3, 2021, 25 pgs.

U.S. Appl. No. 16/179,746, Non-Final Office Action dated Feb. 11, 2021, 25 pgs.

U.S. Appl. No. 16/362,547, Examiner Interview Summary dated Jul. 12, 2021, 2 pgs.

U.S. Appl. No. 16/362,547, Non-Final Office Action dated Mar. 23, 2021, 14 pgs.

U.S. Appl. No. 16/384,578, Corrected Notice of Allowance dated Nov. 26, 2019, 2 pgs.

U.S. Appl. No. 16/384,578, Non Final Office Action dated May 9, 2019, 9 pgs.

U.S. Appl. No. 16/726,090, Advisory Action dated Jun. 21, 2021, 3 pgs.

(56) References Cited

OTHER PUBLICATIONS

U.S. Appl. No. 16/726,090, Examiner Interview Summary dated Feb. 25, 2021, 3 pgs.
U.S. Appl. No. 16/726,090, Examiner Interview Summary dated Jun. 21, 2021, 1 pg.
U.S. Appl. No. 16/778,981, Corrected Notice of Allowance dated Mar. 31, 2021, 11 pgs.
U.S. Appl. No. 16/778,981, Examiner Interview Summary dated Mar. 31, 2021, 1 pg.
U.S. Appl. No. 16/778,981, Notice of Allowance dated Mar. 9, 2021, 9 pgs.
Ballan, Luca etal., "Unstructured Video-Based Rendering: Interactive Exploration of Casually Captured Videos", ACM, ACM Transactions on Graphics (TOG)—Proceedings of ACM SIGGRAPH 2010, vol. 29, Issue 4, Article No. 87, Jul. 30, 2010, 11 pages.
Belongie, Serge, Jitendra Malik, and Jan Puzicha. "Shape matching and object recognition using shape contexts." IEEE Transactions on Pattern Analysis & Machine Intelligence 4 (2002): 509-522. (Year: 2002).
Buehler, Chris et al., "Unstructured Lumigraph Rendering", ACM, ACM SIGGRAPH, 2001, pp. 425-432.
Bulat et al.; "Human pose estimation via convolutional part heatmap regression," In ECCV, 2016 (Year: 2016) 16 pages.
Cao, Xun et al., "Semi-Automatic 2D-to-3D Conversion Using Disparity Propagation", IEEE, IEEE Transactions on Broadcasting, vol. 57, Issue 2, Apr. 19, 2011, pp. 491-499.
Chan, Shing-Chow et al., "An Object-Based Approach to Image/Video-Based Synthesis and Processing for 3-D and Multiview Televisions", IEEE, IEEE Transactions on Circuits and Systems for Video Technology, vol. 19, Issue 6, Mar. 16, 2009, pp. 821-831.
Chen, Shenchang E. , "QuickTime VR—An Image-Based Approach to Virtual Environment Navigation", ACM, SIGGRAPH '95 Proceedings of the 22nd annual Conference on Computer graphics and interactive techniques, 1995, 29-38.
Cläre, Adam , "Reality is a Game; What is Skybox?", retrieved from the Internet <http://www.realityisagame.com/archives/1776/what-is-a-skybox/>, Mar. 28, 2013, 5 pgs.
Davis, Abe et al., "Unstructured Light Fields", Blackwell Publishing, Computer Graphics Forum, vol. 31, Issue 2, Pt. 1, May 2012, pp. 305-314.
English Translation of CN104462365A (Year: 2015).
Extract all frames from video files, Video Help Forum, Oct. 2010, 3 pages.
Figueroa, Nadia, et al., "From Sense to Print: Towards Automatic 3D Printing from 3D Sensing Devices", IEEE, IEEE International Conference on Systems, Man, and Cybernetics (SMC, Oct. 13, 2013) 8 pages.
Fischler, Martin A.., et al., Random Sample Consensus: A Paradigm for Model Fitting with Applications to Image Analysis and Automated Cartography, ACM, Communications of the ACM, vol. 24, No. 6, Jun. 1981, 381-395 pgs.
Fitzgibbon, Andrew , "Automatic 3D Model Acquisition and Generation of New Images from Video Sequences", IEEE, 9th European Signal Processing Conference, Sep. 1998, 8 pgs.
Fusiello, Andrea et al., "View Synthesis from Uncalibrated Images Using Parallax", Proceedings of the 12th International Conference on Image Analysis and Processing, 2003, pp. 146-151.
Fusiello, Andrea, Specifying Virtual Cameras In Uncalibrated View Synthesis, IEEE Transactions on Circuits and Systems for Video Technology, vol. 17, No. 5, May 2007, 8 pages.
Gatys et al., "A Neural Algorithm of Artistic Style", Cornell University, arXiv: 1508.06576v2 pp. 1-16. (Year: 2015).
Gibson, Simon, et al., Accurate Camera Calibration for Off-line, Video-Based Augmented Reality, IEEE, Proceedings of the International Symposium on Mixed and Augmented Reality (ISMAR'02) 10 pages.
Golovinskly, Aleksey et al., "Shape-based Recognition of 3D Point Clouds in Urban Environment", IEEE, IEEE 12th International Conference on Computer Vision (ICCV), 2009, 2154-2161.
Gurdan, Tobias et al., "Spatial and Temporal Interpolation of MultiView Image Sequences", Department of Computer Science, Technische Universität München Ascending Technologies GmbH, Krailing, Germany, Section 2.3, Image Warping and Blending; Retrieved from the Internet <https://vision.in.tum.de/ media/spezial/bib/gurdan-et-al-gcpr-2014.pdf>, 12 pages.
Haines, Russell, U.S. Appl. No. 62/380,914, Specification and Drawings, p. 1-24 (Year: 2016).
International Application Serial No. PCT/US19/28807 Preliminary Report on Patentability dated Nov. 5, 2020, 9 pgs.
International Application Serial No. PCT/US19/28807 Search Report and Written Opinion dated Oct. 8, 2019, 12 pgs.
International Application Serial No. PCT/US19/30395, Preliminary Report on Patentability dated Nov. 12, 2020, 7 pgs.
International Application Serial No. PCT/US19/58204, Preliminary Report on Patentability dated May 14, 2021, 7 pgs.
International Application Serial No. PCT/US2016/042355, Search Report and Written Opinion dated Oct. 19, 2016, 9 pgs.
International Application Serial No. PCT/US2019/058204, Search Report and Written Opinion dated Apr. 21, 2020, 10 pages.
Intl Application Serial No. PCT/US17/47684, Intl Preliminary Report on Patentability dated Feb. 28, 2019, 7 pgs.
Intl Application Serial No. PCT/US17/47684, Intl Search Report and Written Opinion dated Oct. 27, 2017, 8 pgs.
Intl Application Serial No. PCT/US17/47859, Intl Preliminary Report on Patentability dated Feb. 28, 2019, 7 pgs.
Intl Application Serial No. PCT/US17/47859, Intl Search Report and Written Opinion dated Nov. 2, 2017, 8 pgs.
Intl Application Serial No. PCT/US19/030395, Intl Search Report and Written Opinion dated Sep. 2, 2019, 9 pgs.
Intl Application Serial No. PCT/US2014/065282, Search Report & Written Opinion dated Feb. 23, 2015, 9 pgs.
Keller, Maik et al., "Real-Time 3D Reconstruction in Dynamic Scenes Using Point-Based Fusion", IEEE, 2013 International Conference on 3DTV, Jul. 1, 2013, 8 pages.
Klappstein, Jens, et al., Moving Object Segmentation Using Optical Flow and Depth Information, Springer, In: Wada T., Huang F., Lin S. (eds) Advances in Image and Video Technology. PSIVT 2009. LectureNotes in Computer Science, vol. 5414, 611-623 pgs.
Kottamasu, V. L. P. , "User Interaction of One-Dimensional Panoramic Images for iPod Touch", Thesis, Linkoping University Electronic Press, LIU-IDA-LITH-EX-A-12/071-SE, Dec. 4, 2012, 70 pages.
Li, Mingyang, Byung Hyung Kim, and Anastasius 1. Mourikis. "Real-time motion tracking on a cellphone using inertial sensing and a rolling-shutter camera." 2013 IEEE International Conference on Robotics and Automation. IEEE, 2013. (Year: 2013) 8 pages.
Matsunobu, Tom etal., U.S. Appl. No. 62/457,276, Specification, p. 1-19 (Year: 2017).
Mian, Ajmal S. et al., "Three-Dimensional Model-Based Object Recognition and Segmentation in Cluttered Scenes", IEEE Transactions on Pattern Analysis and Machine Intelligence, col. 28, No. 10, Oct. 2006, 1584-1601.
Mikolajczyk, Krystian, et al., A Performance Evaluation of Local Descriptors, IEEE Transactions on Pattern Analysis and Machine Intelligence, vol. 27, No. 10, Oct. 2005, 1615-1630.
Utasi, Ákos, and Csaba Benedek. "A multi-view annotation tool for people detection evaluation." Proceedings of the Ist International Workshop on Visual interfaces forground truth collection in Computer vision applications. ACM, 2012. (Year: 2012) 7 pages.
Weigel, Christian, et al., Advanced 3D Video Object Synthesis Based on Trilinear Tensors, IEEE Tenth International Symposium on Consumer Electronics, 2006, 5 pages.
Xiao, Jiangjian et al., "Tri-view Morphing", Elsevier, Computer Vision and Image Understanding, vol. 96, Issue 3, Dec. 2004, pp. 345-366.
Z. Cao et al., 'Realtime Multi-Person 2D Pose Estimation using Part Affinity Fields', In Proceedings of the IEEE Conference on Computer Vision and Pattern Recognition, Apr. 14, 2017, pp. 1-9 sections 2-3; and figure 2.
Zhang, Guofeng, et al., Video stabilization based on a 3D perspective camera model, Springer, The Visual Computer (2009) 25, 997 pg.

(56) References Cited

OTHER PUBLICATIONS

Zhang, Zhengyou, et al., A robust technique for matching two uncalibrated images through the recovery of the unknown epipolar geometry, Elsevier, Artificial Intelligence 78, 1995, 87-119 pgs.

Zheng, et al., Conditional Random Fields as Recurrent Neural Networks, IEEE International Conference on Computer Vision, 2016, 1529-1537 pgs.

Jaesik Choi, Ziyu Wang, Sang-Chul Lee, Won J. Jeon. A spatio-temporal pyramid matching for video retrieval. Computer Vision and Image Understanding. vol. 117, Issue 6. 2013. pp. 660-669 (Year: 2013).

Office Action (Final Rejection) dated Jan. 18, 2023 for U.S. Appl. No. 17/352,654 (pp. 1-21).

Office Action (Final Rejection) dated Feb. 17, 2023 for U.S. Appl. No. 17/519,452 (pp. 1-18).

Office Action (Final Rejection) dated Feb. 21, 2023 for U.S. Appl. No. 17/483,573 (pp. 1-23).

Office Action (Final Rejection) dated Apr. 19, 2023 for U.S. Appl. No. 16/813,506 (pp. 1-14).

Office Action (Non-Final Rejection) dated Jan. 10, 2023 for U.S. Appl. No. 15/427,030 (pp. 1-5).

Office Action (Non-Final Rejection) dated Mar. 27, 2023 for U.S. Appl. No. 17/519,457 (pp. 1-12).

Office Action (Non-Final Rejection) dated Mar. 30, 2023 for U.S. Appl. No. 17/814,821 (pp. 1-10).

Office Action (Non-Final Rejection) dated Mar. 30, 2023 for U.S. Appl. No. 17/814,823 (pp. 1-17).

Office Action (Notice of Allowance and Fees Due (PTOL-85)) dated Jan. 17, 2023 for U.S. Appl. No. 17/373,737 (pp. 1-5).

Office Action (Notice of Allowance and Fees Due (PTOL-85)) dated Jan. 19, 2023 for U.S. Appl. No. 16/362,547 (pp. 1-5).

Office Action (Notice of Allowance and Fees Due (PTOL-85)) dated Feb. 1, 2023 for U.S. Appl. No. 16/362,547 (pp. 1-2).

\* cited by examiner

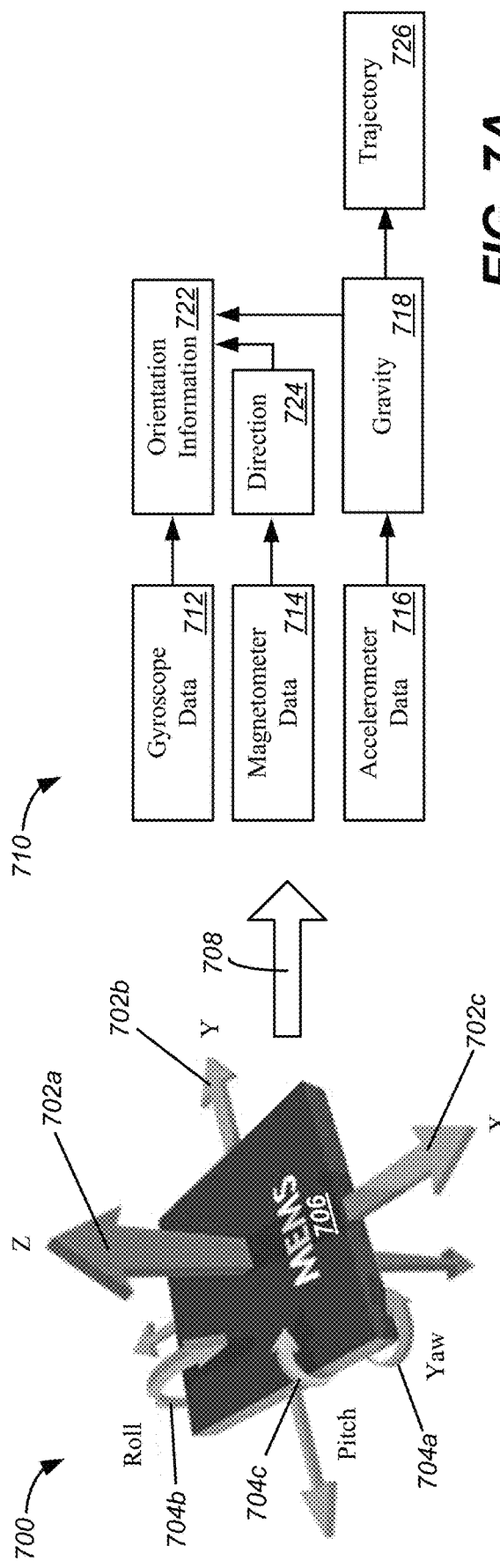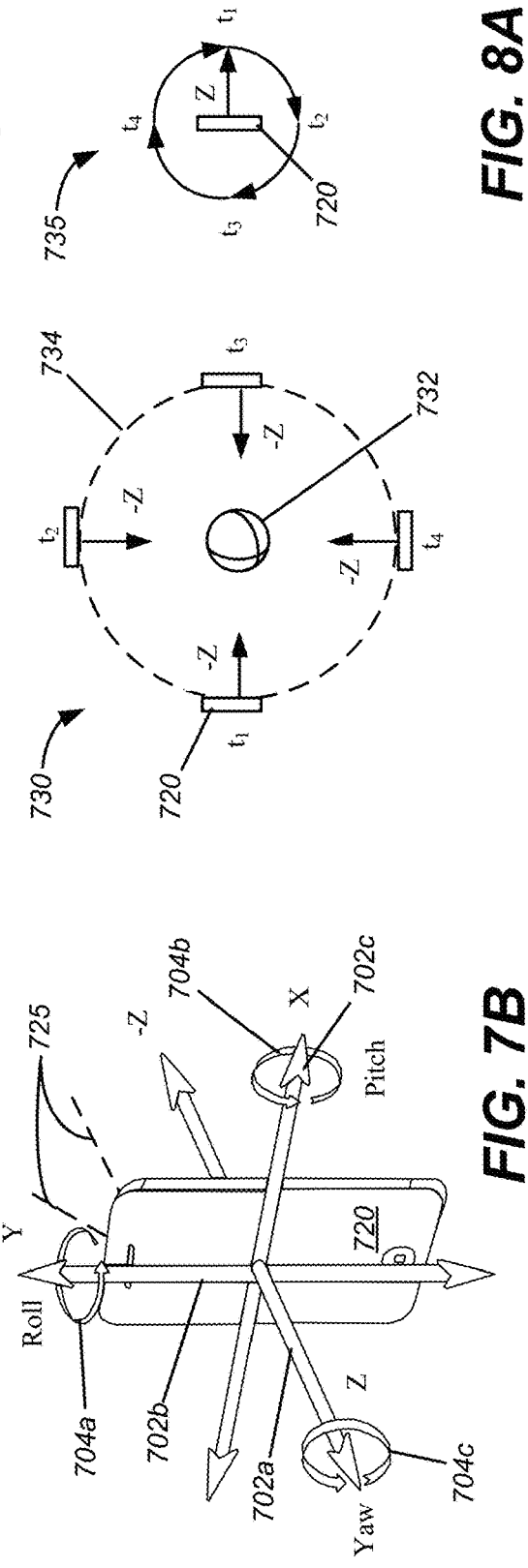
FIG. 7A
FIG. 7B
FIG. 8A

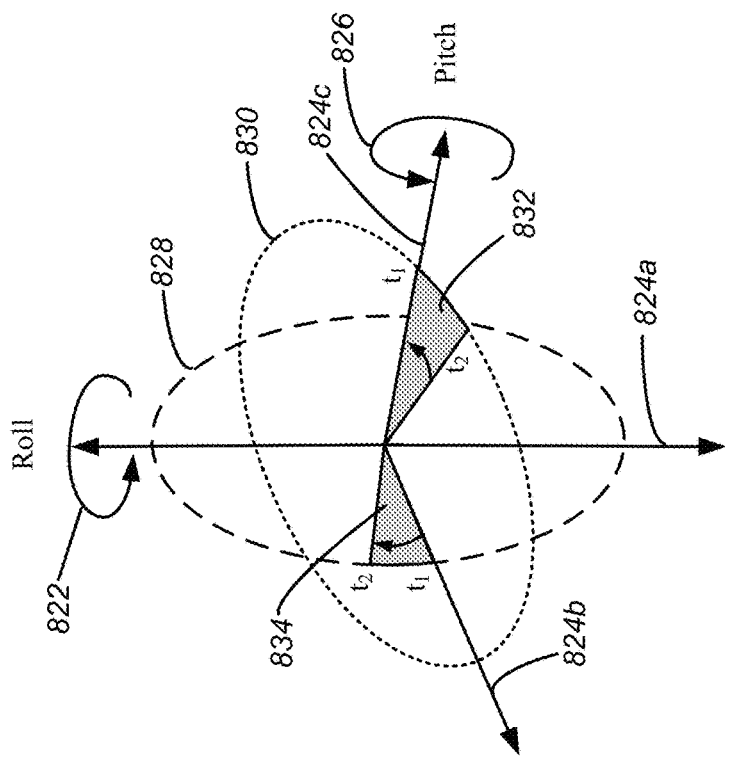
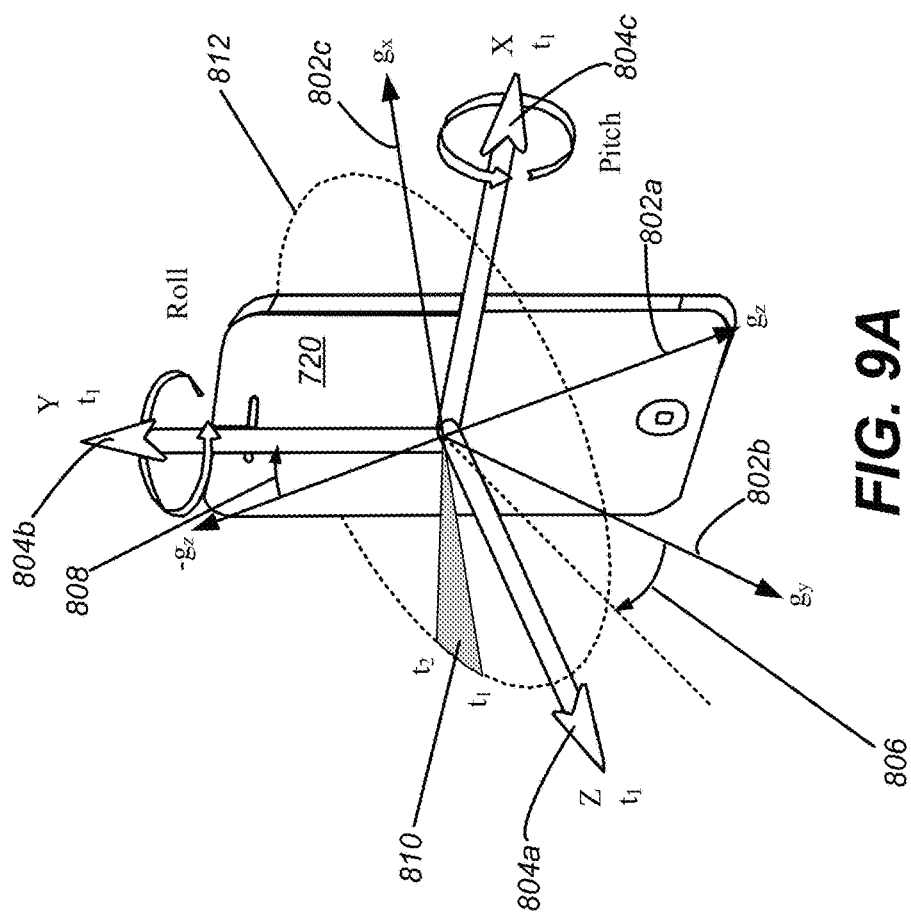
FIG. 9B
FIG. 9A

SNAPSHOTS AT PREDEFINED INTERVALS OR ANGLES

CROSS-REFERENCE TO RELATED APPLICATIONS

This patent document is a continuation of and claims priority to U.S. patent application Ser. No. 16/389,544 by Trevor et al., filed on May 19, 2019, entitled, "SNAPSHOTS AT PREDEFINED INTERVALS OR ANGLES," which is a continuation of and claims priority to U.S. patent application Ser. No. 15/601,863 by Trevor et al., filed on May 22, 2017, entitled, "SNAPSHOTS AT PREDEFINED INTERVALS OR ANGLES," now U.S. Pat. No. 10,313,651, issued on Jun. 4, 2019, both of which are hereby incorporated by reference in their entirety and for all purposes.

TECHNICAL FIELD

The present disclosure relates to generating and manipulating multi-view interactive digital media representations.

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Current predictions (Ref: KPCB "Internet Trends 2012" presentation") indicate that every several years the quantity of visual data that is being captured digitally online will double. As this quantity of visual data increases, so does the need for much more comprehensive search and indexing mechanisms than ones currently available. Unfortunately, neither 2D images nor 2D videos have been designed for these purposes. Accordingly, improved mechanisms that allow users to view and index visual data, as well as query and quickly receive meaningful results from visual data are desirable.

OVERVIEW

Various embodiments of the present invention relate generally to systems and methods for analyzing and manipulating images and video. According to particular embodiments, the spatial relationship between multiple images and video is analyzed together with location information data, for purposes of creating a representation referred to herein as a multi-view interactive digital media representations. The multi-view interactive digital media representations can be output to a device with a display, such as a mobile device, tablet computer or laptop computer.

Multi-view interactive digital media representations can include images of an object from many different viewing angles. Images with viewing angles about a common axis can be grouped together. These images can be provided in a sequence where the viewing angle changes from image to image in the sequence in an orderly manner. Thus, as the sequence of images is viewed on a display, the object can appear to rotate about the common axis. In particular embodiments, a multi-view interactive digital media representation can be provided with images with viewing angles about one or more axes. Thus, when viewed the object in the multi-view interactive digital media representation can appear to rotate about the one or more axes.

In more detail, a multi-view interactive digital media representation can be generated from live images captured from a camera. The live images can include an object. An angular view of the object captured in the live images can be estimated using sensor data from an inertial measurement unit such that an angular view can be associated with each of the live image. The angular view associated with each live image can be used select live images. For example, live images separated by an angular view amount, such as one, two, three, five, ten degrees, etc., can be selected.

The multi-view interactive digital media representation can include a plurality of images where each of the plurality of images includes the object from a different camera view. For example, the live images separated by an angular view amount can be selected. When the plurality of images is output to a display, the object can appear to undergo a 3-D rotation through the determined angular view where the 3-D rotation of the object is generated without a 3-D polygon model of the object.

One method can be generally characterized, as comprising, on a mobile device including a processor, a memory, a camera, an inertial measurement unit, a microphone, a GPS sensor and a touchscreen display, receiving a request to generate a multi-view interactive digital media representation of an object. Then, a sequence live images can be received from the camera on the mobile device where the live images can include 2-D pixel data. The camera can move along a path where an orientation of the camera varies along the path such that the object in the sequence of the live images is captured from a plurality of camera views.

Based upon sensor data from the inertial measurement unit, angular changes in the orientation of the camera along the path can be determined. Based upon the angular changes, an angular view of the object captured in the sequence of the live images can be determined. From the sequence of the live images, the multi-view interactive digital media representation can be generated.

The multi-view interactive digital media representation can include a plurality of images where each of the plurality of images can include the object from a different camera view. When the plurality of images is output to the touchscreen display, the object can appear to undergo a 3-D rotation through the angular view where the 3-D rotation of the object is generated without a 3-D polygon model of the object. A value of the angular view of the object captured in the multi-view interactive digital media representation can output, such as via the touchscreen display.

In another embodiment, a method can be generated on a mobile device. The mobile device can include a processor, a memory, a camera, an inertial measurement unit, a microphone and a touchscreen display. The method can be generally characterized as 1) receiving, via an input interface, on the mobile device, a request to generate a multi-view interactive digital media representation of an object, 2) receiving via the input interface an angle profile where the angle profile can include a plurality of angles or angle information used to determine the plurality of angles, 3) receiving live images from the camera on the mobile device as the mobile device moves along a path where an orientation of the camera varies along the path such that the object in the live images is captured from a plurality of camera views; 4) based upon sensor data from the inertial measurement unit, determining angular changes in the orientation of the camera along the path; 5) based upon the angular changes, determining an angular view of the object captured in each of the live images; 6) based upon the determined angular view of the object in each of the live images and the plurality of angles in the angle profile, selecting a sequence of images from among the live images where one of the live images is selected for each of the plurality of angles; and 7) generating from the sequence of the images the multi-view interactive digital media representation. The multi-view interactive digital media representation can include a plurality of images where each of the plurality of images includes the object from a different camera view. When the plurality of images is output to the touchscreen display the object appears to undergo a 3-D rotation through the angular view wherein the 3-D rotation of the object is generated without a 3-D polygon model of the object.

BRIEF DESCRIPTION OF THE DRAWINGS

The disclosure may best be understood by reference to the following description taken in conjunction with the accompanying drawings, which illustrate particular embodiments of the present invention.

FIG. 7A illustrates a sensor package for determining orientation of a camera used to generate a MVIDMR in accordance with embodiments of the present invention.

FIG. 7B illustrates a mobile device and body-centric coordinate system in accordance with embodiments of the present invention.

FIGS. 8A and 8B illustrate roll orientations of a mobile device with a camera as a function of time along a path during MVIDMR generation depicted in different coordinate systems in accordance with embodiments of the present invention.

FIGS. 8C and 8D illustrates rotations of a mobile device with a camera about an axis as a function of time for paths shown in FIG. 8B in accordance with embodiments of the present invention.

FIG. 9A illustrates pitch and roll of a mobile device and angle changes as a function of time relative to the gravity vector during MVIDMR generation in accordance with embodiments of the present invention.

FIG. 9B illustrates pitch and roll of a mobile device and angle changes as a function of time relative to an arbitrary axis during MVIDMR generation in accordance with embodiments of the present invention.

DETAILED DESCRIPTION

Figure 1:
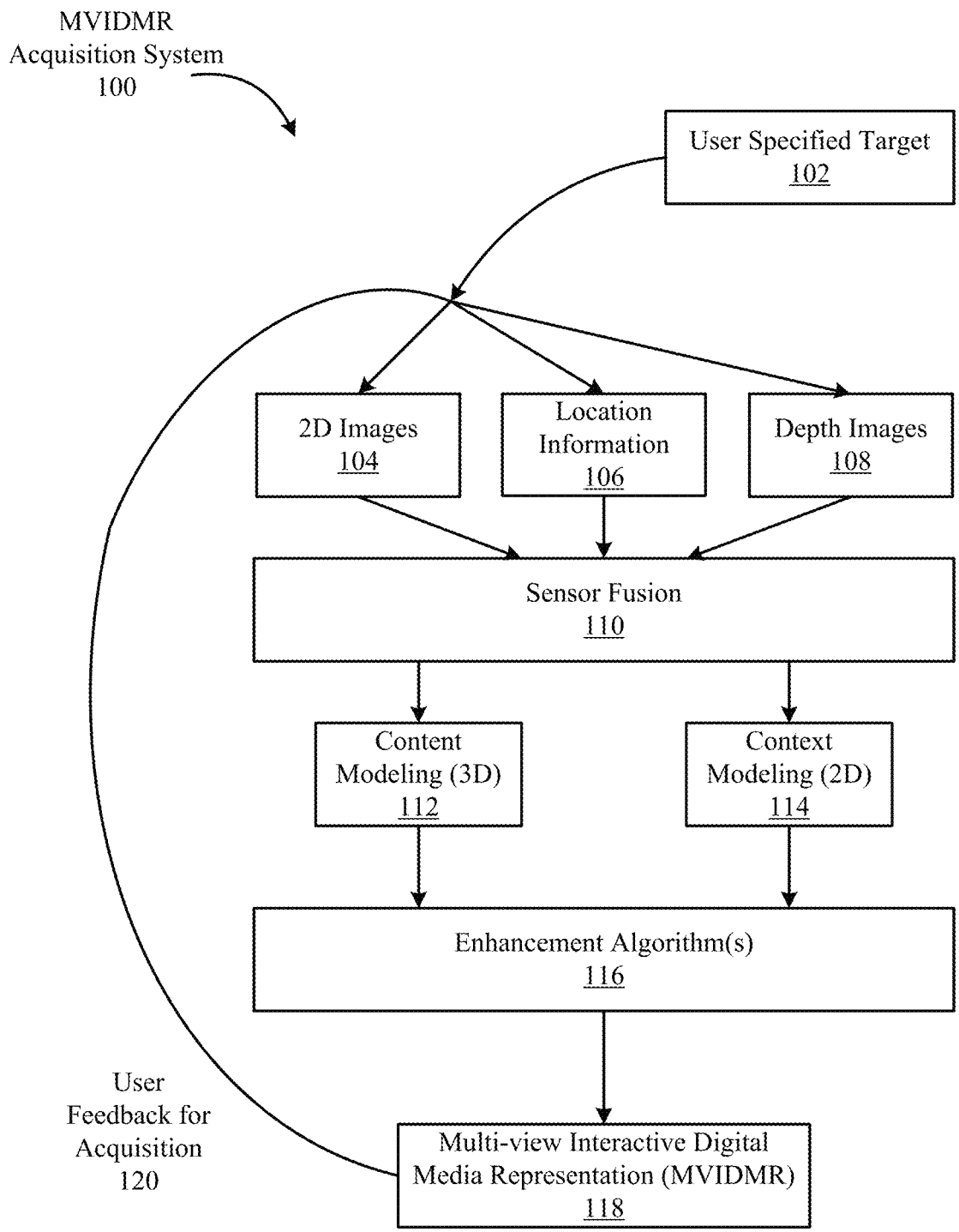
FIG. 1 illustrates an example of a multi-view interactive digital media representation acquisition system in accordance with embodiments of the present invention.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various aspects of the present invention relate generally to systems and methods for analyzing the spatial relationship between multiple images and video together with location information data, for the purpose of creating a single representation, a multi-view interactive digital media representation (MVIDMR), which eliminates redundancy in the data, and presents a user with an interactive and immersive active viewing experience. According to various embodiments, active is described in the context of providing a user with the ability to control the viewpoint of the visual information displayed on a screen.

Next, with respect to FIGS. 1-16 methods and apparatus for acquiring image data and generating a multi-view interactive digital media representations (MVIDMRs) are discussed. In particular, an example of MVIDMR system is discussed with respect to FIG. 1. An example of a process flow for generating an MVIDMR is described. With respect to FIG. 3, one example of multiple camera views that can be fused into a three-dimensional (3D) model to create an immersive experience is discussed. With respect to FIG. 4, one example of separating content and context for MVIDMR generation is described. Examples of concave view and convex views, respectively, where both views use a back-camera capture style are described with respect to FIGS. 5A and 5B. Various capture modes, which can be used in MVIDMR generation, are discussed with respect to FIGS. 6A to 6D.

With respect to FIGS. 7A to 15, system and methods for generating multi-view interactive digital media representations (MVIDMRs) using angle measurements derived from sensor data are described. In more detail, with respect to FIGS. 7A and 7B, sensor packages, their integration into a mobile device and sensor outputs are described. With respect to FIGS. 8A to 9B, rotation metrics determined from IMU data, which can be generated for a MVIDMR, are described. With respect FIGS. 10A, 10B and 11, the application of rotation metrics to MVIDMR generation for different image capture paths are discussed. A method of MVIDMR generation is described with respect to FIG. 12.

With respect to FIG. 13A, a setup for generating an MVIDMR including a three hundred sixty degree of an object is discussed. With respect to FIG. 13B, live images selected for use in an MVIDMR based upon angle estimation using IMU data are described. The live images are generated using the setup in FIG. 13A. With respect to FIG. 14, different angle profiles for selecting live images for using in an MVIDMR are discussed. An example of a process flow for generating a MVIDMR using IMU data for image selection is described with respect to FIG. 15. Finally, with respect to FIG. 16, an example of an apparatus, which can be used during MVIDMR generation, is discussed.

With reference to FIG. 1, shown is one example of a multi-view interactive digital media representation acquisition system 100. In the present example embodiment, the multi-view interactive digital media representation acquisition system 100 is depicted in a flow sequence that can be used to generate a multi-view interactive digital media representation. According to various embodiments, the data used to generate a multi-view interactive digital media representation can come from a variety of sources.

In particular, data such as, but not limited to two-dimensional (2D) images 104 can be used to generate a multi-view interactive digital media representation. These 2D images can include color image data streams such as multiple image sequences, video data, etc., or multiple images in any of various formats for images, depending on the application. Another source of data that can be used to generate a multi-view interactive digital media representation includes environment information 106. This environment information 106 can be obtained from sources such as accelerometers, gyroscopes, magnetometers, GPS, WiFi, IMU-like systems (Inertial Measurement Unit systems), and the like. Some methods of utilizing the IMU to generate a multi-view interactive digital media representation are described in more detail below with respect to FIGS. 7-15. Yet another source of data that can be used to generate a multi-view interactive digital media representation can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a multi-view interactive digital media representation can be generated a combination of data that includes both 2D images 104 and environment information 106, without any depth images 108 provided. In other embodiments, depth images 108 and environment information 106 can be used together at sensor fusion block 110. Various combinations of image data can be used with environment information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a multi-view interactive digital media representation are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a multi-view interactive digital media representation can be generated without a user specified target in some applications.

In the present example embodiment, one or more enhancement algorithms can be applied at enhancement algorithm(s) block 116. In particular example embodiments, various algorithms can be employed during capture of multi-view interactive digital media representation data, regardless of the type of capture mode employed. These algorithms can be used to enhance the user experience. For instance, automatic frame selection, stabilization, view interpolation, filters, and/or compression can be used during capture of multi-view interactive digital media representation data. In some examples, these enhancement algorithms can be applied to image data after acquisition of the data. In other examples, these enhancement algorithms can be applied to image data during capture of multi-view interactive digital media representation data.

According to particular example embodiments, automatic frame selection can be used to create a more enjoyable multi-view interactive digital media representation. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a multi-view interactive digital media representation in a manner similar to that used for video. In particular, key frames in a multi-view interactive digital media representation can be stabilized for to produce improvements such as smoother transitions, improved/enhanced focus on the content, etc. However, unlike video, there are many additional sources of stabilization for a multi-view interactive digital media representation, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a multi-view interactive digital media representation. Because points of interest in a multi-view interactive digital media representation are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for multi-view interactive digital media representations. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a multi-view interactive digital media representation is often focused on a particular object of interest, a multi-view interactive digital media representation can be content-weighted so that the object of interest is maximally stabilized in some examples.

Another way to improve stabilization in a multi-view interactive digital media representation includes direct selection of a region of a screen. For instance, if a user taps to focus on a region of a screen, then records a convex multi-view interactive digital media representation, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a multi-view interactive digital media representation in some embodiments. In other embodiments, view interpolation can be applied during multi-view interactive digital media representation generation.

In some examples, filters can also be used during capture or generation of a multi-view interactive digital media representation to enhance the viewing experience. Just as many popular photo sharing services provide aesthetic filters that can be applied to static, two-dimensional images, aesthetic filters can similarly be applied to surround images. However, because a multi-view interactive digital media representation is more expressive than a two-dimensional image, and three-dimensional information is available in a multi-view interactive digital media representation, these filters can be extended to include effects that are ill-defined in two dimensional photos. For instance, in a multi-view interactive digital media representation, motion blur can be added to the background (i.e. context) while the content remains crisp. In another example, a drop-shadow can be added to the object of interest in a multi-view interactive digital media representation.

In various examples, compression can also be used as an enhancement algorithm 116. In particular, compression can be used to enhance user-experience by reducing data upload and download costs. Because multi-view interactive digital media representations use spatial information, far less data can be sent for a multi-view interactive digital media representation than a typical video, while maintaining desired qualities of the multi-view interactive digital media representation. Specifically, the IMU, keypoint tracks, and user input, combined with the view interpolation described above, can all reduce the amount of data that must be transferred to and from a device during upload or download of a multi-view interactive digital media representation. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a multi-view interactive digital media representation 118 is generated after any enhancement algorithms are applied. The multi-view interactive digital media representation can provide a multi-view interactive digital media representation. In various examples, the multi-view interactive digital media representation can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, multi-view interactive digital media representations provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with multi-view interactive digital media representations that allow the multi-view interactive digital media representations to be indexed with a high degree of efficiency and accuracy; and the ability of the user to interact and change the viewpoint of the multi-view interactive digital media representation. In particular example embodiments, the characteristics described above can be incorporated natively in the multi-view interactive digital media representation, and provide the capability for use in various applications. For instance, multi-view interactive digital media representations can be used to enhance various fields such as e-commerce, visual search, 3D printing, file sharing, user interaction, and entertainment.

In some embodiments, a multi-view interactive digital media representation can use a series of 2-D images of a physical object taken from multiple viewpoints. When the 2-D images are output to a display, the physical object can appear to undergo a 3-D transformation, such as a rotation in 3-D space. This embodiment of the multi-view interactive digital media representation approach differs from using a full 3-D model of the physical object.

With a full 3-D model approach, the physical object can be represented as a series of polygons where the polygons are defined by points in a 3-D model space. After the 3-D model of the physical object is generated, the 3-D model can be initially positioned in the 3-D model space. Then, the position of the 3-D model can be adjusted in 3-D model space as function of time. For example, the 3-D model of the physical object can be rotated in the 3-D model space.

The re-positioning of the 3-D model involves determining a new location of each of the points of the 3-D model in the 3-D model space. Next, textures can be reapplied to the 3-D model. Yet further, a background can be added to the 3-D model space. Then, a light source in the 3-D model space can be simulated. Finally, based upon the light source, the 3-D model and the background can be re-rendered to a 2-D image. This process is repeated each time the 3-D model is changed in the 3-D model space.

The determination of the changes to the 3-D model positions in the 3-D space as a function of time, the re-texturing of the model, the addition of the background and then the re-rendering is computationally expensive, especially as the complexity of the 3-D model increases. Further, as described above, it requires the generation and storage of a 3-D model and its defining parameters, which is time consuming. Thus, the multi-view interactive digital media representation can be more computationally efficient and require less memory resources than a 3-D model approach.

In addition, when an apparent motion of an object is output from a multi-view interactive digital media representation, it appears as if the object motion is generated from an image quality 3-D textured model. Image quality 3-D textured models are generated in a time consuming and often manual process. In particular, the generation of an image quality textured 3-D model of an object, such as an actual person's face, is notoriously difficult and time consuming, especially, when a "life like" rendering of the object is desired.

In this embodiment of the multi-view interactive digital media representation approach, because of the elimination of the 3-D modeling steps, user-selected objects from user generated 2-D images can be converted quickly to a multi-view interactive digital media representation and then output to a display in real-time. During output, the user can control aspects of apparent motion of the object within the multi-view interactive digital media representation. Because the object in the multi-view interactive digital media representation can be generated from real images, such as images received from a user-controlled camera, the object appears life-like when output. In a traditional 3-D modeling approach, because of the difficulties associated with generating an image quality 3-D model, this capability is not offered.

Returning to FIG. 1, according to various example embodiments, once a multi-view interactive digital media representation 118 is generated, user feedback for acquisition 120 of additional image data can be provided. In particular, if a multi-view interactive digital media representation is determined to need additional views to provide a more accurate model of the content or context, a user may be prompted to provide additional views. Once these additional views are received by the multi-view interactive digital media representation acquisition system 100, these additional views can be processed by the system 100 and incorporated into the multi-view interactive digital media representation.

Figure 2:
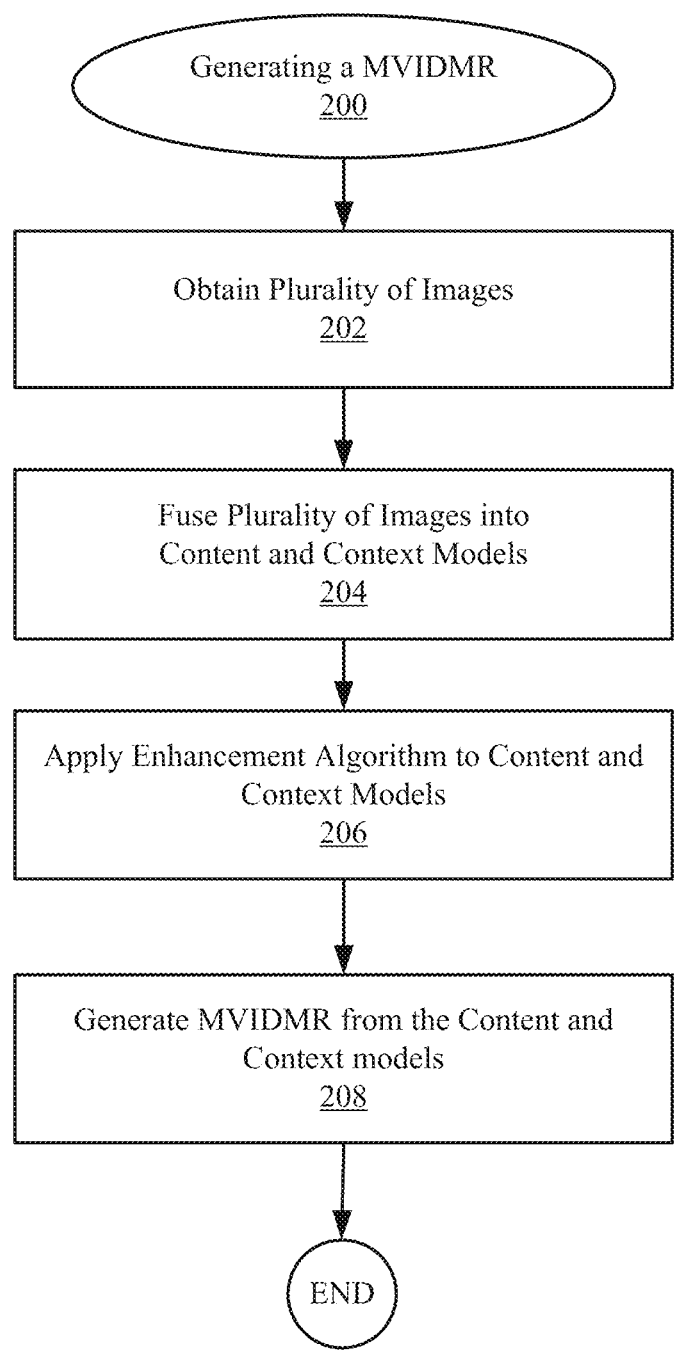
FIG. 2 illustrates an example of a process flow for generating a multi-view interactive digital media representation in accordance with embodiments of the present invention.

With reference to FIG. 2, shown is an example of a process flow diagram for generating a multi-view interactive digital media representation 200. In the present example, a plurality of images is obtained at 202. According to various embodiments, the plurality of images can include two-dimensional (2D) images or data streams. These 2D images can include location information that can be used to generate a multi-view interactive digital media representation. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a multi-view interactive digital media representation is generated from the content and context models at 208. The multi-view interactive digital media representation can provide a multi-view interactive digital media representation. In various examples, the multi-view interactive digital media representation can include a three-dimensional model of the content and a two-dimensional model of the context. According to various embodiments, depending on the mode of capture and the viewpoints of the images, the multi-view interactive digital media representation model can include certain characteristics. For instance, some examples of different styles of multi-view interactive digital media representations include a locally concave multi-view interactive digital media representation, a locally convex multi-view interactive digital media representation, and a locally flat multi-view interactive digital media representation. However, it should be noted that multi-view interactive digital media representations can include combinations of views and characteristics, depending on the application.

Figure 3:
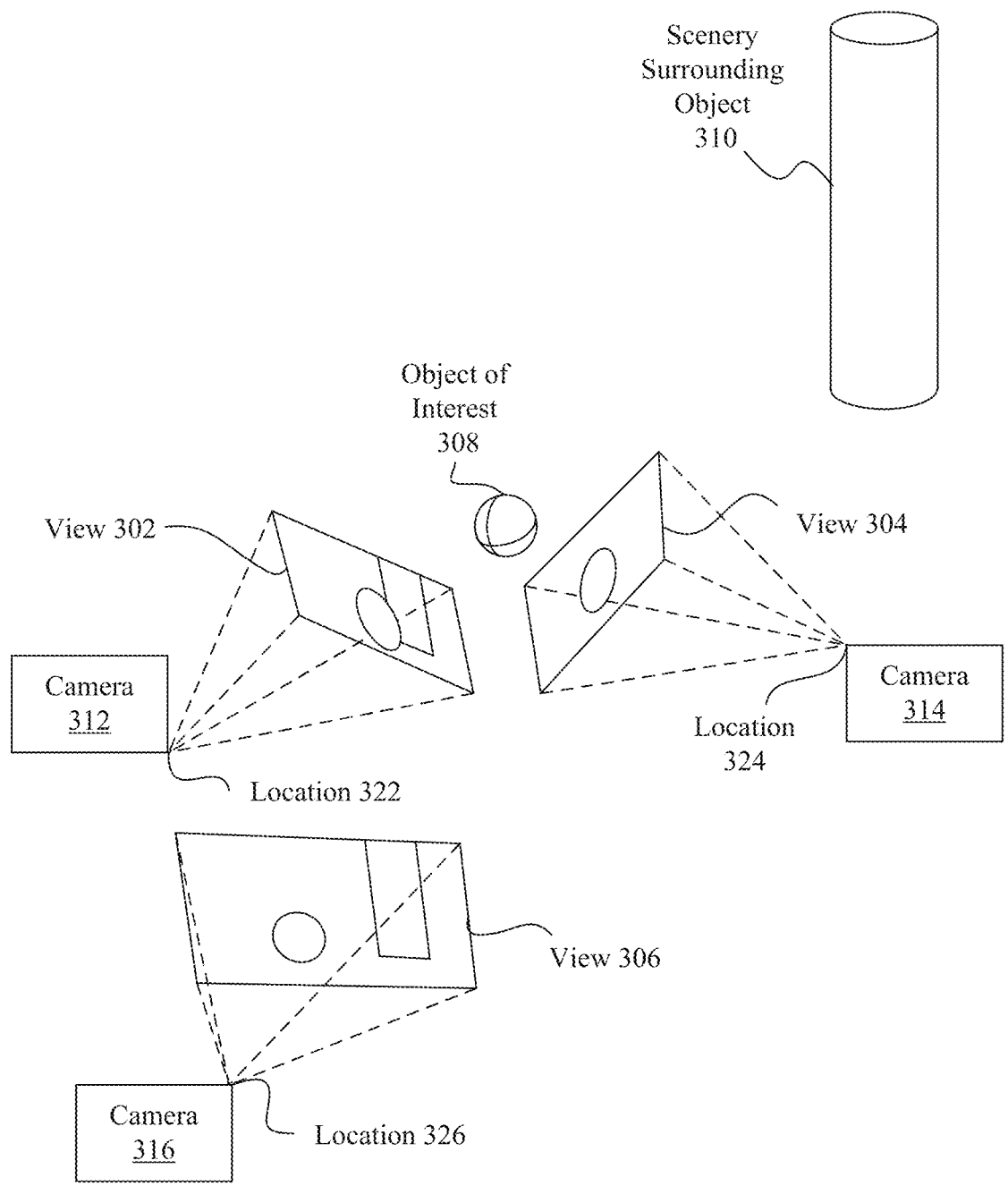
FIG. 3 illustrates one example of multiple camera views that can be fused into a three-dimensional (3D) model to create an immersive experience in accordance with embodiments of the present invention.

With reference to FIG. 3, shown is one example of multiple camera views that can be fused together into a three-dimensional (3D) model to create an immersive experience. According to various embodiments, multiple images can be captured from various viewpoints and fused together to provide a multi-view interactive digital media representation. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 316 along with their associated locations 322, 324, and 326, respectively, provide a rich source of information about object of interest 308 and the surrounding context that can be used to produce a multi-view interactive digital media representation. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a multi-view interactive digital media representation.

Figure 4:
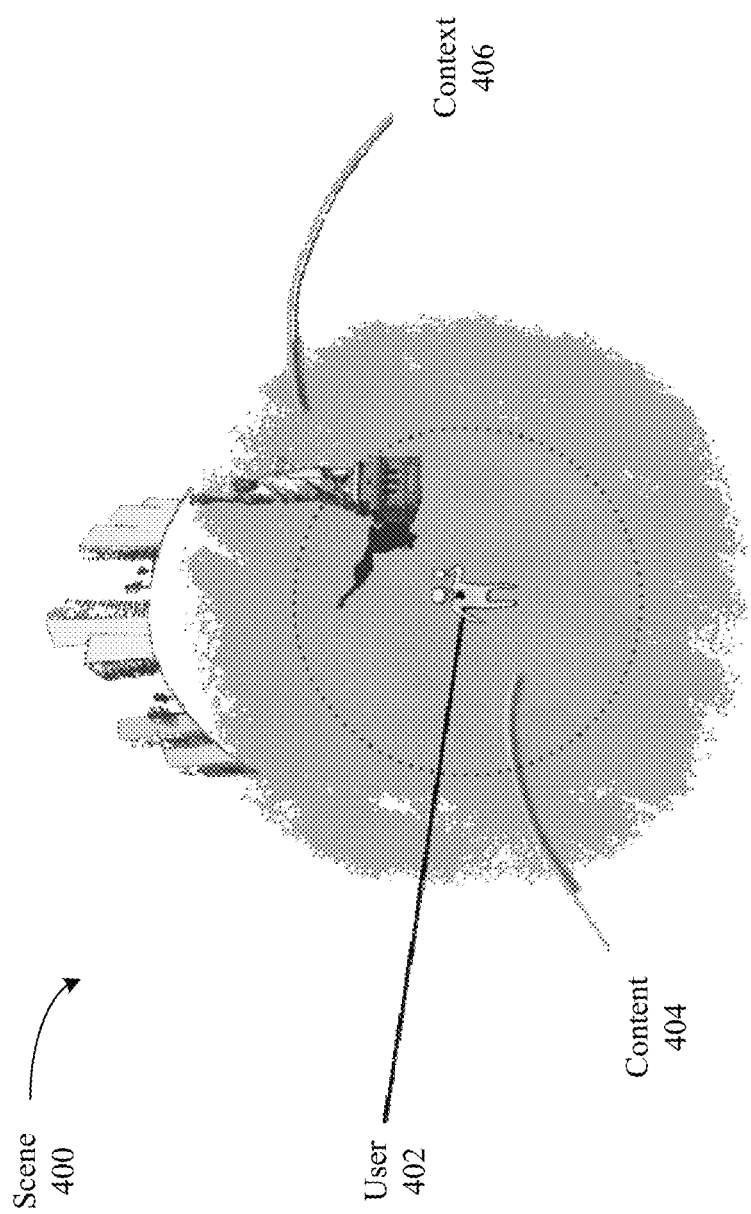
FIG. 4 illustrates one example of separation of content and context in a multi-view interactive digital media representation in accordance with embodiments of the present invention.

FIG. 4 illustrates one example of separation of content and context in a multi-view interactive digital media representation. According to various embodiments of the present invention, a multi-view interactive digital media representation is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a multi-view interactive digital media representation.

According to various embodiments of the present disclosure, the digital visual data included in a multi-view interactive digital media representation can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a multi-view interactive digital media representation may represent the content 404 as three-dimensional data, and the context 406 as a two-dimensional panoramic background. In other examples, a multi-view interactive digital media representation may represent both the content 404 and context 406 as two-dimensional panoramic scenes. In yet other examples, content 404 and context 406 may include three-dimensional components or aspects. In particular embodiments, the way that the multi-view interactive digital media representation depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the multi-view interactive digital media representation produced may have some characteristics that are similar to other types of digital media such as panoramas. However, according to various embodiments, multi-view interactive digital media representations include additional features that distinguish them from these existing types of digital media. For instance, a multi-view interactive digital media representation can represent moving data. Additionally, a multi-view interactive digital media representation is not limited to a specific cylindrical, spherical or translational movement. Various motions can be used to capture image data with a camera or other capture device. Furthermore, unlike a stitched panorama, a multi-view interactive digital media representation can display different sides of the same object.

Figures 5A, 5B:
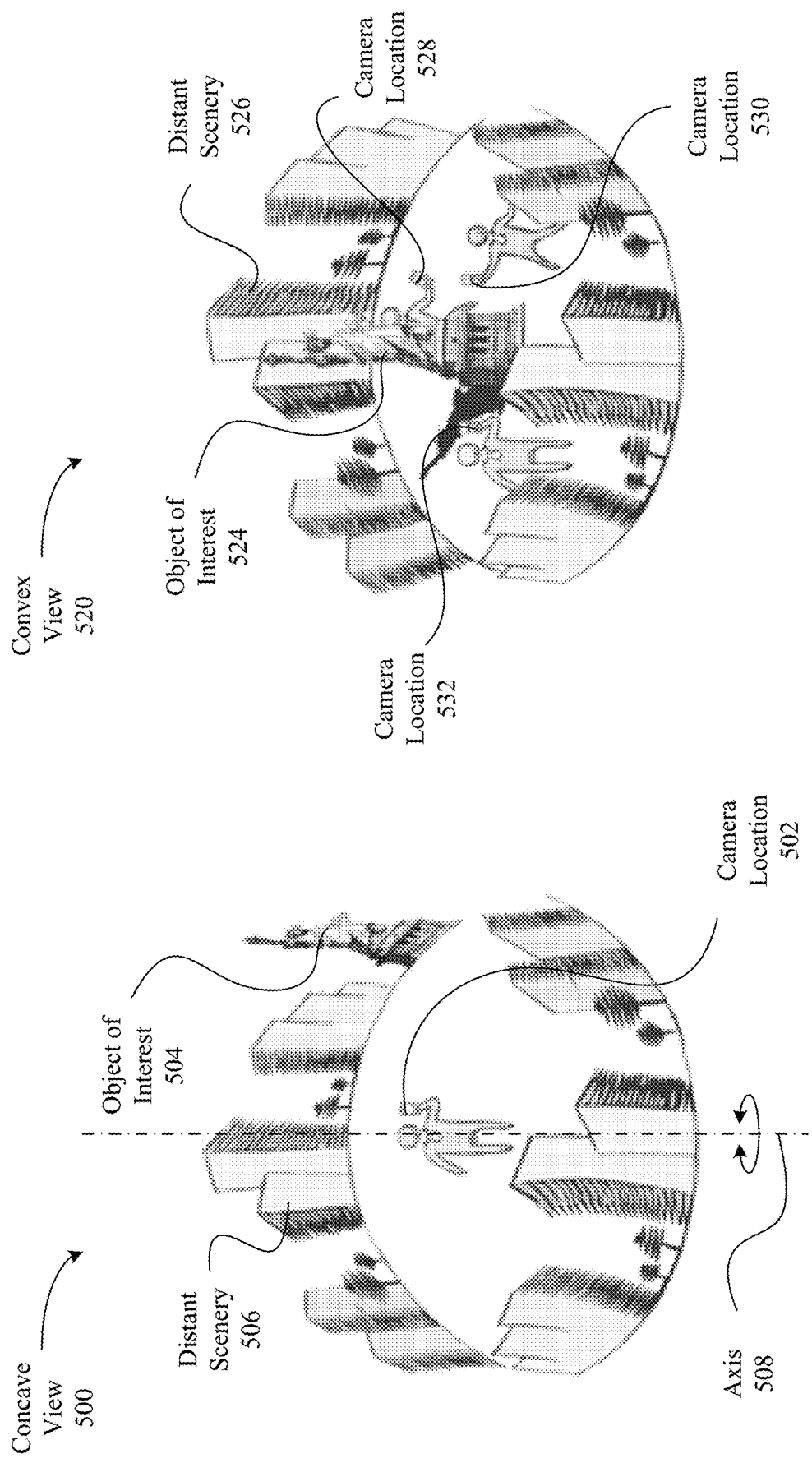
FIGS. 5A-5B illustrate examples of concave view and convex views, respectively, where both views use a back-camera capture style in accordance with embodiments of the present invention.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a multi-view interactive digital media representation.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A to 6D illustrate examples of various capture modes for multi-view interactive digital media representations. Although various motions can be used to capture a multi-view interactive digital media representation and are not constrained to any particular type of motion, three general types of motion can be used to capture particular features or views described in conjunction multi-view interactive digital media representations. These three types of motion, respectively, can yield a locally concave multi-view interactive digital media representation, a locally convex multi-view interactive digital media representation, and a locally flat multi-view interactive digital media representation. In some examples, a multi-view interactive digital media representation can include various types of motions within the same multi-view interactive digital media representation.

Figure 6A:
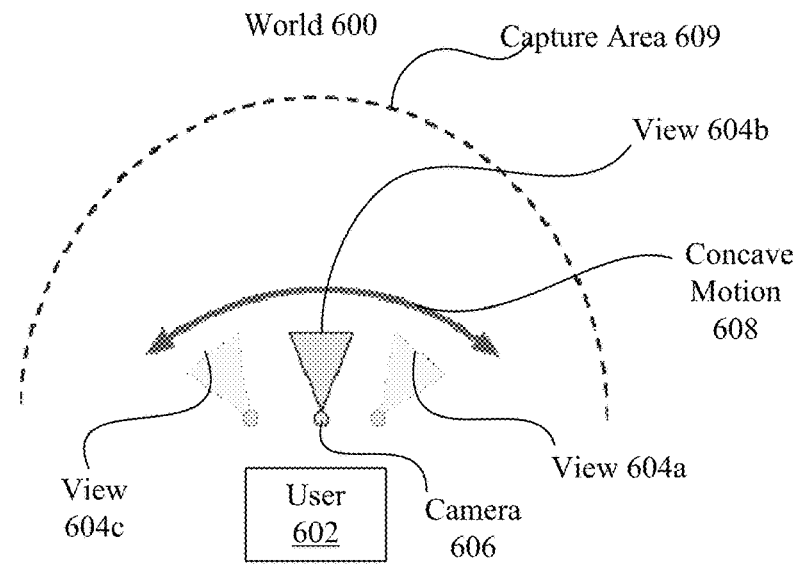
FIGS. 6A to 6D illustrate examples of various capture modes for multi-view interactive digital media representations in accordance with embodiments of the present invention.

With reference to FIG. 6A, shown is an example of a back-facing, concave multi-view interactive digital media representation being captured. According to various embodiments, a locally concave multi-view interactive digital media representation is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
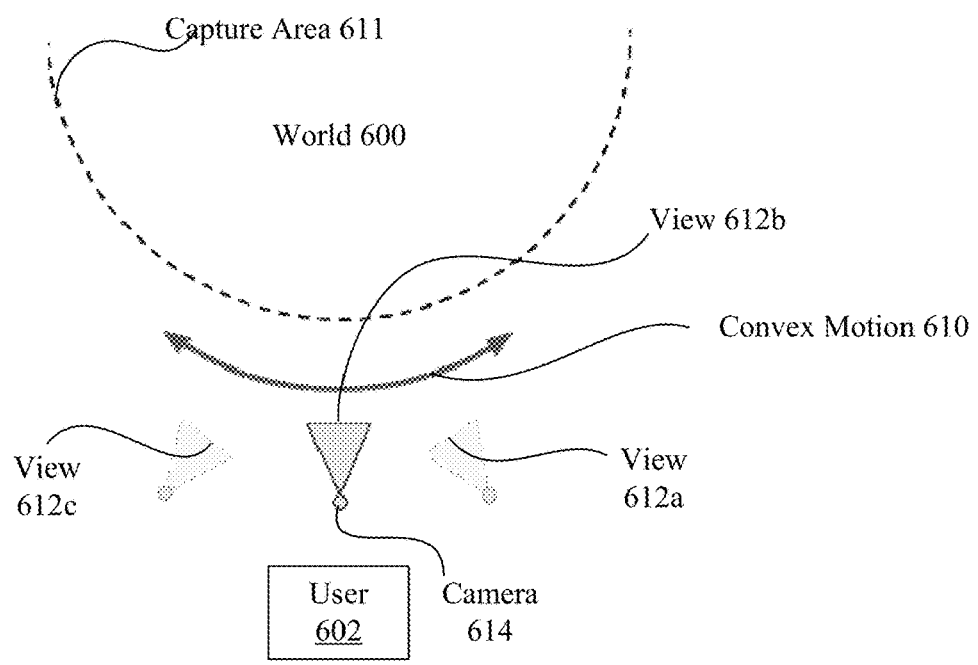

With reference to FIG. 6B, shown is an example of a back-facing, convex multi-view interactive digital media representation being captured. According to various embodiments, a locally convex multi-view interactive digital media representation is one in which viewing angles converge toward a single object of interest. In some examples, a locally convex multi-view interactive digital media representation can provide the experience of orbiting about a point, such that a viewer can see multiple sides of the same object. This object, which may be an "object of interest," can be segmented from the multi-view interactive digital media representation to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
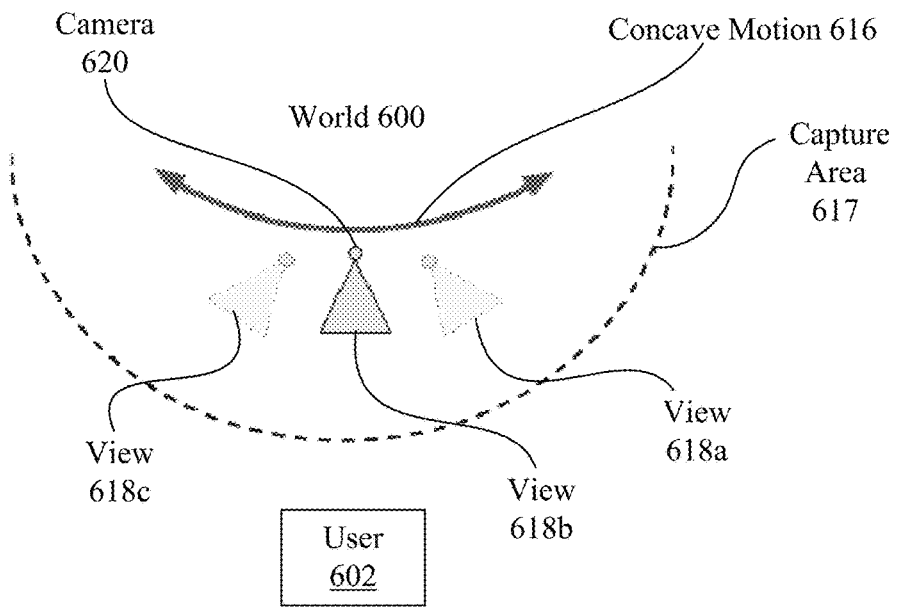

With reference to FIG. 6C, shown is an example of a front-facing, concave multi-view interactive digital media representation being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 606 such that the views 618a, 618b, and 618c diverge from each other in an angular sense. The capture area 617 follows a concave shape that includes the user at a perimeter.

Figure 6D:
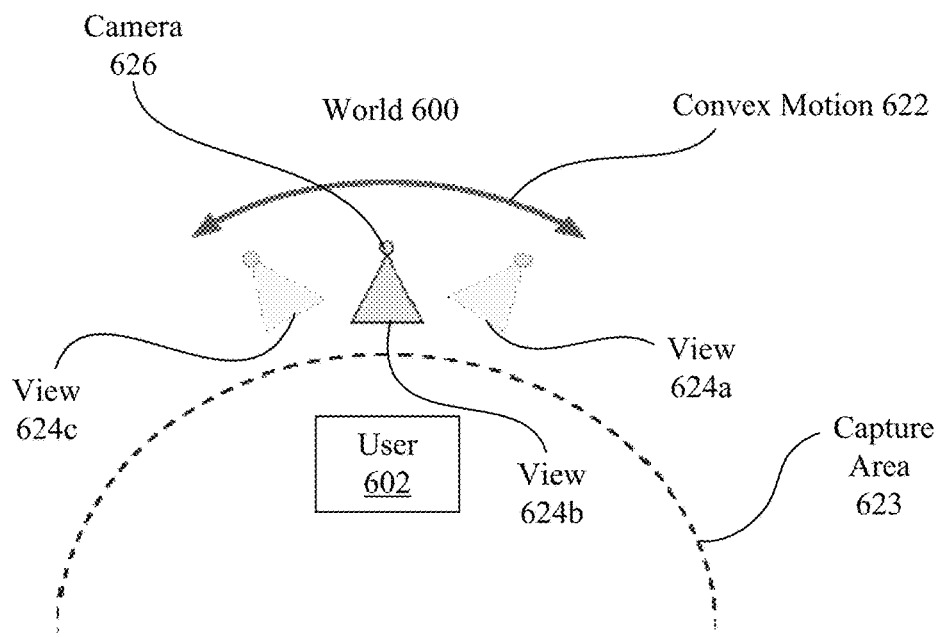

With reference to FIG. 6D, shown is an example of a front-facing, convex multi-view interactive digital media representation being captured. In the present example embodiment, camera 626 is facing user 602. The camera follows a convex motion 622 such that the views 624a, 624b, and 624c converge towards the user 602. As described above, various modes can be used to capture images for a multi-view interactive digital media representation. These modes, including locally concave, locally convex, and locally linear motions, can be used during capture of separate images or during continuous recording of a scene. Such recording can capture a series of images during a single session.

With respect to FIGS. 7A to 12, system and methods for generating multi-view interactive digital media representations (MVIDMRs) using angle measurements derived from sensor data are described. In more detail, with respect to FIGS. 7A and 7B, sensor packages, their integration into a mobile device and sensor outputs are described. With respect to FIGS. 8A to 9B, rotation metrics determined from IMU data, which can be generated for a MVIDMR, are described. With respect FIGS. 10A, 10B and 11, the application of rotation metrics to MVIDMR generation for different image capture paths are discussed. A method of MVIDMR generation is described with respect to FIG. 12. Finally, with respect to FIG. 13, an example of an apparatus, which can be used during MVIDMR generation, is discussed.

FIG. 7A illustrates a sensor package 700 for determining orientation of a camera used to generate a MVIDMR. In one embodiment, the sensor package 700 can include a MEMS (Micro-Electro-Mechanical System) device 706. In particular embodiments, the sensor package 700 can be part of an IMU. Other types of sensor packages are possible and the example of a MEMS device 706 is provided for the purposes of illustration only.

The MEMS device 706 can include a plurality of sensors. For example, the MEMS device 706 can include a 3-axis accelerometer. The 3-axis accelerometer can be used to measure accelerations along the z axis 702a, the y axis 702b and the x axis 702c. In addition, the MEMs device can include a 3-axis gyroscope. The 3-axis gyroscope can be used to measure angular velocities, 704a (yaw) about z axis 702a, 704b (roll) about y axis 702b and 704c (pitch) about x axis 702c. In addition, a MEMs device can include an one or more axis magnetometer (not shown), such as 3-axis magnetometer. In various embodiments, a sensor package 700 can include one or more of accelerometers, gyroscopes, magnetometers or combinations thereof.

The sensor package 700 can output sensor data 708. An IMU, which can include a sensor processing system, such as 710, can receive the sensor data 708 and determine an orientation of a device. For example, gyroscopic data 712 can be integrated to determine angular changes about the pitch, roll and yaw axes. Magnetometer data 714 can be used to determine a heading or direction 724 relative to the Earth's magnetic poles. Accelerometer data 716 can be used to determine a direction of the Earth's gravity vector. Further, accelerometer data 716 can be integrated once to determine a velocity of the device and twice to determine distance changes.

The orientation 722 of a device relative to a reference coordinate system can be described with three angles, i.e., pitch, roll and yaw angles. For example, the accelerometer data 716, such as from a 3-axis accelerometer, can provide a pitch and roll orientation of a device relative to the Earth's gravitational vector. The magnetometer data 714, if available, can be used to provide a yaw angle. Gyroscopic data 712 can be used to provide changes to the pitch, roll and yaw angles. Thus, if an initial orientation of a device is known and it begins to rotate, the gyroscopic data can be used to determine an orientation of a device as a function of time.

FIG. 7B illustrates a mobile device 720 with a sensor package, such as the MEMs device 706 shown in FIG. 7A. For example, the MEMs device 706 can be installed in device 720 with its axes aligned as depicted in the FIG. 7B. The device 720 can include one or more cameras (not shown) facing in the negative Z direction along axis 702a and one or more cameras facing in the positive Z direction. An exemplary field of view of at least one camera facing in the negative Z direction is indicated by rays 725.

When the fields of view of two or more cameras overlap, knowledge of the distance between the cameras can be used to obtain distance data, i.e., the distance of the camera to objects captured in the image data. For example, the device 720 can include two cameras facing in the negative Z direction with overlapping fields of view. Where the fields of view overlap, the distance to objects from the cameras, and hence device 720, can be estimated based upon a comparison of image data taken from both cameras.

When device 720 is a rigid body, then based upon a position and orientation of the camera relative to the body of device 720, the orientation of the camera can be determined based upon the orientation of body of the device 720. In this example, a camera is aligned with the Z-direction at some position on the face of the body of device facing in the negative Z direction. As described with respect to FIG. 7A, the orientation of a body of the device can be determined from the sensor package. Hence, based upon its position on device 720, the orientation of the camera can be derived from data from the sensor package.

In other examples, a camera can be configured so that it is not aligned with negative Z direction, such as pointing at an angle relative to the negative Z axis. For instance, the device 720 a first camera can be aligned with the negative Z axis and then one or more additional cameras can be configured to point at angles relative to the negative Z direction. The light gathered from the multiple cameras can be combined to provide a wider field of view. In another example, a camera can be designed to mechanically sweep through an angle to provide a wider field of view.

In yet another example, device 720 may not be a rigid body. For example, device 720 can include a flexible housing. When the housing is flexible, sensors may be included which measure an amount of bending. Based upon the amount of bending determined from the sensors and data from a sensor package, such as a sensor package on an IMU, an orientation of the camera on a flexible body can be determined.

FIG. 8A illustrates rotations of the mobile device 720 depicted in different coordinate systems. In this example, the gravity vector is into the page. In 730, the camera of device 720, which points in the negative Z direction, is facing toward an object 732, which is a sphere. The y axis 702b of device 720, as shown in FIG. 7B is aligned with the gravity vector.

In 730, the device 720 is moved along path 734, which is a circular path. The circular path lies in a plane perpendicular to the gravity vector, which is into the page. As the device 720 moves, the direction of the camera, which points in the negative Z direction, is kept aligned with a line between the center of the circle and the camera. Hence, the direction of camera is always perpendicular to circular path 734. For example, this camera path can be generated if a rigid bar were attached to the device 720 on one end and attached to a pole through the center of the circle aligned with the gravity vector on the other end where the rigid bar is allowed rotate relative to the pole in the center of the circle.

In 730, a position of the device 720 is shown at four different times, $t_1$, $t_2$, $t_3$ and $t_4$, along path 734. The positions of the device 720 are at ninety degrees to one another. Along path 734, the camera on device 720 can be used to capture images used to generate an MVIDMR of object 732, which is a sphere. For example, when the device 720 follows the complete path 734 around object 732, the camera can capture image data which includes a three hundred and sixty degree view of the object 732.

In 735, the rotational motion is represented as a motion about the gravity vector, which in this example is also a rolling motion about the y axis 702b of the device because the y axis 702b is aligned with the gravity vector in this example. When the device 720 follows the complete path 734 around object 732, the camera performs a single rotation in this example and captures a three hundred sixty degree angular view of the object. Further, from $t_1$ to $t_2$, device 720 rotates ninety degrees and captures a ninety degree angular view of the object, from $t_1$ to $t_3$, device 720 rotates one hundred eighty degrees and captures a one hundred eighty degree angular view of the object and from $t_1$ to $t_4$, device 720 rotates two hundred seventy degrees and captures a two hundred seventy degree angular view of the object.

In this example, the rotations of camera can be determined using data from the accelerometers and/or gyroscopes. For example, the accelerometers can be used to determine a vector associated with the direction which the camera is pointing as a function of time. An angular change can be determined between the camera direction vectors to determine an angular change and hence an amount of rotation from a first time to a second time. In another example, the rotation rates determined from the gyroscopes can be integrated to determine an amount of angular change to the camera due to the rotation of device 720. In a method, which can be referred to sensor fusion, both accelerometer data and gyroscopic data can be utilized to determine angular rotations of the camera on device 720. In some instances, the combination of accelerometer and gyroscopic data can provide more accurate estimates of the angular change than using the accelerometer data or the gyroscopic data alone.

In some instances, it is desirable to capture a specific angular view of an object, such as a ninety degree view, a hundred eighty degree view or a three hundred sixty degree view. For example, a MVIDMR including a three hundred sixty view of an object may be desirable for an advertising application. In the example of FIG. 8A, the amount of rotation of the device 720 is related to an amount of an angular view of the object that is captured. Thus, a measurement of the amount of rotation of the device 720 about an axis can be used to determine how much of an angular view of the object has been captured.

In the example of FIG. 8A, the movement of the device 720 is constrained in that the negative axis is always perpendicular to the circular path 734 and the y axis 702b of the device is aligned with the gravity vector. When a person is holding device 720 to generate an MVIDMR, this motion is difficult to reproduce. Typically, as the device 720 is moved along a path, it can pitch, roll and yaw in a person's hand. Further, the person can move the device up and down and closer or farther away from the object.

The pitch, roll and yaw can vary in opposite directions along the translational path. Further, the device 720 can move up and down and backwards and forwards along a path as it is moved. In addition, the device can move closer or farther away from an object. These more complicated motions in the context of using rotational motions of the device 720 to determine an angular view captured are described with respect to the following figures.

Figures 8B, 8C, 8D:
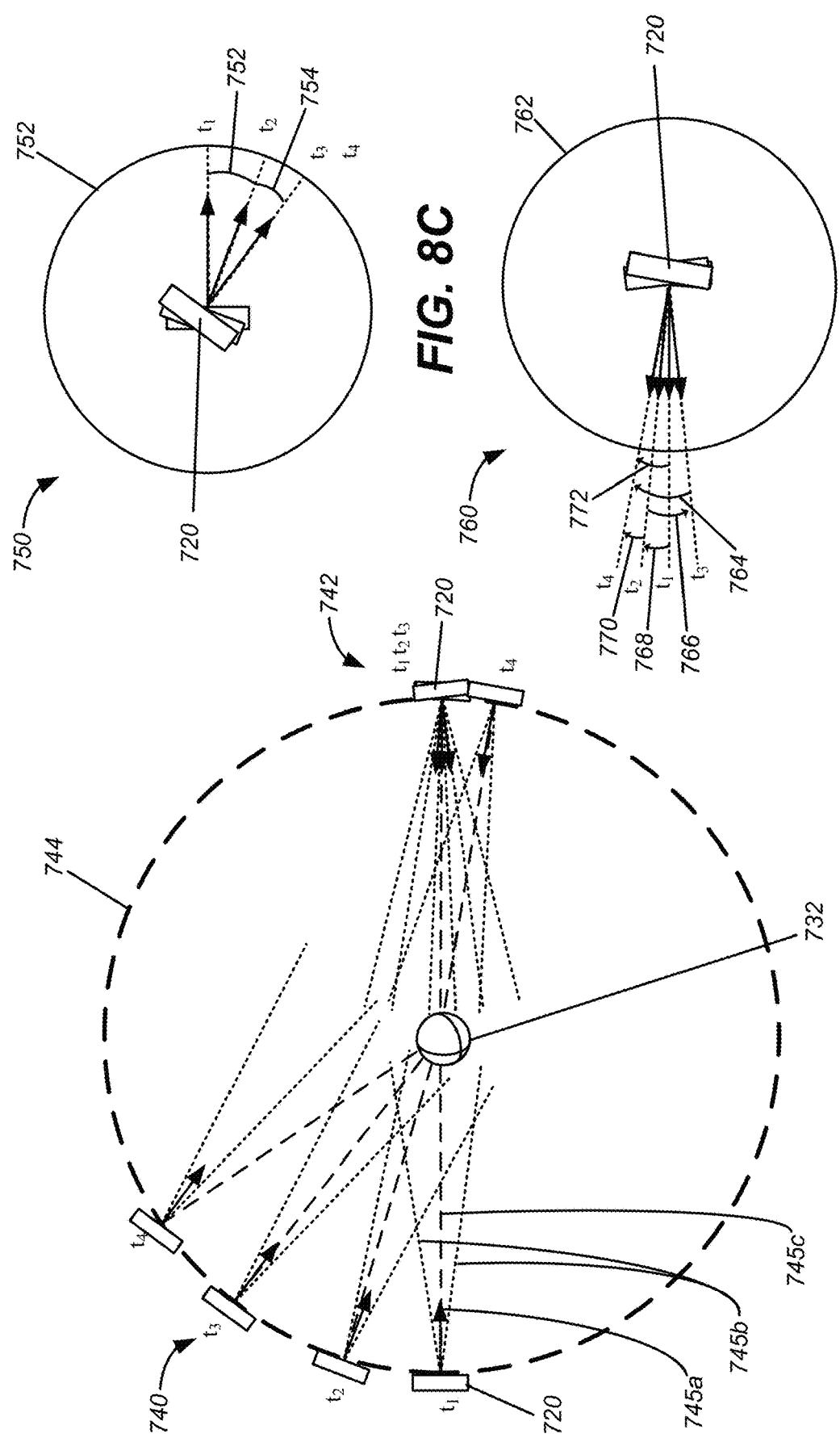

FIG. 8B illustrates roll orientations of a mobile device 720 with a camera as a function of time during image capture for MVIDMR generation. In this example, the mobile device 720 follows a circular path 744 about an object 732. The y axis of the device 720 is kept aligned with the gravity vector which is through the center of the object 732 and into the page (no pitch). However, the device 720 is allowed to roll about the y axis (see FIG. 7B) as if a person were holding the device 720.

Two movement sequences, 740 and 742, are shown. Each movement sequence includes four times, $t_1$, $t_2$, $t_3$ and $t_4$. At each time, a position of the device 720 along circular path 744 is shown. Further, at each time, the following three things are shown, 1) the negative z axis, such as 745a, of the device 720, 2) a field of view of the camera on device 720, as indicated by dashed lines, such as 745b, and 3) a line, such as 745c, from the center of the circle 744 to the origin of the negative z axis, which is perpendicular to circular path 744.

For path 740, at $t_1$, the negative z axis is aligned such that it is perpendicular to circular path 744. The object 732 is centered in the field of view of the camera aligned with the negative z axis. Between $t_1$ and $t_2$, the device 720 has a net clockwise rotation about the y axis (roll). At $t_2$, the negative z axis of the device 720 is not perpendicular to the circular path 744 and is rotated clockwise past the line which is perpendicular to circular path 744. This orientation of the camera results in the object 732 not being centered in the field of view of the camera.

Between $t_2$ and $t_3$, the device 720 has a net clockwise rotation about the y axis (roll). At $t_3$, the negative z axis of the device 720 is again not perpendicular to the circular path 744 and is rotated clockwise such that it has not reached line which is perpendicular to the circular path 744. Thus, again, this orientation results in the object 732 not being centered in the field of view of the camera.

In general, a user can use the display of device 720 to try to keep the camera centered on the object 732. However, as the user moves the camera about the object 732, along a path, such as 744, the user may over correct or under correct as they try to keep the object centered in the display of device 720. Hence, the user can rotate the device counter-clockwise and clockwise to keep the object centered.

Typically, for determining the angular rotation amount of camera as related to an angular view captured of an object, such as object 732, the angular rotation amount in a particular rotation direction can be used. For example, in FIG. 8B, the angular view of the object 732, which captured, can be related to amount of rotation of device 720 in the clockwise direction. The rotation in the counter-clockwise direction doesn't contribute to the angular view of the object which has been captured along path 744. Thus, in one embodiment, when considering angular changes about an axis, such as the roll axis, only the angular changes in one direction may be considered, such as only rotations in the clockwise direction or only rotation in the counter-clockwise direction (If in 740, the device 720 moved in the counter-clockwise direction about path 744, then rotations only in the counter-clockwise direction about the roll axis can be of interest in regards to determining the angular view captured of object 732 and angular changes in the clockwise direction can be ignored.)

Between $t_3$ and $t_4$, the device 720 is not rotated about the y axis (zero roll), i.e., it is in the same roll orientation at $t_4$ as it at $t_3$. As a result, the object 732 moves out of the field of view of the camera. The object moving out of the field of view of the camera can be detected in the image data from the camera. In this instance, the MVIDMR system can be configured to detect the object 732 has moved out of the field of view of the camera.

As described above, an angular view of a particular amount of an object, such as 732, may be desired. When an object, such as 732, moves out of the field of view, the MVIDMR system perform one or more of the following: 1) stop the image capture process, 2) stop the determination of the amount of the angular view of the object captured and 3) output to the user a notification that the image capture process for the MVIDMR has stopped. In one embodiment, the MVIDMR system can be configured to output to the user the amount of angular view of the object, which has been captured, prior to the object moving out of the field of view.

In a further embodiment, the MVIDMR system can indicate the user to start the acquisition process again from the beginning, such as going back to $t_1$. In another embodiment, the MVIDMR system can be configured to direct the user to bring the object 732 back into the field of view of the camera and restart the image process. Then, the MVIDMR system can again begin to determine the changes to the angular position of the camera on device 720 to determine an amount of angular view of the object, such as 732, which has been captured.

In yet another embodiment, the MVIDMR system can be configured to direct a user to a previous position and then specify an orientation of the camera. For example, the MVIDMR system can be configured to output directions, such as a guide, for the user to return the camera to the position at $t_3$. When the user returns to the position, the MVIDMR system can direct the user to a specific orientation of the camera. For example, meters or guides can be output that indicate that the device 720 is in a desired orientation. Then, MVIDMR system can indicate to the user, such as via a message to the display, to again begin the MVIDMR image capture process, such as the user walking along path 744. After the image capture process is initiated, the MVIDMR system can again begin to determine angular changes associated with the device 720 and its camera and determine an amount of angular view of the object, such as 732, which has been captured.

FIG. 8C illustrates rotations 750 of the device 720 about the gravity vector for the movement sequence 740 in FIG. 8B. In this example, the gravity vector is aligned with the y axis of device 720. The direction of the camera at each time is indicated by an arrow. A circle 752 in a plane perpendicular to the gravity vector is shown in FIG. 8C to better illustrate the amount of angular rotation about the gravity vector of the camera on the device 720. As described above, the angular rotations of device 720 can be determined using sensor data from a sensor package on an IMU, such as accelerometer data and/or gyroscopic data.

Between time $t_1$ and $t_2$, the device 720 rotates a first angular amount 752. Between time $t_2$ and $t_3$, the device 720 rotates a second angular amount 754. Between time $t_3$ and $t_4$, the device 720 doesn't rotate. The angular change 752 is greater than the angular change 754. As shown in FIG. 8B, the angular change 752 is an overestimation of the angular view captured. However, between $t_1$ and $t_3$, the total angular change is the sum of angles 752 and 754. As can be seen in FIG. 8B, the sum of angles 752 and 754 give a better estimate of the angular view captured of the object 732.

Returning to FIG. 8B, a second movement sequence of device 720 along path 744 is shown. If the device 720 is moved in a clockwise direction along the path 744, then the device 720 needs to be rotated in a clockwise manner to keep the object 732 in the field of view of the camera as it moves. In the second movement sequence, at $t_1$, the direction of the camera on device 720 is perpendicular to path 744. Then, at $t_2$, the device 720 is rotated clockwise, but, its position along the path 744 remains fixed. Next, at $t_3$, the device is rotated counterclockwise, but, its position along the path 744 again remains fixed. Finally between $t_3$ and $t_4$, the device is rotated clockwise and it is moved to a new position along path 744.

FIG. 8D illustrates rotations 760 of the device 720 about the gravity vector for the movement sequence 742 in FIG. 8B. In this example, the gravity vector is aligned with the y axis of device 720. The direction of the camera at each time is indicated by an arrow. A circle 762 in a plane perpendicular to the gravity vector is shown in FIG. 8D to better illustrate the amount of angular rotation about the gravity vector of the camera on the device 720. As described above, the angular rotations of device 720 can be determined using sensor data, such as accelerometer data and/or gyroscopic data, from a sensor package on an IMU.

In FIG. 8D, the angular change of device from $t_1$ to $t_2$ is indicated by angle 768. The angular change from $t_2$ to $t_3$ is indicated by angle 766. The angular change from $t_3$ to $t_4$ is indicated by angle 764. Finally, the angular change from $t_2$ to $t_4$ is indicated by angle 770.

The rotations of device 720 from time $t_1$ to $t_2$ and from $t_2$ to $t_3$ don't contribute to the angular view of the object 732 captured by the camera. In this example, the rotation angle from $t_1$ to $t_4$, which is angle 772, is closest to the angular view captured by the object on the movement sequence 742. In one embodiment, both the positive and negative rotations can be counted towards a rotational angle total where the direction change results in a sign change. For example, the sum of angles 764 and 768, which can be considered a positive rotation and the angle 766, which can be considered a negative rotation, results in angle 772, which approximates the angular view of the object captured.

In another embodiment, only the positive rotations can be counted. Thus, angle 764 and 768 can be summed and angle 766 can be ignored. This approach overestimates the angular view of the object captured.

In yet another embodiment, the change in angle of the vector in the direction of the camera as a result of a negative rotation can be ignored and the angular rotation change in the positive direction can be measured from the position of the direction vector of the camera prior to the negative rotation. For example, in FIG. 8D, rather than measuring the angular change from $t_3$ to $t_4$, based upon, the position of the direction vector of the camera at time $t_3$, which provides angle 764, the position of the direction vector at $t_2$ can be used. This measurement provides angle 770. Thus, the total change in the rotation angle from $t_1$ to $t_4$ is the sum of angles 768 and 770, which is equal to angle 772. This approach for determining the rotation of the camera can produce a reasonable approximation of the angular view of the object which has been captured.

In one embodiment, the MVIDMR system can be configured to receive an input of the direction that the camera will be travelled around an object, such as 732 in FIG. 8B. For example, the system can be configured to receive an input of a clockwise or counter clockwise direction. Based upon, this input, the system can determine which rotations are to be considered positive rotations and which rotations are to be considered negative rotations.

In another embodiment, the MVIDMR system can be configured to determine a direction of motion that is being used to create the MVIDMR. For example, the MVIDMR system can be configured to identify one or more tracking points on an object in an image using the pixel data from the image. The tracking point can move in the pixel data as the camera is moved. Based upon, the direction the tracking points are moving in the pixel data, a positive and negative rotation direction can be determined for the purposes of determining the angular view of an object that has been captured.

In yet another embodiment, the initial movements of the direction vector associated with the camera as determined from the IMU data can be examined. Based upon the movements of the direction vector at the start of the MVIDMR acquisition process, the direction of rotation in which the camera is generally moving can be determined. The direction of rotation the camera is generally moving can be considered a positive rotation for the purposes of determining the amount of angular rotation of the camera along path. In yet further embodiment, the movement of tracking points from the pixel data and the initial changes to the direction vector associated with the camera can be used to determine in which direction the camera will rotate during acquisition of image data for the MVIDMR.

Next, examples are considered where the device 720 is allowed to move generally in 3-D space. FIG. 9A illustrates pitch and roll of a mobile device 720 and angle changes as a function of time relative to the gravity vector during image acquisition for MVIDMR generation. The direction of the gravity vector is indicated by 802a. An orthogonal coordinate system associated with the gravity vector is indicated by 802b and 802c.

The direction of the body centered coordinate system for device 720 is indicated by 804a, 804b and 804c. The direction of the camera is in the negative Z direction as in the previous pictures. The pitch and roll orientation of the device 720 relative to the gravity vector can be determined using sensor data from the 3-axis accelerometer. As described above, if a magnetometer data is available, then it may be possible to obtain yaw data.

The gyroscopic data can be used to determine a roll rate of the device 720 about axis 804b and the pitch rate about 804c. The roll rate can be integrated to obtain an amount of roll between a first time and a second. The pitch rate can be integrated to obtain an amount of pitch between a first time and a second time.

In one embodiment, the angular rotation amount of device 720 during an MVIDMR image acquisition can be determined using just the roll rate or pitch rate. If the device is orientated in a portrait mode and the user plans to pan around an object with this orientation, then the roll rate from the gyroscopic data as a function of time can be integrated to determine a total roll angle amount as a function of time. In one embodiment, negative roll rates can be ignored for the purposes of determining the total roll angle amount. The total roll angle amount as a function of time can be used to estimate the angular view of an object that has been captured during image acquisition.

If the device 720 is orientated in a landscape mode and the user plans to pan around an object with the device in this orientation, then the pitch rate from the gyroscopic data as a function of time can be integrated to determine a total pitch angle as a function of time. In this example, negative pitch rates can be ignored for the purposes of determining the total pitch angle amount. The total pitch angle amount as a function of time can be used to estimate the angular view of an object that has been captured during the image acquisition process.

In one embodiment, the MVIDMR system can present a user with a selection of a type of path for the device to follow and an orientation of the device that is to be used during the path. Based upon the input provided by the user, the MVIDMR system can determine whether to determine the total pitch angle amount or the total roll angle amount for the purposes of determining an angular view amount of an object that has been captured as a function of time. In these embodiments, as roll rate data and pitch rate data is being integrated, the orientation of the device as a function time may not be needed. However, a starting time to begin the integration of the roll rate data or the pitch rate data and an ending time may have to be determined. In one embodiment, the start and stop can be determined based upon a user selecting a button in an input interface, i.e., the user can select a button to start the image capture and end the image capture.

In another embodiment, the sensor data from the 3-axis accelerometer can be used. The 3-axis accelerometer can be used to determine a roll and pitch orientation of the device 720 relative to the gravity vector as a function time. For example, in FIG. 9A, the device is pitched by angle 808 about the $g_x$ axis 802c and rolled about the gravity vector $g_z$ 802a by an angle amount 806 at time $t_1$. The yaw angle amount about the $g_y$ axis 802b is not determined using the 3-axis accelerometer data. As described above, it can be set to an arbitrary value such as zero degrees.

At $t_1$, the first value of angles 806 and 808 provide an orientation of the Z axis 804a (or negative Z axis) in the coordinate system associated with the gravity vector (802a, 802b and 802c). As described above, a camera on device 720 can be orientated in the negative z direction. At $t_2$, the magnitude of the value of the pitch angle 808 can increase or decrease relative to its value at $t_1$ and the magnitude of the value of the roll angle 806 can increase or decrease relative to its value at $t_1$. The values of the pitch angle 808 and roll angle 806 at time $t_2$ again determine the orientation of the negative z vector in the coordinate system associated with the gravity vector.

In one embodiment, at different times, such as between $t_1$ and $t_2$, an angle value can be determined between the 3-D camera direction vectors, which is the negative z direction in the camera based coordinate system. In this example, the 3-D camera direction vector at each time can be determined in the gravity based coordinate system (802a, 802b and 802c) using the pitch and roll angles about the $g_x$ 802c and $g_z$ 802a axes obtained from the accelerometer data. The yaw angle about the $g_y$ 802b vector can be set to zero or some other fixed value (no yaw change as a function of time). With pitch, roll and yaw angles in the gravity based coordinate system for 3-D camera vector known as a function of time, the change in the angle between the 3-D camera direction vector at two different times, such as between times, $t_1$ and $t_2$, can be determined.

The angle changes can be summed to determine a total angle change as a function of time. The angle change is approximately around the gravity vector $g_z$ 802a. The total change in angle can be used to estimate an angular view of an object captured by the camera. Thus, the angular view of the object captured as function of time can be determined and output to a display screen. Like the examples described above, a rotation direction that is needed along the path to keep the object in view of the camera can be determined, i.e., clockwise or counter clockwise. Further, as described above, angle changes, in the direction that is not needed, can be ignored for the purposes of determining the angular rotation amount in the rotation direction that is needed to keep the object in view of the camera.

In another embodiment, the angle changes can be projected into a particular plane. For example, a circle 812 is shown in a plane perpendicular to the gravity vector. The 3-D camera direction vector can be projected into this plane. Then, the angle changes of the 3-D camera direction vector projected into this plane from time to time can be determined, such as 810. Like the examples described above, a rotation direction that is needed along the path to keep the object in view of the camera can be determined, i.e., clockwise or counter clockwise. Further, as described above, angle changes in the plane in the direction that is not needed can be ignored.

The determination of angle changes about the gravity vector $g_z$ or in a plane perpendicular to the gravity vector can be useful when a person walks a camera around an object to generate an MVIDMR because the path is approximately perpendicular to the gravity vector. However, in other embodiments, other camera paths around an object that are not perpendicular to the gravity vector can be used. Thus, a determination of the change in rotation angles about the gravity vector may not provide a good estimate of the angular view of the object which is captured in the MVIDMR.

In these instances, it may be desirable to allow a specification of an axis about which to determine angle changes during MVIDMR generation. FIG. 9B illustrates pitch and roll of a mobile device and angle changes as a function of time relative to an arbitrary axis during MVIDMR generation. In FIG. 9B, an axis 824a is shown. The axis 824a can be through an object for which images are being captured. The axis 824a can be specified in a fixed orientation relative to the gravity coordinate system, such as via three fixed rotation angles. The three fixed rotation angles specify a coordinate system transformation from the gravity based coordinate system to a coordinate system associated with the arbitrary axis.

The axis 824a can be used to define an orthogonal coordinate system including axes 824b and 824c. Based upon the coordinate transformation between the orthogonal coordinate system associated with the axis 824a and the pitch angles and roll angles determined in the gravity based coordinate system, pitch and roll angles for the 3-D camera direction vector can be determined in the coordinate system associated with axis 824a. In this example, the roll 822 is specified about axis 824a and the pitch is specified about axis 826.

Using the pitch and roll angles in the coordinate system associated with axis 824a, angular changes for the 3-D camera direction vector can be determined about axis 824a. Similar to the method described above, the angular changes about axis 824a can be determined in a plane perpendicular to axis 824a. For example, circle 830 can be in a plane perpendicular to axis 824a and the angle change as a function of time, such 832, can be determined in this plane. Again, the angular changes can be used to estimate an angular view captured of an object during MVIDMR generation.

In one embodiment, a camera path, rather than about the roll axis, such as 824a, can be generated about the pitch axis, such as 824c. Thus, angular changes can be determined about the pitch axis, such as 824c. Similar to the method described above, the angular changes about axis 824c can be determined in a plane perpendicular to axis 824c. For example, circle 828 can be in a plane perpendicular to axis 824c and the angle change as a function of time, such 834, can be determined in this plane. Again, the angular changes can be used to estimate an angular view captured of an object during MVIDMR image acquisition, such as an object through which axis 824a passes.

Figure 10B:
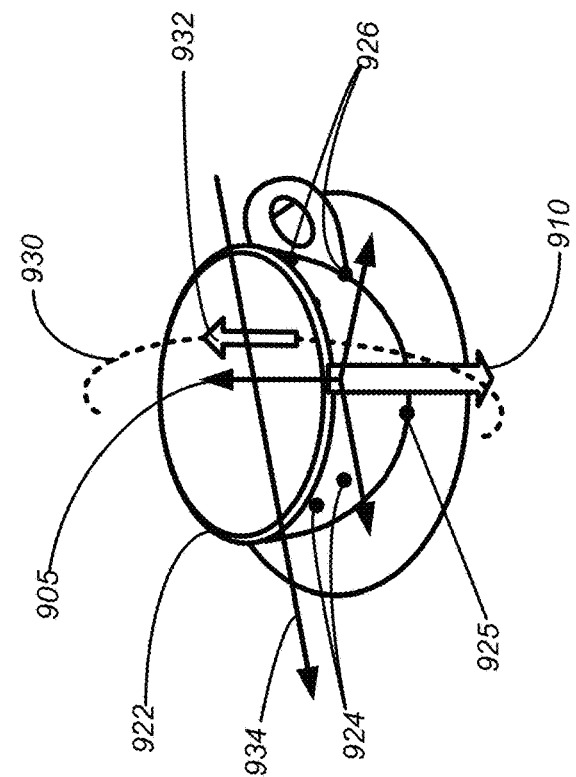
FIGS. 10A and 10B illustrate pitch and roll of a device with a camera along two different paths during image capture associated with a MVIDMR in accordance with embodiments of the present invention.
Figure 10A:
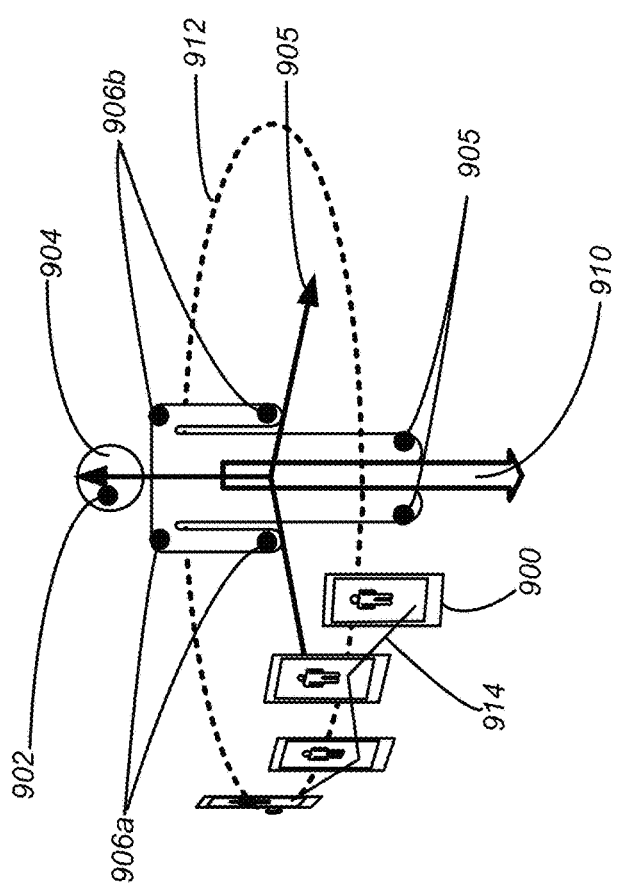

Next, with respect to FIGS. 10A, 10B, 11A and 11B, some examples of angular view estimation of an object applied to a number of different examples of camera paths are described. FIG. 10A shows a path 914 of a device 900 with a camera during image capture for an MVIDMR of a person 904. In this example, the device 900 can generally follow circular path 912 such that some angular view of person 904 is captured. While the device 900 generally follows circular path 912, on its actually path 914, the device 900 can do one or more of the following: 1) move up and down, 2) pitch, roll and yaw and 3) move closer or father away from the person 904.

In this example, the person 904 is standing on the ground. The gravity vector 910 is indicated by an arrow. An orthogonal coordinate system 905 can be associated with the gravity vector 910. In this example, the circular path 912 lies in a plane which is perpendicular to the gravity vector 910.

Based upon a sensor package on the device 900, at least a pitch and roll angle orientation of the device 900 can be determined in coordinate system 905 as a function of time (e.g., using 3-axis accelerometer data). Based upon, the pitch and roll angle orientation of the device 900 as a function of time, a change in angle about the gravity vector can be estimated from time to time. As described above, the angle changes can be used to estimate a total angle change and hence the amount of the angular view of an object captured in the camera images associated with the MVIDMR as a function of time.

As described above, a number of tracking points, such as 902, 905, 906a and 906b on the person 904 can be determined from the image data. The tracking points can change as a function of time. If the mobile device is not sufficiently rotated during the image capture process as it moves along path 914, then the person 904 can move out of the image and the tracking points will be lost.

FIG. 10B shows a path 930 of a device with a camera during image capture for an MVIDMR of a cup and saucer 922. In this example, the device as indicated by the arrow 932 can generally follow circular path 930 such that some angular view of person cup and saucer 922 is captured. Again, while the device generally follows circular path 930, on its actually path 914, the device 900 can do one or more of the following: 1) move up and down, 2) pitch, roll and yaw and 3) move closer or father away from the person cup and saucer 922.

In this example, the cup and saucer 922 can be resting on an object such as a table. The gravity vector 910 is indicated by an arrow. An orthogonal coordinate system 905 can be associated with the gravity vector 910. In this example, axis 934 has been specified. As described above, the axis 934 can be specified in the gravity based coordinate system 905. Angle changes can be computed about axis 934. The path 930 is approximately perpendicular to axis 934. As described above, angle changes can be projected into the plane associated with path 930.

Based upon a sensor package on the device with a camera, such as a sensor package associated with an IMU, at least a pitch and roll angle orientation of the device can be determined in coordinate system 905 as a function of time. As previously described above, based upon, the pitch and roll angle orientation of the device as a function of time, a change in angle about the axis 934 can be estimated from time to time using a number of different methods. As described above, the angle changes can be used to estimate a total angle change and hence the amount of the angular view of an object captured in the camera images associated with the MVIDMR.

As described above, a number of tracking points, such as 924 and 926 on the cup and saucer can be determined from the image data. The tracking points can change as a function of time. If the mobile device is not properly rotated during the image capture process as it moves along path 930, then the cup and saucer 922 can move out of the image and the tracking points will be lost. As described above, when tracking of an object is lost, the MVIDMR generation process can be stopped.

Figure 11A:
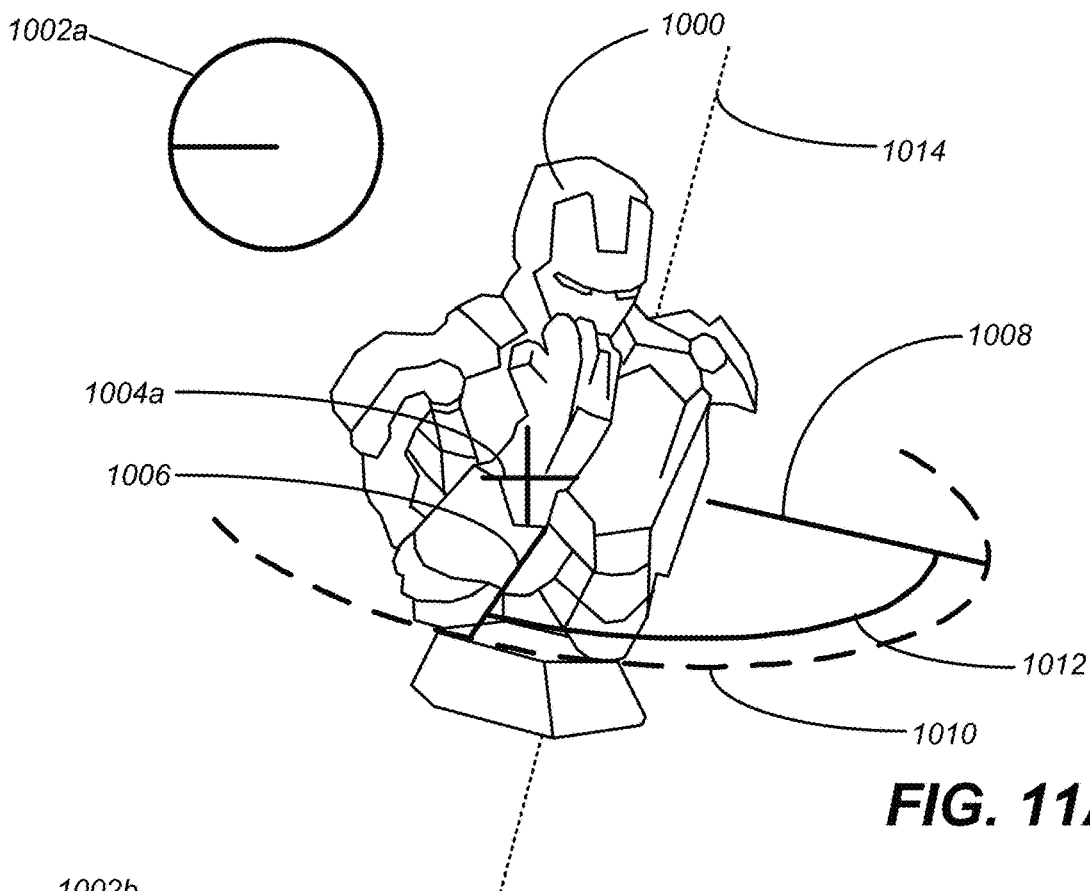
FIGS. 11A and 11B illustrate angle change reporting during image capture associated with a MVIDMR in accordance with embodiments of the present invention.
Figure 11B:
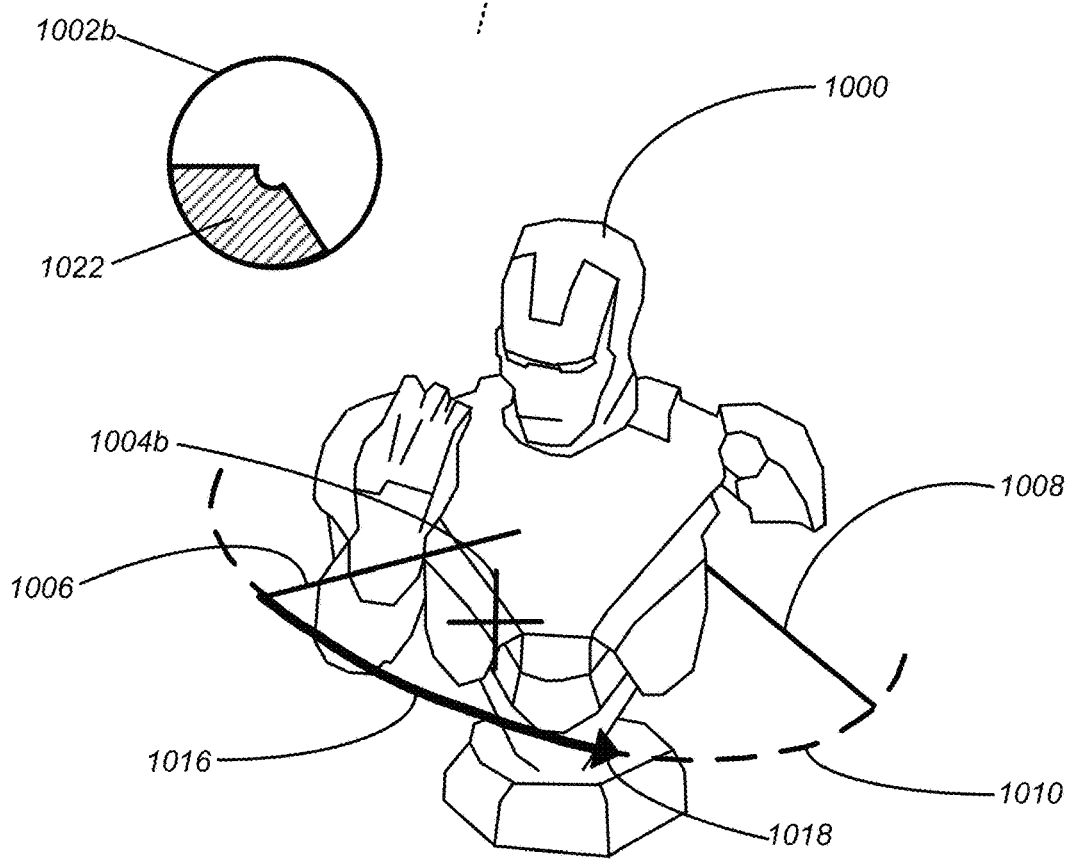

FIGS. 11A and 11B illustrate another example of angular view estimation during image capture associated with a MVIDMR. Initially, an axis 1014 is specified through object 1000, which is a statue. A possible camera path is indicated by curved path 1010. The path 1010 is approximately perpendicular to axis 1014. An angular view range 1012 is specified by a starting line 1006 and an ending line 1008. In one embodiment, a MVIDMR system can be configured to receive a desired angular view for an object in an MVIDMR, such as a value amount in degrees, and then generate the path 1010, the starting point 1006, the ending point 1008 and the angular view range 1012.

In another embodiment, the MVIDMR system can receive image data of the object 1000 from the camera. The image data can be output to a display on a device including the camera. The MVIDMR system can be configured to generate an input interface on the display which allows a specification of an axis about which to determine angle changes and a desired angular view amount of the object. In response, to receiving a specification of an axis around which to rotate, i.e., axis 1014, and an angular view range, the MVIDMR system can augment the image data with the path 1010, the angular view range 1012, the starting point 1006 and the ending point 1008. The augmented image data can be output to a display on the device.

In one embodiment, a line can be output to a touchscreen display interface. The line can be used to represent an axis about which to determine rotations. Via the touch screen display interface, a user may be able to position the line relative to an object appearing in images output to the touch screen display interface, such as an object for which an MVIDMR is to be generated. Via the interface, the user may also be able to specify a rotation direction for the camera about the axis, such as clockwise or counterclockwise.

In one embodiment, the starting point 1006 and the ending point 1008 can be adjustable. For example, the MVIDMR system can be configured to receive an input that allows the starting line and the ending line locations to be adjusted by a user along path 1010. Thus, the magnitude of the angular view which is to be captured can be changed. Further, the portion of the object in the angular view range can be adjusted. For example, when a ninety degree angular view of an object is desired, the positions of the starting and the ending lines can be adjusted to select a ninety degree view segment of the object.

In addition, one or more tracking points, such as 1004a, which reside on the object, can be determined. An indicator showing the tracking point locations can also be generated and added to the image data. In one embodiment, one or more of the tracking point locations determined on an object or objects appearing in the image data can be selectable in an interface, such as a touch screen interface. A selection of one of the tracking points can be used to select an object appearing in the image data upon which to generate an MVIDMR.

In addition, the MVIDMR system can output to the display an indicator, such as 1002a. The indicator can provide an indication of how much of an angular view of the object has been captured. In FIG. 11A, the capture process has not started. Hence, the indicator 1002a indicates a zero value.

In FIG. 11B, a second state of the MVIDMR acquisition process is illustrated. The camera position has changed. Hence, the tracking point 1004b is at a different location on the object and the view of the object has changed.

In the second state, the device with the camera has progressed to position 1018 along curve 1010. The position 1018 is more than half way through the angle range between the starting line 1006 and 1008. A second state 1002b of the progress indicator shows a current amount 1022 of the angular view of the object 1000 which has been captured. When the camera moves to position, such that the ending line 1008 is reached, the MVIDMR system can output an indication that the capture process has been completed.

In one embodiment, object recognition and/or point tracking in the image data can be used as a source for angle information. For example, when a three hundred sixty degree view of an object is being captured, a feature and/or tracking point in the initial images can be re-recognized as three hundred sixty degrees is approached. Then, a three hundred sixty degree angular view value can be associated with the image where the recognized feature repeats itself.

In one embodiment, an angular view value determined from feature recognition in an image can be used for calibration purposes. For example, if the angular view value determined from the feature recognition is greater or less than the value determined from the IMU data, then the value determined from the feature recognition can be used to scale the value from the IMU data. For instance, if the angular view value determined from the IMU data is three hundred seventy degrees and the value determined from feature recognition value is three hundred sixty degrees, then, to calibrate with the feature recognition value, the IMU determined angular values can be scaled by the ratio of three hundred sixty degrees divided by three hundred seventy degrees.

In another example, some understanding about the basic geometry of an object can be used to allow angular view associated with an object to be determined. For instance, it may be possible to distinguish the boundaries of a side of a car versus a front or a back of a car. The maximum length of the side of the car appearing in an image can occur when the camera is approximately perpendicular to the side of the car. The maximum width of the front of the car can occur when the camera is approximately perpendicular to the front of the car. Thus, if the length of the side car is tracked in the image data, a width of the front of the car is tracked in the image data and the camera is moving from the side to the front of the car, then the angular view value between the image where the maximum length of the side of the car occurs and the image where maximum width of the front of the car occurs is about ninety degrees.

The angular view value from the IMU data between the image where the maximum length of the side of the car occurs and the image where maximum width of the front of the car occurs can also be determined. For example, the angular view value between these images estimated from the IMU data can be about ninety three degrees. In one embodiment, the angular view value based upon feature recognition can be used to calibrate angular values determined from the IMU data. For example, the angular view values determined from the IMU data can be multiplied by the ratio of ninety degrees to ninety degrees to calibrate the IMU data. In general, using feature recognition, if an angular view value can be determined for an image or an angular view value change can be determined between images, then the information obtained from feature recognition can be used to calibrate the IMU data.

Figure 12:
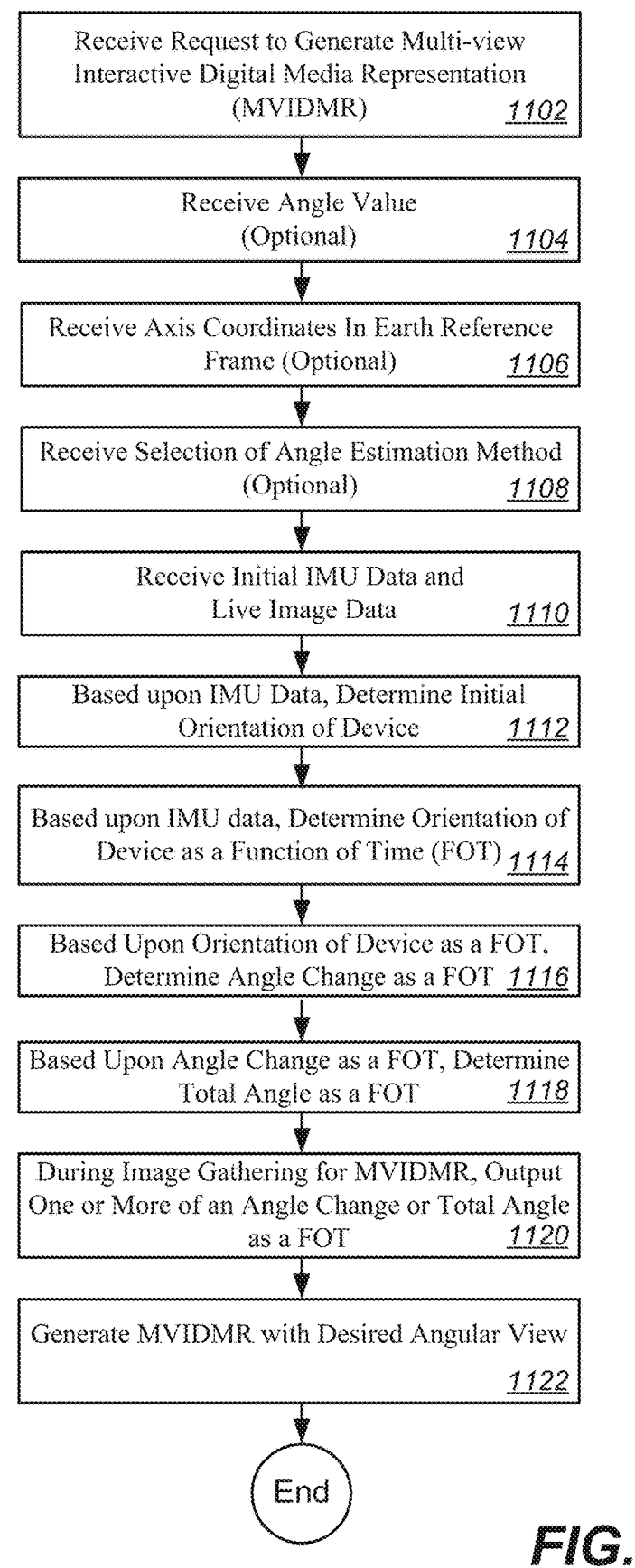
FIG. 12 illustrates an example of a process flow for generating a MVIDMR using IMU data in accordance with embodiments of the present invention.
Figure 13:
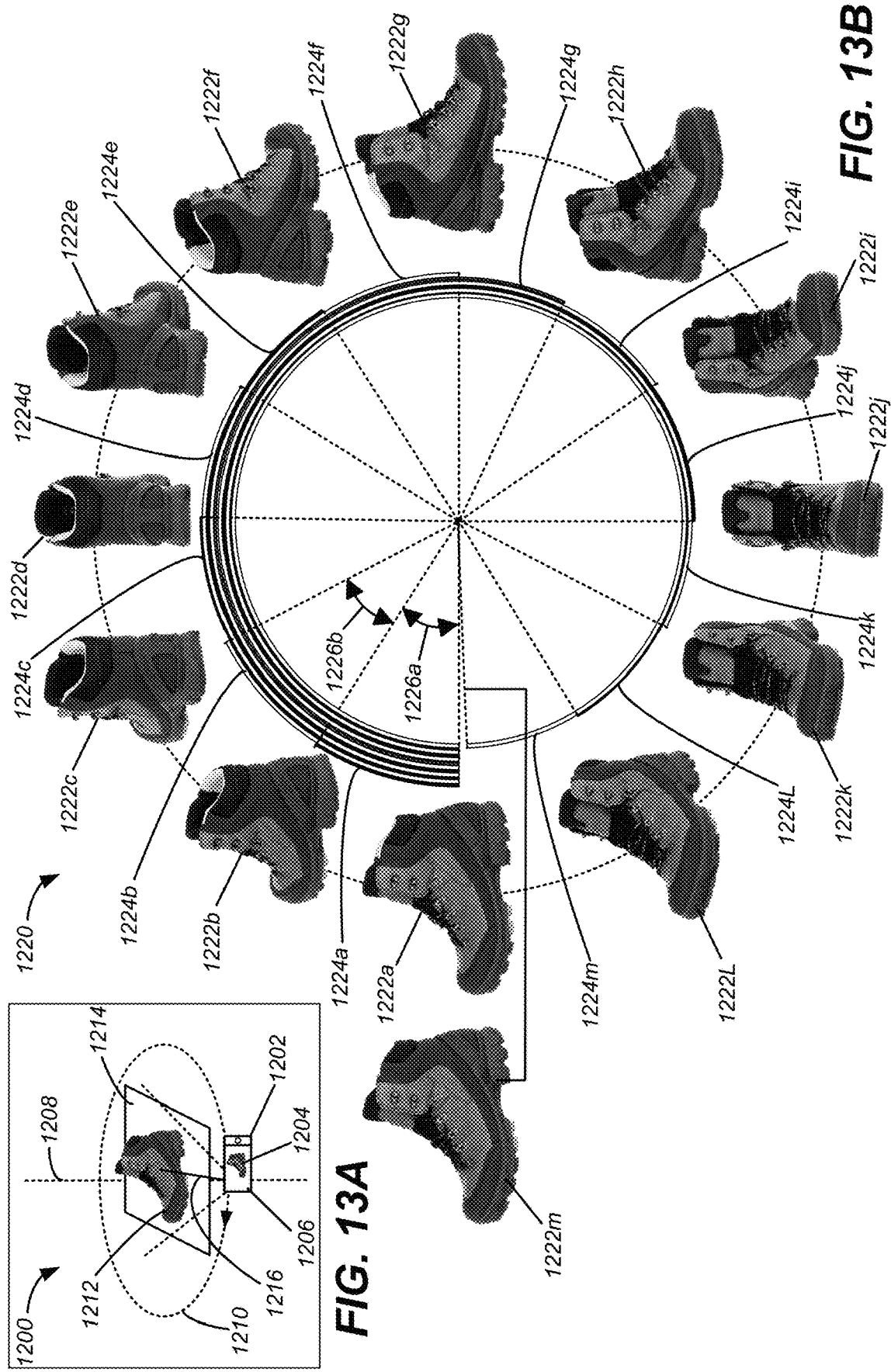
FIG. 13A illustrates a setup for generating an MVIDMR including a three hundred sixty degree of an object in accordance with embodiments of the present invention.
FIG. 13B illustrates live images selected for use in an MVIDMR based upon angle estimation using IMU data in accordance with embodiments of the present invention.

FIG. 12 illustrates an example of a process flow 1100 for generating a MVIDMR using IMU data. In 1102, a request to generate an MVIDMR can be received. For example, the request can be received via a touch screen interface on a mobile device or verbally via a microphone on a mobile device. In 1104, an angle value can be optionally received. The angle value can be used to specify an angular view of an object that is desired in the MVIDMR.

In 1106, the MVIDMR can optionally receive a specification of an axis about which to determine angle changes as a function of time. In one embodiment, the default axis is the gravity vector. In 1108, the MVIDMR system can be configured to optionally output to an interface, such as a touch screen interface, a plurality of angle estimation methods which can be utilized. A number of different methods have been described above, such as using gyroscopic data or accelerometer data. Via the interface, a selection of one of the methods can be received.

In 1110, initial IMU data, such a data which allows a current tilt orientation of a mobile device relative to the Earth's gravity vector, can be determined. In addition, live image data can be received from a camera, such as a camera on a mobile device. In 1112, based upon the IMU data, an initial orientation of the device including the camera can be determined.

As the device orientation changes, the orientation of the device and hence the camera can be determined as a function of time. In 1116, based upon the orientation of the device including the camera as a function of time, the angle change can be determined from time to time. In 1118, the total angle change as a function time can be determined. The total angle change as a function of time can be associated with the live image data which is being captured. Hence, each image in the sequence of images that has been received can be associated with an amount of the angular view of the object that has been captured previously.

In 1120, during the image gathering process, the angle changes from time to time and/or the total angular view of the object which has been captured can be output to a display. An indication can be generated when a desired angular view of the object has been captured. Further, the image capture process can end. Then, in 1122, the MVIDMR with the desired angular view can be generated.

In one embodiment, when an angular view of an object of some amount is captured, the MVIDMR system can be configured to generate an MVIDMR with an angular view that is equal to or less than angular captured of the object. For example, when a three hundred sixty degree view of an object is captured, the system can be configured to receive an input of angular view amount less than three hundred sixty degrees and a range, such as one hundred degrees starting at ten degrees and going to one hundred and ten degrees or ninety degrees starting at one hundred eighty degrees and going to two hundred seventy degrees. In this example, the starting point where images are first captured can be considered zero degrees.

FIG. 13A illustrates a setup 1200 for generating an MVIDMR including a three hundred sixty degree of an object 1212, which is a shoe. In this example, a mobile device 1202 includes a display 1206, an IMU and at least a front facing camera. A shoe 1212 is resting on a platform 1214. The device can also include components, such as a rear facing camera, a microphone, input buttons, a process and memory, wireless communication interfaces, power interfaces and memory storage devices.

The mobile device 1202 is orientated in a landscape mode. Alternatively, the mobile device can be orientated in a portrait mode. The landscape or portrait mode can be generally maintained during the image capture and selection process. The front facing camera captures an image 1204 including the shoe 1212. The image 1204 including the shoe 1212 is output to the display 1206. The initial distance from camera to the shoe 1212 is indicated by line 1216.

A MVIDMR generation process can be initiated with the mobile device 1202 in the position shown in set up 1200. After the MVIDMR generation process is initiated, the mobile device 1202 can start in its initial position and then move along a path, such as 1210. As described above, to keep the object 1212 on the display 1206 of the mobile device, the mobile device 1202 can rotate along the path.

In this example, the path 1210 is shown as circular and lies in a plane which is perpendicular to the gravity vector 1208. When the device 1202 is hand held, while moving along its path, the height of the device above the ground and its distance 1216 from the object 1212 can vary. Further, the device 1202 can pitch, roll and raw as previously described as it moves along its path, such as 1210.

In one embodiment, a path can involve the mobile device 1202 moving around the object 1212, such that a three hundred sixty degree angular or more view of the object is captured. Alternately, less than three hundred sixty degree angular view of the object can be captured. In another embodiment, the device 1202 can be held in place and the object 1212 can be rotated. For example, a person can twirl around. However, in this instance, the IMU data would not record a rotation of device 1202.

When more than three hundred and sixty degrees of the object is captured in an image sequence for an MVIDMR, such as 1212, is captured, the image sequence can be trimmed down to three hundred and sixty degrees. During trimming, the angular view amounts associated with the images, determined from the IMU data, can be used to determine where the overlap occurs in the sequence of images. The trimming can be performed from the beginning or the end of the sequence of images. For example, if three hundred sixty five degrees is captured images, images can be trimmed from the first five degrees predicted from the IMU data or from the last five degrees.

In another embodiment, the overlapping images can be merged. For example, the images from the last five degrees can be merged with the images from the first five degrees. An order of the merged images can be based upon the determined angular view amounts. For example, images between three hundred sixty degrees and three hundred sixty one degrees can be merged with the images between zero and one degrees. In particular, an image with an estimated angular view 360.5 degrees can be placed between images with estimated angular view of 0.25 degrees and 0.75 degrees.

In general, a sequence of images with a determined angular view range can be trimmed within the estimated angular view range. For example, a sequence of images with a determined angular view range of three hundred sixty degrees can be trimmed down to a range between zero and one hundred eight degrees, between ninety and two hundred seventy degrees, between seventy and two hundred seventy degrees, etc. The MVIDMR system can be configured to output an angular view range of an object captured in a sequence of images, receive an input of an angular range to trim the sequence of images, trim the sequence of images in accordance with the received angular range and then generate based upon the trimmed sequence of images.

While the device 1202 moves along the path along the live images can be received from the camera. As described above, a sequence of images can be selected from the live images. The sequence of images can be used to generate an MVIDMR At the beginning of the sequence, the estimated angular view captured of the object, such as 1212 can be zero. Then, the estimated angular view of the object 1212 can increase as the object, such as 1212, is circumscribed. These estimates of the angular view of the object can be associated the images in the sequence of images.

In one embodiment, all of the images and the estimated angular view of the object associated with each image can be stored. Then, later, an angular spacing can be specified. For example, an angular spacing of images can be five degrees. Based upon, the specified angular spacing, a subset of images with the desired spacing can be selected from among the stored images using the angular view estimates for each stored image to generate a new sequence of images. The, new sequence of images can be used to generate an MVIDMR.

Figure 14:
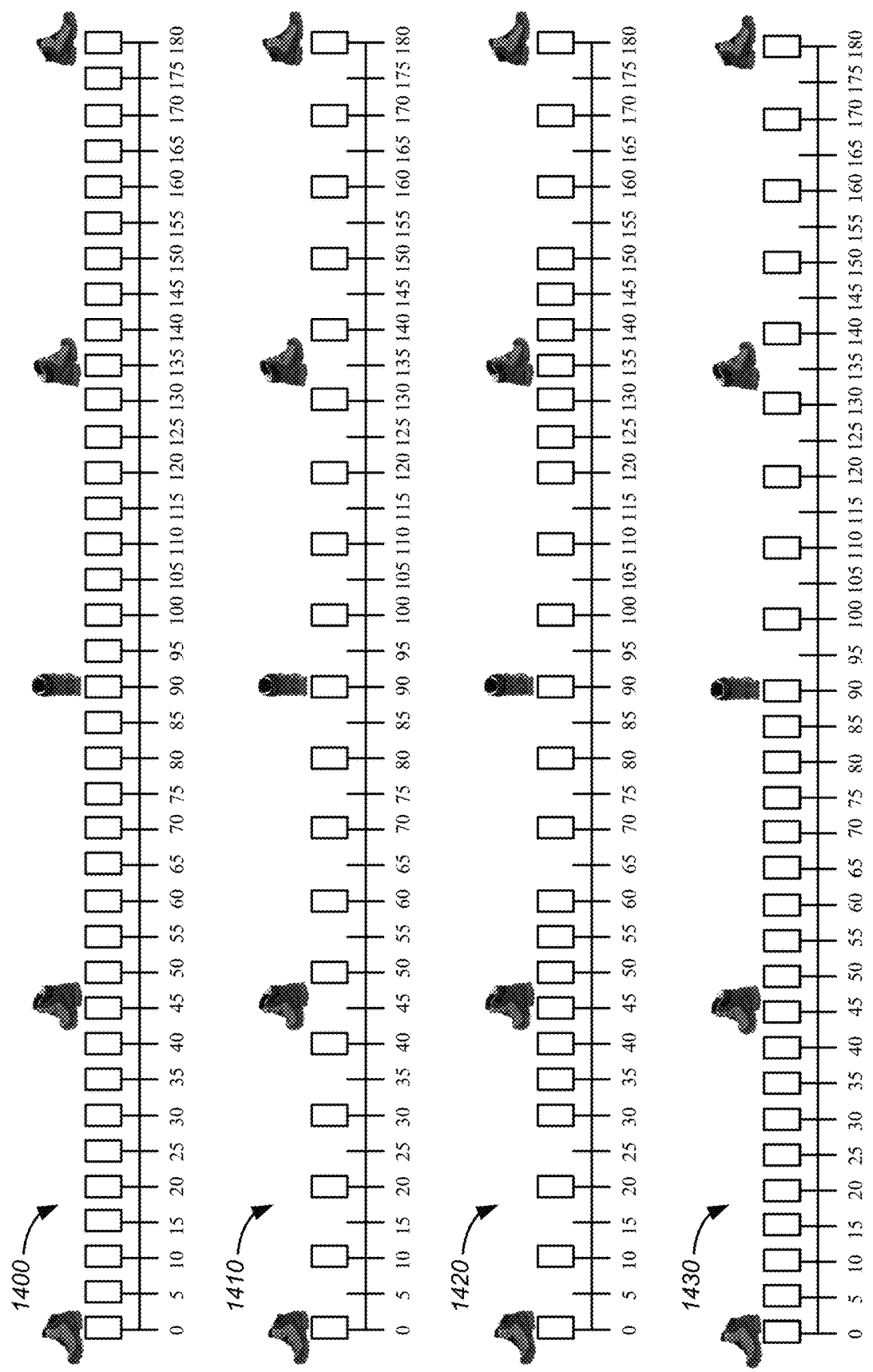
FIG. 14 illustrates different angle profiles for selecting live images for using in an MVIDMR in accordance with embodiments of the present invention.

In another embodiment, an angle profile can be specified (see FIG. 14). An angle profile can specify angular values.

For example, a constant angular spacing value can be specified, such as three degrees or five degrees. Based upon the constant angular spacing value, angular values in the angle profile can be determined. A constant angular spacing can be selected to provide a smoother viewing experience when the MVIDMR generated from the selected images is played back.

As the live images are received, the current value of the angular view can be determined. The current value of the angular view can be compared to angular values in the angle profile. When the current value of the angular is proximate to an angular value in the angle profile, e.g., plus or minus a quarter of degree, plus or minus a half a degree, plus or minus a degree, plus or minus two degrees, etc., one or more of the live images can be selected and can be stored. The selected live images can provide a sequence of images that can be used to generate an MVIDMR of the object, such as 1212. These two embodiments are further illustrated with respect to FIG. 13B as follows.

FIG. 13B illustrates live images 1220 selected for use in an MVIDMR based upon angle estimation using IMU data. A plurality of images such as 1222a, 1222b, 1222c, 1222d, 1222e, 1222f, 1222g, 1222h, 1222i, 1222j, 1222k, 12221 and 1222m, selected from among the live images received from the camera on mobile device 1202, are shown. The selected images span almost a three hundred sixty degree view of object 1212.

The angular view of the object estimated from the IMU data and associated with each of the selected images is indicated as various progressions around a circle, such as 1224a, 1224b, 1224c, 1224d, 1224e, 1224f, 1224g, 1224h, 1224i, 1224j, 1224k, 12241 and 1224m. Two examples of angular spacing, 1226a and 1226b, between images 1222a and 1222b and 1222b and 1222c are shown. As described above, the angular spacing can be associated with angles described in an angle profile. For example, when the determined angular view 1224a is approximately equal to angle 1226a and angle 1226a is in the angle profile, then image 1222b can be selected. In another example, when the determined angular view 1224b is approximately equal to the sum of angles 1226a and 1226b and the sum of angles 1226a and 1226b is in the angle profile, then image 1222c can be selected.

As three hundred sixty degrees is approached image 1222m is selected. In one embodiment, when equal angular spacing between images is desired, the last image, such as 1222m may not be utilized. Instead, image 1222a can be used. Thus, an MVIDMR using the images can cycle from image 1222L to image 1222a instead of 1222L to 1222m to 1222a when the MVIDMR cycles from its end at three hundred sixty degree to its beginning at zero degrees. This approach may provide a smoother transition. In another embodiment, image 1222m can be utilized. Thus, the MVIDMR can cycle from image 1222m to image 1222a or vice versa when the MVIDMR using the images is played back.

Next, some example angle profiles are discussed. FIG. 14 illustrates different angle profiles for selecting live images for use in an MVIDMR. A selected image at an angle value is indicated by a rectangle. A few example images appear above some of the rectangles. Angles up to one hundred eighty degrees are considered. However, as described above, a full three hundred sixty degrees can be considered.

Further, angles above three hundred sixty degrees can be considered. An MVIDMR can include multiple rotations about an object. In a first rotation about an object, a first angular spacing can be used to select images. In a second rotation about an object a second angular spacing can be used to select images. The different angular spacing and the angle ranges to apply the angular spacing can be specified in the angle profile. For example, in the first rotation, a five degree angle spacing can be used between images based upon the angle estimation from the IMU data. Whereas, in the second rotation, a ten degree angle spacing can be used between images based upon the angle estimation from the IMU data.

In 1400, based upon the angle estimation from the IMU data, images estimated to be five degrees apart are selected. In 1410, based upon the angle estimation from the IMU data, images estimated to be ten degrees apart are selected. As described above, in one embodiment, only images selected from among the live images using the angle criteria are selected. Thus, in 1400, only images determined to be about five degrees apart can be saved and, in 1410, only images determined to be about five degrees apart can be saved.

In another embodiment, all or a portion of the live images including an angular view value determined for each image can be stored. Then, later a sequence of images from the saved images can be selected based upon an angle criterion specified in the angle profile. For example, live images can be selected initially selected at a particular angular increment, such as half degree increments, and/or at a reduced frame rate, such as ten frames per second. Subsequently, images at five degree increments can be selected from among the saved images to provide image sequence 1400 or 1410. Then, image sequence 1400 or 1410 can be used to generate an MVIDMR.

In 1420, the spacing used to select images varies between five and ten degrees. Five degrees increments are used around forty five degrees and one hundred thirty five degrees and a ten degree spacing is used elsewhere. When a MVIDMR is generated using image sequence 1420, the clustering of images can cause the rotation rate to appear to slow down around where a smaller five degree angle increment is used. This effect can be used to bring to a user's attention a particular angular view of an object.

In image sequence 1430, a five degree spacing is used for the first ninety degrees of angular view of the object and ten degrees is used for the second ninety degrees. Thus, when used in an MVDMR, the first ninety degrees may play back slower than the second ninety degrees. In general, the spacing doesn't have to be constant and can vary from image to image. Thus, an irregular spacing pattern can be employed to select images.

Figure 15:
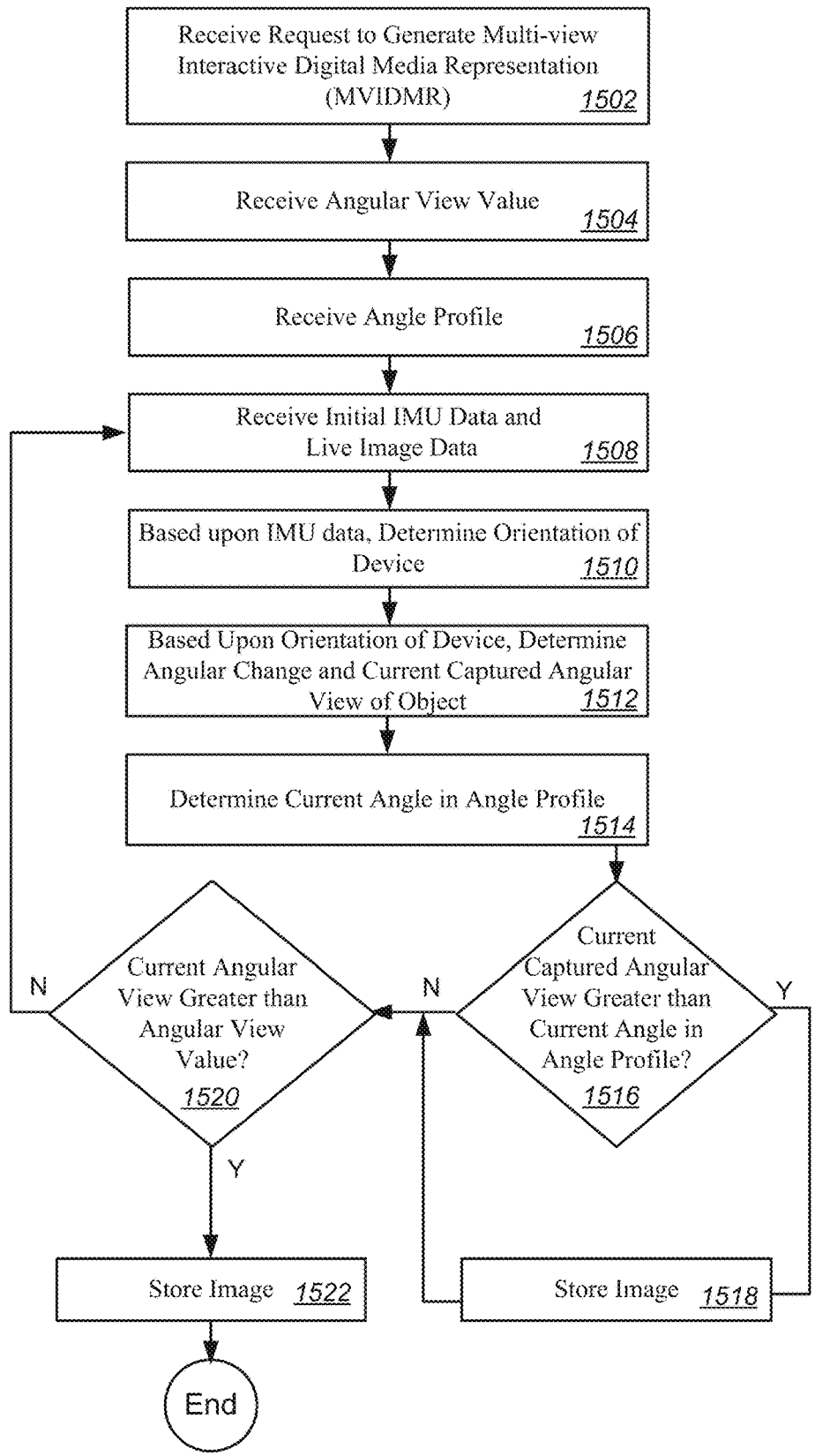
FIG. 15 illustrates an example of a process flow for generating a MVIDMR using IMU data for image selection in accordance with embodiments of the present invention.

FIG. 15 illustrates an example of a process flow 1500 for generating a MVIDMR using IMU data for image selection. In 1502, a request to generate an MVIDMR can be received. For example, an interface can be generated on a mobile device, such as a touch screen interface or voice interface. Via touch screen interface or a voice interface, a command can be received to start the MVIDMR generation process.

In 1504, in one embodiment, an angular view value can be received. The angular view value can be used to determine when to stop selecting images for the MVIDMR. For example, a value of ninety, one hundred eighty or three hundred sixty degrees can be received. When the input angular view value is reached according to the angular views determined from the IMU data, the recording can stop. In another embodiment, a user may manually stop the image selection, such as by providing a touch input or a voice command. In yet another embodiment, the user may simply tilt the camera so that the object is no longer in the camera view and the MVIDMR system may end the image selection process.

In 1506, an angle profile can be received. The angle profile can be used to specify angles at which to select images from among the live images. For example, an angle increment, such as one degree, two degrees, five degrees, ten degrees, etc., can be specified in the angle profile. In another example, a list of angle values for selecting images can be specified, such as five degrees, seven degrees, nine degrees, fourteen degrees, nineteen degrees, twenty nine degrees, thirty nine degrees, etc., where the spacing between the angle values can be varied. These values can be entered manually and stored in a file. Then, the values can be reread from the file if reused for different objects, such as two different shoes or two different cars.

In 1508, initial IMU data and live image data can be received. In one embodiment, the initial angle value can start at zero and then a determination of angular changes from the IMU data can start. Thus, one of the live images initially received can be selected for an image sequence used to generate an MVIDMR.

In addition, when the image selection process ends one of the last live images received can be also be saved. The last image saved may not be in accordance with a specified angular spacing. For example, when a five degree angular increment is specified and the image selection process ends with less than a five degree increment between the last image selected, then an image with less than a five degree spacing can be selected. In one embodiment, the selected images in the image sequence can be trimmed such that it ends with an equal spacing. For example, if the angular spacing is five degrees and the image selection process ends with only a three degree spacing between the last available image and the last selected image, then the image sequence can be trimmed down to the last selected image.

In 1510, based upon IMU data, an orientation of a device including a camera can be determined. For example, a pitch and roll orientation of the device relative to the gravity vector can be determined. The orientation changes can be used to estimate angular changes. In another embodiment, an object appearing in the live images can be selected, then angular rate measurements from the IMU can be integrated to determine angular changes to an orientation of the device. The angular changes can be used to estimate an angular view of the selected object which has been captured.

In 1512, based upon an orientation of the device (alternatively, based upon angular rates), an angular change can be determined from previous orientation of the device. The angular changes can be summed to determine a current angular view of the object that has been captured since the MVIDMR process was initiated. As described above, the current angular view can be associated with an image received from the camera that has been selected and stored.

In 1514, a current angle in the angle profile can be determined. For example, if five degree increments are being used, the first angle in the angle profile can be five degrees and the second angle in the angle profile can be ten degrees. After an image is selected that is associated with the first angle, the MVIDMR system can advance to the second angle. This process can continue until images are selected that are associated with all the angles in the angle profile or the MVIDMR image selection process ends, such as when a desired angular view value is reached.

In 1516, a current captured angular view determined from the IMU data can be compared to the current angle in the angle profile. In one embodiment, when the current captured angular view is greater than current angle in the angle profile than a current live image can be selected. The selected live image and its angular view value can be stored in 1518. When the current live image is selected, a new current angle can be determined. In another embodiment, when the current angular view is within a range of the current angle in the angle profile, than a current live image can be selected. For example, the range can be plus or minus a quarter of degree, a half a degree, a degree, etc.

As described above, the live images can be associated with an angular view value. As described above, negative angular changes can occur and can be ignored. Thus, in one embodiment, only live images associated with a positive change in the angular view value can be selected and stored. The positive change can refer to rotation in a desired direction along a path. The live images associated with a negative angular view change can be ignored. Thus, a selection of live images based upon positive change in the angular view value can be one filter for selecting from among the live images. In this example, the angular spacing between the selected live images can vary from image to image depending on how the mobile device including the camera is moved from image to image.

In 1516, when the current captured angular view is not greater than the current angle in the angle profile, the process flow can advance to 1520. Further, the process flow can advance to 1520 after an image is selected and stored in 1518. In 1520, the current angular view value can be compared to the angular view value received in 1504. When the current angular view value is not greater than the angular view value or within a range, then the process flow can return to 1508.

When the current angular view value is greater than the angular view value or within a range of the angular view value, then a final image can be selected and stored to the image sequence used to generate the MVIDMR. Alternately, when the MVIDMR ends, such as via a manual command, then a final image can be selected and stored. Then, the image selection process can end.

As described above, when the image selection process ends, a trimming process can occur. For example, when a constant angular spacing has been specified and the last image saved is less than the constant angular spacing then the last image saved can be removed from the image sequence used for the MVIDMR generation. In another example, when a three hundred sixty degree angular view is generated and the last image or images selected are at an angular view greater than three hundred sixty degrees, then some of the last images selected can be trimmed from the image sequence or some of the first images selected can be trimmed from the image sequence such that the overlap is removed. In yet another embodiment, the overlapping images can be merged with one another. For examples, selected images with an angular view value greater than three hundred sixty degrees can be merged with selected images at the beginning of the image sequence to close the loop.

Figure 16:
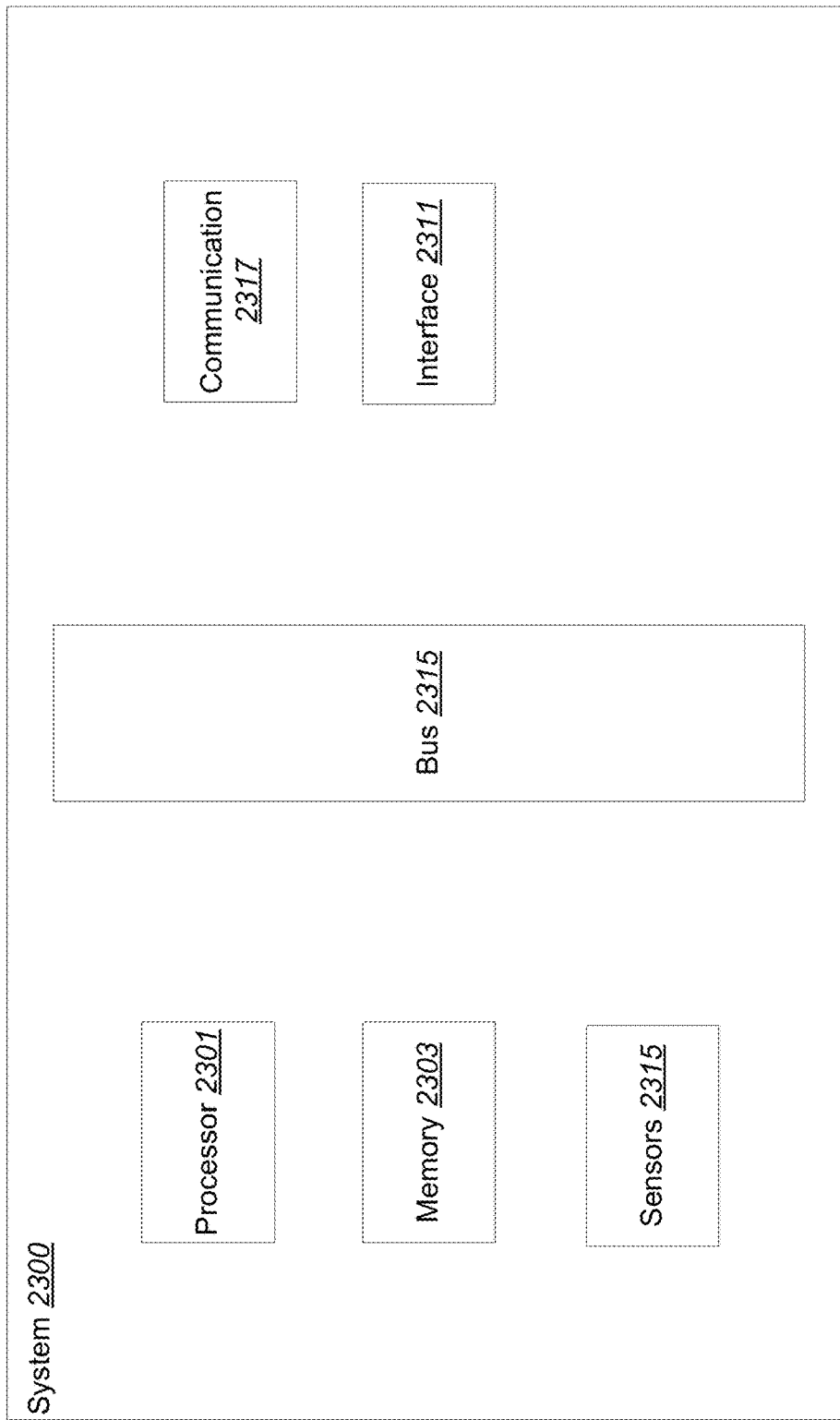
FIG. 16 illustrates a particular example of a computer system that can be used with various embodiments of the present invention.

With reference to FIG. 16, shown is a particular example of a computer system that can be used to implement particular examples of the present invention. For instance, the computer system 2300 can be used to provide multi-view interactive digital media representations according to various embodiments described above. According to particular example embodiments, a system 2300 suitable for implementing particular embodiments of the present invention includes a processor 2301, a memory 2303, an interface 2311, and a bus 2315 (e.g., a PCI bus).

The system 2300 can include one or more sensors, such as light sensors, accelerometers, gyroscopes, multi-axis magnetometers, microphones, cameras including stereoscopic capabilities or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

As described above, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data.

One advantage of tracking objects in the manner described above in the 2-D image space is that a 3-D reconstruction of an object or objects appearing in an image don't have to be performed. The 3-D reconstruction step can be referred to as "structure from motion (SFM)" in the computer vision community and "simultaneous localization and mapping (SLAM)" in the robotics community. The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

The interface 2311 may include separate input and output interfaces, or may be a unified interface supporting both operations. Examples of input and output interfaces can include displays, audio devices, cameras, touch screens, buttons and microphones. When acting under the control of appropriate software or firmware, the processor 2301 is responsible for such tasks such as optimization. Various specially configured devices can also be used in place of a processor 2301 or in addition to processor 2301, such as graphical processor units (GPUs). The complete implementation can also be done in custom hardware. The interface 2311 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

In FIG. 16, the system 2300 can be integrated into a single device with a common housing. For example, system 2300 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 2300 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a multi-view interactive digital media representation. In addition, a virtual guide can be provided to help teach a user how to view a multi-view interactive digital media representation in the wearable system. For example, the virtual guide can be provided in synthetic images output to head mounted display which indicate that the multi-view interactive digital media representation can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
on a mobile device including a processor, a memory, a camera, an inertial measurement unit, a microphone and a touchscreen display, receiving via an input interface on the mobile device a request to generate a multi-view interactive digital media representation of a vehicle;
receiving via the input interface an angle profile wherein the angle profile includes a plurality of angles or angle information used to determine the plurality of angles;
receiving live images from the camera on the mobile device as the mobile device moves along a path and wherein an orientation of the camera varies along the path such that the vehicle in the live images is captured from a plurality of camera views;
determining an angular view of the vehicle captured in each of the live images; and
selecting a subset of the live images that have angular views corresponding to views of the angle profile, wherein the subset of the live images is used to generate;
the multi-view interactive digital media representation wherein the multi-view interactive digital media representation includes a plurality of 2D images, wherein each of the plurality of 2D images includes the vehicle from a different camera view such that when the plurality of images is output to the touchscreen display, the vehicle appears to undergo a 3-D rotation through an angular view amount corresponding to the angle profile.

2. The method of claim 1, further comprising receiving via the interface a selection of the vehicle appearing in one of the live images.

3. The method of claim 1, wherein one or more of a height of the camera above ground, a distance from the camera to the vehicle, a pitch angle of the mobile device, a roll angle of the mobile device, a yaw angle of the mobile device or combinations thereof varies along the path.

4. The method of claim 1, further comprising receiving an angular view value via the input interface, determining whether the angular view of the vehicle is within a range of the angular view value and selecting a final image in the sequence of images.

5. The method of claim 1, further comprising, in response to receiving the request generate the multi-view interactive digital media representation, selecting a first image in the sequence of images from among the live images wherein the angular view of the vehicle associated with the first image is zero.

6. The method of claim 1, wherein the plurality of angles in the angle profile are each spaced equally.

7. The method of claim 6, wherein the angle information indicates a constant angle spacing value to use between each of the plurality of angles.

8. The method of claim 6, further comprising determining a final image selected for the sequence of images is not equally spaced with a preceding image in the sequence of images and removing the final image from the sequence of images prior to generating the multi-view interactive digital media representation.

9. The method of claim 1, further comprising determining whether each of the angular changes is a positive in magnitude or negative in magnitude and selecting only live images associated with a positive angular change.

10. The method of claim 1, wherein an angular spacing between each of the plurality of angles is variable.

11. The method of claim 1, wherein a portion of the plurality of angles is clustered around a particular angular view of the vehicle such that a first angular spacing near the particular angular view of the vehicle is smaller than a second angular spacing away from the particular angular view.

12. The method of claim 1, wherein the angular changes are determined about an axis.

13. The method of claim 12, wherein the axis is aligned with Earth's gravity vector.

14. The method of claim 12, further comprising based upon the orientation of the camera along the path, determining a first direction of rotation of the camera about the axis.

15. The method of claim 14, wherein only angular changes in the first direction are used to determine the angular view of the vehicle captured in each of the live images.

16. The method of claim 15, further comprising determining a first angular change in a second direction opposite the first direction, determining a subsequent second angular change in the first direction, wherein the second angular change is determined based upon the orientation of the camera prior to the first angular change.

17. The method of claim 14, further comprising determining angular changes in the first direction of rotation and in a second direction opposite the first direction wherein the angular view of the vehicle is captured in each of the live images is determined using both the angular changes in the first direction and the second direction.

18. The method of claim 1, further comprising outputting to the display a current value of the angular view of the vehicle.

19. The method of claim 1, wherein the multi-view interactive digital media representation of the vehicle includes a three dimensional representation of one or more components of the vehicle.

20. The method of claim 19, wherein the multi-view interactive digital media representation of the vehicle is displayed on the touchscreen display such that a close-up view of one or more components of the vehicle is displayed to a user of the touchscreen display in response to tactile contact, by the user, with the one or more components of the vehicle as displayed in the multi-view interactive digital media representation of the vehicle.

21. The method of claim 19, wherein the multi-view interactive digital media representation of the vehicle includes a three dimensional representation of a damaged component of the vehicle.

22. The method of claim 1, wherein the inertial measurement unit includes a 3-axis accelerometer and the orientation of the camera at a plurality of times along the path is determined from sensor data from the 3-axis accelerometer generated along the path.

23. The method of claim 22, based upon the sensor data from the 3-axis accelerometer, determining a tilt orientation of the mobile device relative to an orthogonal coordinate system associated with Earth's gravity vector wherein the tilt orientation includes a pitch angle of the mobile device and a roll angle of the mobile device measured relative to the orthogonal coordinate system wherein the angular changes are determined based upon the tilt orientation.

24. The method of claim 1, wherein the angular changes are determined based upon one or more of accelerometer data, gyroscopic data, magnetometer data or combinations thereof.

25. The method of claim 1, wherein the inertial measurement unit includes one or more of an accelerometer, a gyroscope, a magnetometer or combinations thereof.

* * * * *